US012516085B2

(12) United States Patent
Bagchi et al.

(10) Patent No.: US 12,516,085 B2
(45) Date of Patent: Jan. 6, 2026

(54) METHODS AND COMPOSITIONS FOR TREATING MYC-DRIVEN CANCERS

(71) Applicant: Sanford Burnham Prebys Medical Discovery Institute, La Jolla, CA (US)

(72) Inventors: Anindya Bagchi, San Diego, CA (US); Ashutosh Tiwari, San Diego, CA (US)

(73) Assignee: Sanford Burnham Prebys Medical Discovery Institute, La Jolla, CA (US)

( * ) Notice: Subject to any disclaimer, the term of this patent is extended or adjusted under 35 U.S.C. 154(b) by 962 days.

(21) Appl. No.: 17/760,724

(22) PCT Filed: Sep. 18, 2020

(86) PCT No.: PCT/US2020/051626
§ 371 (c)(1),
(2) Date: Mar. 15, 2022

(87) PCT Pub. No.: WO2021/055846
PCT Pub. Date: Mar. 25, 2021

(65) Prior Publication Data
US 2023/0058305 A1    Feb. 23, 2023

Related U.S. Application Data

(60) Provisional application No. 62/902,890, filed on Sep. 19, 2019.

(51) Int. Cl.
| C07K 7/08 | (2006.01) |
| A61P 35/00 | (2006.01) |
| A61K 38/00 | (2006.01) |

(52) U.S. Cl.
CPC ............. *C07K 7/08* (2013.01); *A61P 35/00* (2018.01); *A61K 38/00* (2013.01)

(58) Field of Classification Search
CPC .................................................... C07K 7/08
See application file for complete search history.

(56) References Cited

U.S. PATENT DOCUMENTS

| 4,235,871 A | 11/1980 | Papahadjopoulos et al. |
| 4,373,071 A | 2/1983 | Itakura |
| 4,401,796 A | 8/1983 | Itakura |
| 4,415,732 A | 11/1983 | Caruthers et al. |
| 4,458,066 A | 7/1984 | Caruthers et al. |
| 4,500,707 A | 2/1985 | Caruthers et al. |
| 4,668,777 A | 5/1987 | Caruthers et al. |
| 4,973,679 A | 11/1990 | Caruthers et al. |
| 5,047,524 A | 9/1991 | Andrus et al. |
| 5,132,418 A | 7/1992 | Caruthers et al. |
| 5,153,319 A | 10/1992 | Caruthers et al. |
| 5,204,253 A | 4/1993 | Sanford et al. |
| 5,262,530 A | 11/1993 | Andrus et al. |
| 5,279,833 A | 1/1994 | Rose |
| 5,683,898 A | 11/1997 | Yazawa et al. |
| 5,700,642 A | 12/1997 | Monforte et al. |
| 2004/0023267 A1 | 2/2004 | Morris |
| 2009/0098622 A1 | 4/2009 | Facciotti et al. |
| 2009/0311748 A1 | 12/2009 | Isogai et al. |
| 2013/0230547 A1 | 9/2013 | Sanda et al. |
| 2018/0110788 A1 | 4/2018 | Toyoshima et al. |
| 2019/0117751 A1 | 4/2019 | Torigoe et al. |
| 2021/0071266 A1 | 3/2021 | Bagchi |

FOREIGN PATENT DOCUMENTS

| CN | 108220434 A | 6/2018 |
| CN | 106047880 B | 2/2019 |
| WO | WO-2019053003 A1 | 3/2019 |
| WO | WO-2019217572 A1 | 11/2019 |
| WO | WO-2021055846 A1 | 3/2021 |

OTHER PUBLICATIONS

Bagchi, A. (2023) "CSIG-32. Myc Driven Cancers are Dependent on Convergent Oncogenic Pathways Induced by Genomic Rearrangements at PVT1" Neuro-Oncology, 25(Suppl 5), v47, Abstract ID: NOAD179.0188. (Year: 2023).*
Tiwari et al. (2025) "Synergistic RAS-MAPK and AKT Activation in MYC-Driven Tumors via Adjacent PVT1 Rearrangements" bioRxiv, Feb. 2025, 70 pages. (Year: 2025).*
Cavalli et al. Intertumoral Heterogeneity within Medulloblastoma Subgroups. Cancer Cell 31:737-754 (2017).
Felgner et al., Lipofection: A highly efficient, lipid-mediated DNA-transfection procedure, Proc. Natl. Acad. Sci. USA 84: 7413-7414 (1987).
Mannino et al. Liposome mediated gene transfer. BioTechniques 6(7):682-690 (1988).
PCT/US2019/031349 International Invitation to Pay Additional Fees dated Jul. 29, 2019.
PCT/US2019/031349 International Search Report and Written Opinion dated Oct. 16, 2019.
PCT/US2020/051626 International Search Report and Written Opinion dated Feb. 1, 2021.
Prive et al., Identification and characterization of three novel lipases belonging to families II and V from Anaerovibrio lipolyticus 5ST. PLoS One 8(8):e69076 [1-9] (2013).
Szoka et al., Comparative properties and methods of preparation of lipid vesicles (liposomes). Annual Review of Biophysics and Bioengineering 9:467-508 (1980).

(Continued)

*Primary Examiner* — James Joseph Graber
(74) *Attorney, Agent, or Firm* — Dickinson Wright PLLC

(57) ABSTRACT

Described herein are methods and compositions for diagnosing, treating, or ameliorating symptoms of cancer, including MYC-driven and KRAS-driven cancer, with therapeutic HNB polypeptides. In some embodiments, disclosed herein are compositions comprising a synthetic nucleic acid sequence encoding a Plasmacytoma variant translocation 1_217 (PVT1_217) splice variant micropeptide, wherein the PVT1_217 splice variant micropeptide comprises at least 10 contiguous amino acids that are identical to a peptide encoded by a short open reading frame (shORF) located at the junction of Exon 3 and Exon 4 of human PVT 1_217.

21 Claims, 19 Drawing Sheets

Specification includes a Sequence Listing.

(56) References Cited

OTHER PUBLICATIONS

Tashiro et al. MP99-18 Role of long non-coding RNA PVT1 in regulating MYC in human cancer. Journal of Urology 197(4S):e1327-e1328 (2017).

Tseng et al. PVT1 dependence in cancer with MYC copy-number increase. Nature 512(7512):82-86 (2014).

Jin et al. Long non-coding RNA PVT1 interacts with MYC and its downstream molecules to synergistically promote tumorigenesis. Cell Mol Life Sci 76(21):4275-4289 (2019).

L'Abbate MYC-containing amplicons in acute myeloid leukemia: genomic structures, evolution, and transcriptional consequences. Leukemia 32(10):2152-2166 (2018).

U.S. Appl. No. 17/053,328 Office Action dated Jan. 9, 2023.

U.S. Appl. No. 17/053,328 Office Action dated Jun. 7, 2023.

Verduci et al. The oncogenic role of circPVT1 in head and neck squamous cell carcinoma is mediated through the mutant p53/YAP/TEAD transcription-competent complex. Genome Biol 18(1):237 (2017).

Wang et al. Tumor penetrating peptides inhibiting MYC as a potent targeted therapeutic strategy for triple-negative breast cancers. Oncogene 38(1):140-150 (2018).

Xiao et al. Prognostic values of long noncoding RNA PVT1 in various carcinomas: An updated systematic review and meta-analysis. Cell Prolif 51(6):e12519 (2018).

* cited by examiner

FIG. 9A          FIG. 9B

SEQUENCE LISTING

<160> NUMBER OF SEQ ID NOS: 67

<210> SEQ ID NO 1
<211> LENGTH: 14
<212> TYPE: PRT
<213> ORGANISM: Artificial Sequence
<220> FEATURE:
<223> OTHER INFORMATION: Description of Artificial Sequence: Synthetic peptide

<400> SEQUENCE: 1

Met Lys Thr Gln Leu Gly Ala Val Lys Gly Phe Leu His Val
1               5                   10

<210> SEQ ID NO 2
<211> LENGTH: 10
<212> TYPE: PRT
<213> ORGANISM: Artificial Sequence
<220> FEATURE:
<223> OTHER INFORMATION: Description of Artificial Sequence: Synthetic peptide

<400> SEQUENCE: 2

Lys Thr Arg Gln Gly Val Asp Asp Ala Phe

```
<210> SEQ ID NO 3
<211> LENGTH: 149
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Met Ala Asp Gln Leu Thr Glu Glu Gln Ile Ala Glu Phe Lys Glu Ala
1               5                   10                  15

Phe Ser Leu Phe Asp Lys Asp Gly Asp Gly Thr Ile Thr Thr Lys Glu
            20                  25                  30

Leu Gly Thr Val Met Arg Ser Leu Gly Gln Asn Pro Thr Glu Ala Glu
        35                  40                  45

Leu Gln Asp Met Ile Asn Glu Val Asp Ala Asp Gly Asn Gly Thr Ile
    50                  55                  60

Asp Phe Pro Glu Phe Leu Thr Met Met Ala Arg Lys Met Lys Asp Thr
65                  70                  75                  80

Asp Ser Glu Glu Glu Ile Arg Glu Ala Phe Arg Val Phe Asp Lys Asp
                85                  90                  95

Gly Asn Gly Tyr Ile Ser Ala Ala Glu Leu Arg His Val Met Thr Asn
            100                 105                 110

Leu Gly Glu Lys Leu Thr Asp Glu Glu Val Asp Glu Met Ile Arg Glu
        115                 120                 125

Ala Asp Ile Asp Gly Asp Gly Gln Val Asn Tyr Glu Glu Phe Val Gln
    130                 135                 140

Met Met Thr Ala Lys
145

<210> SEQ ID NO 4
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Glu Glu Glu Glu Glu Glu
1               5

<210> SEQ ID NO 5
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Gly Ala Pro Val Pro Tyr Pro Asp Pro Leu Glu Pro Arg
1               5                   10

<210> SEQ ID NO 6
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 6

Asp Tyr Lys Asp Asp Asp Lys
1               5

<210> SEQ ID NO 7
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Tyr Pro Tyr Asp Val Pro Asp Tyr Ala
1               5

<210> SEQ ID NO 8
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 8

His His His His His His
1               5

<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Glu Gln Lys Leu Ile Ser Glu Glu Asp Leu
1               5                   10

<210> SEQ ID NO 10
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Thr Lys Glu Asn Pro Arg Ser Asn Gln Glu Glu Ser Tyr Asp Asp Asn
1               5                   10                  15

Glu Ser

<210> SEQ ID NO 11
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Lys Glu Thr Ala Ala Ala Lys Phe Glu Arg Gln His Met Asp Ser
1               5                   10                  15
```

```
<210> SEQ ID NO 12
<211> LENGTH: 38
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Met Asp Glu Lys Thr Thr Gly Trp Arg Gly Gly His Val Val Glu Gly
1               5                   10                  15

Leu Ala Gly Glu Leu Glu Gln Leu Arg Ala Arg Leu Glu His His Pro
            20                  25                  30

Gln Gly Gln Arg Glu Pro
        35

<210> SEQ ID NO 13
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Ser Leu Ala Glu Leu Leu Asn Ala Gly Leu Gly Gly Ser
1               5                   10

<210> SEQ ID NO 14
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Thr Gln Asp Pro Ser Arg Val Gly
1               5

<210> SEQ ID NO 15
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Trp Ser His Pro Gln Phe Glu Lys
1               5

<210> SEQ ID NO 16
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Cys Cys Pro Gly Cys Cys
1               5

<210> SEQ ID NO 17
<211> LENGTH: 14
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 17

Gly Lys Pro Ile Pro Asn Pro Leu Leu Gly Leu Asp Ser Thr
1               5                   10

<210> SEQ ID NO 18
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Tyr Thr Asp Ile Glu Met Asn Arg Leu Gly Lys
1               5                   10

<210> SEQ ID NO 19
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Asp Leu Tyr Asp Asp Asp Asp Lys
1               5

<210> SEQ ID NO 20
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Thr Asp Lys Asp Met Thr Ile Thr Phe Thr Asn Lys Lys Asp Ala Glu
1               5                   10                  15

<210> SEQ ID NO 21
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Ala His Ile Val Met Val Asp Ala Tyr Lys Pro Thr Lys
1               5                   10

<210> SEQ ID NO 22
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Lys Leu Gly Asp Ile Glu Phe Ile Lys Val Asn Lys
1               5                   10
```

<210> SEQ ID NO 23
<211> LENGTH: 83
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Ala Ala Ala Glu Ile Ser Gly His Ile Val Arg Ser Pro Met Val Gly
1               5                   10                  15

Thr Phe Tyr Arg Thr Pro Ser Pro Asp Ala Lys Ala Phe Ile Glu Val
            20                  25                  30

Gly Gln Lys Val Asn Val Gly Asp Thr Leu Cys Ile Val Glu Ala Met
        35                  40                  45

Lys Met Met Asn Gln Ile Glu Ala Asp Lys Ser Gly Thr Val Lys Ala
    50                  55                  60

Ile Leu Val Glu Ser Gly Gln Pro Val Glu Phe Asp Glu Pro Leu Val
65                  70                  75                  80

Val Ile Glu

<210> SEQ ID NO 24
<211> LENGTH: 232
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

Met Ser Pro Ile Leu Gly Tyr Trp Lys Ile Lys Gly Leu Val Gln Pro
1               5                   10                  15

Thr Arg Leu Leu Leu Glu Tyr Leu Glu Glu Lys Tyr Glu Glu His Leu
            20                  25                  30

Tyr Glu Arg Asp Glu Gly Asp Lys Trp Arg Asn Lys Lys Phe Glu Leu
        35                  40                  45

Gly Leu Glu Phe Pro Asn Leu Pro Tyr Tyr Ile Asp Gly Asp Val Lys
    50                  55                  60

Leu Thr Gln Ser Met Ala Ile Ile Arg Tyr Ile Ala Asp Lys His Asn
65                  70                  75                  80

Met Leu Gly Gly Cys Pro Lys Glu Arg Ala Glu Ile Ser Met Leu Glu
                85                  90                  95

Gly Ala Val Leu Asp Ile Arg Tyr Gly Val Ser Arg Ile Ala Tyr Ser
            100                 105                 110

Lys Asp Phe Glu Thr Leu Lys Val Asp Phe Leu Ser Lys Leu Pro Glu
        115                 120                 125

Met Leu Lys Met Phe Glu Asp Arg Leu Cys His Lys Thr Tyr Leu Asn
    130                 135                 140

Gly Asp His Val Thr His Pro Asp Phe Met Leu Tyr Asp Ala Leu Asp
145                 150                 155                 160

Val Val Leu Tyr Met Asp Pro Met Cys Leu Asp Ala Phe Pro Lys Leu
                165                 170                 175

Val Cys Phe Lys Lys Arg Ile Glu Ala Ile Pro Gln Ile Asp Lys Tyr
            180                 185                 190

Leu Lys Ser Ser Lys Tyr Ile Ala Trp Pro Leu Gln Gly Trp Gln Ala
        195                 200                 205

Thr Phe Gly Gly Gly Asp His Pro Pro Lys Ser Asp Leu Val Pro Arg
    210                 215                 220

Gly Ser Pro Gly Ile His Arg Asp
225                 230

<210> SEQ ID NO 25
<211> LENGTH: 239
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys
225                 230                 235

<210> SEQ ID NO 26
<211> LENGTH: 387
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Met Lys Ile Glu Glu Gly Lys Leu Val Ile Trp Ile Asn Gly Asp Lys
1               5                   10                  15

Gly Tyr Asn Gly Leu Ala Glu Val Gly Lys Lys Phe Glu Lys Asp Thr
            20                  25                  30

```
Gly Ile Lys Val Thr Val Glu His Pro Asp Lys Leu Glu Lys Phe
             35                  40                  45

Pro Gln Val Ala Ala Thr Gly Asp Gly Pro Asp Ile Ile Phe Trp Ala
 50                  55                  60

His Asp Arg Phe Gly Gly Tyr Ala Gln Ser Gly Leu Leu Ala Glu Ile
 65                  70                  75                  80

Thr Pro Asp Lys Ala Phe Gln Asp Lys Leu Tyr Pro Phe Thr Trp Asp
                 85                  90                  95

Ala Val Arg Tyr Asn Gly Lys Leu Ile Ala Tyr Pro Ile Ala Val Glu
            100                 105                 110

Ala Leu Ser Leu Ile Tyr Asn Lys Asp Leu Leu Pro Asn Pro Pro Lys
            115                 120                 125

Thr Trp Glu Glu Ile Pro Ala Leu Asp Lys Glu Leu Lys Ala Lys Gly
130                 135                 140

Lys Ser Ala Leu Met Phe Asn Leu Gln Glu Pro Tyr Phe Thr Trp Pro
145                 150                 155                 160

Leu Ile Ala Ala Asp Gly Gly Tyr Ala Phe Lys Tyr Glu Asn Gly Lys
                165                 170                 175

Tyr Asp Ile Lys Asp Val Gly Val Asp Asn Ala Gly Ala Lys Ala Gly
            180                 185                 190

Leu Thr Phe Leu Val Asp Leu Ile Lys Asn Lys His Met Asn Ala Asp
            195                 200                 205

Thr Asp Tyr Ser Ile Ala Glu Ala Ala Phe Asn Lys Gly Glu Thr Ala
210                 215                 220

Met Thr Ile Asn Gly Pro Trp Ala Trp Ser Asn Ile Asp Thr Ser Lys
225                 230                 235                 240

Val Asn Tyr Gly Val Thr Val Leu Pro Thr Phe Lys Gly Gln Pro Ser
                245                 250                 255

Lys Pro Phe Val Gly Val Leu Ser Ala Gly Ile Asn Ala Ala Ser Pro
            260                 265                 270

Asn Lys Glu Leu Ala Lys Glu Phe Leu Glu Asn Tyr Leu Leu Thr Asp
            275                 280                 285

Glu Gly Leu Glu Ala Val Asn Lys Asp Lys Pro Leu Gly Ala Val Ala
290                 295                 300

Leu Lys Ser Tyr Glu Glu Leu Ala Lys Asp Pro Arg Ile Ala Ala
305                 310                 315                 320

Thr Met Glu Asn Ala Gln Lys Gly Glu Ile Met Pro Asn Ile Pro Gln
                325                 330                 335

Met Ser Ala Phe Trp Tyr Ala Val Arg Thr Ala Val Ile Asn Ala Ala
            340                 345                 350

Ser Gly Arg Gln Thr Val Asp Glu Ala Leu Lys Asp Ala Gln Thr Asn
            355                 360                 365

Ser Ser Ser Asn Asn Asn Asn Asn Asn Asn Asn Asn Leu Gly Ile
370                 375                 380

Glu Gly Arg
385

<210> SEQ ID NO 27
<211> LENGTH: 609
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27
```

```
Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
                100                 105                 110

Asp Cys Cys Ala Lys Gln Glu Pro Glu Arg Asn Glu Cys Phe Leu Gln
            115                 120                 125

His Lys Asp Asp Asn Pro Asn Leu Pro Arg Leu Val Arg Pro Glu Val
            130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
                180                 185                 190

Cys Gln Ala Ala Asp Lys Ala Ala Cys Leu Leu Pro Lys Leu Asp Glu
            195                 200                 205

Leu Arg Asp Glu Gly Lys Ala Ser Ser Ala Lys Gln Gly Leu Lys Cys
210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
                260                 265                 270

Asp Leu Leu Glu Cys Ala Asp Asp Arg Ala Asp Leu Ala Lys Tyr Ile
            275                 280                 285

Cys Glu Asn Gln Asp Ser Ile Ser Ser Lys Leu Lys Glu Cys Cys Glu
            290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Gly Ser
                325                 330                 335

Lys Asp Val Cys Lys Asn Tyr Ala Glu Ala Lys Asp Val Phe Leu Gly
                340                 345                 350

Met Phe Leu Tyr Glu Tyr Ala Arg Arg His Pro Asp Tyr Ser Val Val
            355                 360                 365

Leu Leu Leu Arg Leu Ala Lys Thr Tyr Glu Thr Thr Leu Glu Lys Cys
370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415
```

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
        435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Cys Leu Ser Val Phe
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Gly Arg Pro Cys Phe
            500                 505                 510

Ser Ala Leu Glu Val Asp Glu Thr Tyr Val Pro Lys Glu Phe Asn Ala
        515                 520                 525

Glu Thr Phe Thr Phe His Ala Asp Ile Cys Thr Leu Ser Glu Lys Glu
    530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
        595                 600                 605

Leu

<210> SEQ ID NO 28
<211> LENGTH: 232
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Glu Pro Lys Ser Cys Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Glu Glu Met Thr
    130                 135                 140

Lys Asn Gln Val Ser Leu Thr Cys Leu Val Lys Gly Phe Tyr Pro Ser
145                 150                 155                 160

```
Asp Ile Ala Val Glu Trp Glu Ser Asn Gly Gln Pro Glu Asn Asn Tyr
            165                 170                 175

Lys Thr Thr Pro Pro Val Leu Asp Ser Asp Gly Ser Phe Phe Leu Tyr
        180                 185                 190

Ser Lys Leu Thr Val Asp Lys Ser Arg Trp Gln Gln Gly Asn Val Phe
    195                 200                 205

Ser Cys Ser Val Met His Glu Ala Leu His Asn His Tyr Thr Gln Lys
210                 215                 220

Ser Leu Ser Leu Ser Pro Gly Lys
225                 230

<210> SEQ ID NO 29
<211> LENGTH: 42
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 29
augaagaccc agcugggcgc cgugaagggc uuccugcacg ug                          42

<210> SEQ ID NO 30
<211> LENGTH: 15
<212> TYPE: PRT
<213> ORGANISM: Arabidopsis thaliana

<400> SEQUENCE: 30

Met Lys Ile Ala Leu Gly Ala Ala Lys Gly Leu Ser Phe Leu His
1               5                   10                  15

<210> SEQ ID NO 31
<211> LENGTH: 15
<212> TYPE: PRT
<213> ORGANISM: Arabidopsis thaliana

<400> SEQUENCE: 31

Met Lys Ile Ala Leu Gly Ala Ala Lys Gly Leu Ala Phe Leu His
1               5                   10                  15

<210> SEQ ID NO 32
<211> LENGTH: 15
<212> TYPE: PRT
<213> ORGANISM: Oryza sativa

<400> SEQUENCE: 32

Met Lys Ile Ala Leu Gly Ala Ala Lys Gly Leu Ala Phe Leu His
1               5                   10                  15

<210> SEQ ID NO 33
<211> LENGTH: 12
<212> TYPE: PRT
<213> ORGANISM: Drosophila melanogaster

<400> SEQUENCE: 33

Lys Thr Gln Leu Gly Ala Lys Gly Val Pro Phe Leu
1               5                   10

<210> SEQ ID NO 34
<211> LENGTH: 15
<212> TYPE: PRT
<213> ORGANISM: Arabidopsis thaliana

<400> SEQUENCE: 34
```

```
Met Lys Ile Ala Leu Gly Ala Ala Lys Gly Leu Ala Tyr Leu His
1               5                   10                  15

<210> SEQ ID NO 35
<211> LENGTH: 15
<212> TYPE: PRT
<213> ORGANISM: Arabidopsis thaliana

<400> SEQUENCE: 35

Met Met Ile Ala Leu Gly Ala Ala Lys Gly Leu Ala Phe Leu His
1               5                   10                  15

<210> SEQ ID NO 36
<211> LENGTH: 15
<212> TYPE: PRT
<213> ORGANISM: Arabidopsis thaliana

<400> SEQUENCE: 36

Met Lys Val Ala Ile Gly Ala Ala Lys Gly Leu Thr Phe Leu His
1               5                   10                  15

<210> SEQ ID NO 37
<211> LENGTH: 15
<212> TYPE: PRT
<213> ORGANISM: Arabidopsis thaliana

<400> SEQUENCE: 37

Met Lys Ile Ala Leu Asp Ala Ala Lys Gly Leu Ala Phe Leu His
1               5                   10                  15

<210> SEQ ID NO 38
<211> LENGTH: 16
<212> TYPE: PRT
<213> ORGANISM: Loxodonta africana

<400> SEQUENCE: 38

Leu Lys Thr Glu Leu Gly Val Ser Arg Val Lys Ser Phe Leu Pro Val
1               5                   10                  15

<210> SEQ ID NO 39
<211> LENGTH: 16
<212> TYPE: PRT
<213> ORGANISM: Echinops telfairi

<400> SEQUENCE: 39

Leu Lys Thr Glu Leu Gly Val Ser Arg Val Lys Ser Phe Leu Pro Val
1               5                   10                  15

<210> SEQ ID NO 40
<211> LENGTH: 15
<212> TYPE: PRT
<213> ORGANISM: Arabidopsis thaliana

<400> SEQUENCE: 40

Met Lys Ile Ala Phe Gly Ala Ala Lys Gly Leu Ala Phe Leu His
1               5                   10                  15

<210> SEQ ID NO 41
<211> LENGTH: 15
<212> TYPE: PRT
<213> ORGANISM: Arabidopsis thaliana

<400> SEQUENCE: 41

Met Lys Val Ala Val Gly Ala Ala Lys Gly Leu Thr Phe Leu His
```

```
1               5                  10                 15
```

<210> SEQ ID NO 42
<211> LENGTH: 15
<212> TYPE: PRT
<213> ORGANISM: Muntiacus muntjak

<400> SEQUENCE: 42

```
Lys Thr Glu Leu Gly Val Ser Arg Val Lys Ser Phe Leu Pro Val
1               5                  10                 15
```

<210> SEQ ID NO 43
<211> LENGTH: 15
<212> TYPE: PRT
<213> ORGANISM: Muntiacus reevesi

<400> SEQUENCE: 43

```
Lys Thr Glu Leu Gly Val Ser Arg Val Lys Ser Phe Leu Pro Val
1               5                  10                 15
```

<210> SEQ ID NO 44
<211> LENGTH: 15
<212> TYPE: PRT
<213> ORGANISM: Aotus nancymaae

<400> SEQUENCE: 44

```
Lys Thr Glu Leu Gly Val Ser Arg Val Lys Ser Phe Leu Pro Val
1               5                  10                 15
```

<210> SEQ ID NO 45
<211> LENGTH: 15
<212> TYPE: PRT
<213> ORGANISM: Rattus norvegicus

<400> SEQUENCE: 45

```
Lys Thr Glu Leu Gly Val Ser Arg Val Lys Ser Phe Leu Pro Val
1               5                  10                 15
```

<210> SEQ ID NO 46
<211> LENGTH: 15
<212> TYPE: PRT
<213> ORGANISM: Saimiri boliviensis

<400> SEQUENCE: 46

```
Lys Thr Glu Leu Gly Val Ser Arg Val Lys Ser Phe Leu Pro Val
1               5                  10                 15
```

<210> SEQ ID NO 47
<211> LENGTH: 15
<212> TYPE: PRT
<213> ORGANISM: Callithrix jacchus

<400> SEQUENCE: 47

```
Lys Thr Glu Leu Gly Val Ser Arg Val Lys Ser Phe Leu Pro Val
1               5                  10                 15
```

<210> SEQ ID NO 48
<211> LENGTH: 15
<212> TYPE: PRT
<213> ORGANISM: Chlorocebus aethiops

<400> SEQUENCE: 48

```
Lys Thr Glu Leu Gly Val Ser Arg Val Lys Ser Phe Leu Pro Val
1               5                  10                 15
```

<210> SEQ ID NO 49
<211> LENGTH: 15
<212> TYPE: PRT
<213> ORGANISM: Homo sapiens

<400> SEQUENCE: 49

Lys Thr Glu Leu Gly Val Ser Arg Val Lys Ser Phe Leu Pro Val
1               5                   10                  15

<210> SEQ ID NO 50
<211> LENGTH: 15
<212> TYPE: PRT
<213> ORGANISM: Plecturocebus moloch

<400> SEQUENCE: 50

Lys Thr Glu Leu Gly Val Ser Arg Val Lys Ser Phe Leu Pro Val
1               5                   10                  15

<210> SEQ ID NO 51
<211> LENGTH: 15
<212> TYPE: PRT
<213> ORGANISM: Colobus guereza

<400> SEQUENCE: 51

Lys Thr Glu Leu Gly Val Ser Arg Val Lys Ser Phe Leu Pro Val
1               5                   10                  15

<210> SEQ ID NO 52
<211> LENGTH: 15
<212> TYPE: PRT
<213> ORGANISM: Gorilla gorilla

<400> SEQUENCE: 52

Lys Thr Glu Leu Gly Val Ser Arg Val Lys Ser Phe Leu Pro Val
1               5                   10                  15

<210> SEQ ID NO 53
<211> LENGTH: 15
<212> TYPE: PRT
<213> ORGANISM: Nomascus leucogenys

<400> SEQUENCE: 53

Lys Thr Glu Leu Gly Val Ser Arg Val Lys Ser Phe Leu Pro Val
1               5                   10                  15

<210> SEQ ID NO 54
<211> LENGTH: 15
<212> TYPE: PRT
<213> ORGANISM: Pongo abelii

<400> SEQUENCE: 54

Lys Thr Glu Leu Gly Val Ser Arg Val Lys Ser Phe Leu Pro Val
1               5                   10                  15

<210> SEQ ID NO 55
<211> LENGTH: 15
<212> TYPE: PRT
<213> ORGANISM: Papio anubis

<400> SEQUENCE: 55

Lys Thr Glu Leu Gly Val Ser Arg Val Lys Ser Phe Leu Pro Val
1               5                   10                  15

<210> SEQ ID NO 56

```
<210> SEQ ID NO 56
<211> LENGTH: 15
<212> TYPE: PRT
<213> ORGANISM: Oryctolagus cuniculus

<400> SEQUENCE: 56

Lys Thr Glu Leu Gly Val Ser Arg Val Lys Ser Phe Leu Pro Val
1               5                   10                  15

<210> SEQ ID NO 57
<211> LENGTH: 15
<212> TYPE: PRT
<213> ORGANISM: Equus caballus

<400> SEQUENCE: 57

Lys Thr Glu Leu Gly Val Ser Arg Val Lys Ser Phe Leu Pro Val
1               5                   10                  15

<210> SEQ ID NO 58
<211> LENGTH: 12
<212> TYPE: PRT
<213> ORGANISM: Azorhizobium caulinodans

<400> SEQUENCE: 58

Met Arg Thr Ala Glu Ala Ala Val Lys Gly Phe Leu
1               5                   10

<210> SEQ ID NO 59
<211> LENGTH: 15
<212> TYPE: PRT
<213> ORGANISM: Arabidopsis thaliana

<400> SEQUENCE: 59

Leu Lys Val Ala Leu Gly Ala Ala Lys Gly Leu Ala Phe Leu His
1               5                   10                  15

<210> SEQ ID NO 60
<211> LENGTH: 247
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 60
catagacatc tggagaatga tactgttttt tcctagggct gggatggggg tggtatccct      60
cacatcgaag gaggcgggtg gatcacgagg tcagctggcc tttctctatg cagacccaat     120
accacctaga tccttctgct cagcgtgggc tagtgctgtg aattcattca ttcactcatg     180
gaagcatgtt gatttctatc acctaccagc ccatcaagta ggtgctaggg atatagcaaa     240
taagcca                                                              247

<210> SEQ ID NO 61
<211> LENGTH: 217
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 61
ggtggcattt aatgagcacc ctctgtgtgg ttggcgtgat gctgggtgcc tggggagac      60 agatggaact aaagaggtcc ttcctggaag cctttgtaat ttttttataaa acaaatttt    120 ctttacttct ataattcccc tgatactata ctcatcttag gggcttagaa ttaaataatc    180
```
tttacatacc tggctcagtt gtgacctcct ccaggaa                                      217

<210> SEQ ID NO 62
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 62

Ala Pro Ser Val Trp Leu Ala
1               5

<210> SEQ ID NO 63
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 63

Cys Trp Val Pro Gly Gly Asp Arg Trp Asn
1               5                   10

<210> SEQ ID NO 64
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 64

Arg Gly Pro Ser Trp Lys Pro Leu
1               5

<210> SEQ ID NO 65
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Phe Phe Ile Lys Gln Asn Phe Leu Tyr Phe Tyr Asn Ser Pro Asp Thr
1               5                   10                  15

Ile Leu Ile Leu Gly Ala
            20

<210> SEQ ID NO 66
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Ile Ile Phe Thr Tyr Leu Ala Gln Leu
1               5

<210> SEQ ID NO 67
<211> LENGTH: 5

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 67

Pro Pro Pro Gly Gly
1               5
```

METHODS AND COMPOSITIONS FOR TREATING MYC-DRIVEN CANCERS

CROSS REFERENCE

This application is the U.S. National Stage application of International Patent Application No. PCT/US2020/051626, filed on Sep. 18, 2020, and claims the benefit of U.S. Provisional Application No. 62/902,890, filed on Sep. 19, 2019; all of which are incorporated herein by reference in their entireties.

STATEMENT AS TO FEDERALLY SPONSORED RESEARCH

This invention was made with government support under R01 CA200643 awarded by the National Institutes of Health and under W81XWH-17-1-0461 awarded by the Department of Defense. The government has certain rights in the invention.

SEQUENCE LISTING

The instant application contains a Sequence Listing which has been submitted electronically in ASCII format and is hereby incorporated by reference in its entirety. Said ASCII copy, created on Sep. 23, 2022, is named "42256-756-831-SL_ST25" and is 32,000 bytes in size.

BACKGROUND OF THE DISCLOSURE

MYC is a proto-oncogene that is overexpressed in many human cancers. It plays an important role in many biological pathways related to neoplastic cell growth and proliferation. New and effective ways are required to target Myc for cancer therapeutics.

SUMMARY OF THE DISCLOSURE

In some embodiments, disclosed herein are compositions comprising a synthetic nucleic acid sequence encoding a Plasmacytoma variant translocation 1_217 (PVT1_217) splice variant micropeptide, comprising an amino acid sequence having at least 80% sequence identity to the sequence set forth in SEQ ID NO: 1. In some embodiments, the PVT1_217 splice variant micropeptide is at least 12 amino acids in length. In some embodiments, the PVT1_217 splice variant micropeptide is at least 13 amino acids in length. In some embodiments, the PVT1_217 splice variant micropeptide is at least 14 amino acids in length. In some embodiments, disclosed herein are compositions comprising a synthetic nucleic acid sequence encoding a Plasmacytoma variant translocation 1_217 (PVT1_217) splice variant micropeptide, comprising an amino acid sequence having at least 80% sequence identity to the sequence set forth in SEQ ID NO: 1, wherein the PVT1_217 splice variant micropeptide comprises at least 10 contiguous amino acids that are identical to a peptide encoded by a short open reading frame (shORF) located at the junction of Exon 3 and Exon 4 of human PVT1_217. In some embodiments, the PVT1_217 splice variant micropeptide comprises a maximum of 14 contiguous amino acids that are identical to a peptide encoded by a short open reading frame (shORF) located at the junction of Exon 3 and Exon 4 of human PVT1_217. In some embodiments, the nucleic acid is DNA. In some embodiments, the nucleic acid is a messenger RNA. In some embodiments, the synthetic nucleic acid comprises one or more modified nucleotides. In some embodiments, the synthetic nucleic acid sequence encoding a PVT1_217 splice variant micropeptide is comprised in a vector.

In some embodiments, disclosed herein are vectors comprising: a nucleic acid sequence encoding a PVT1_217 splice variant micropeptide, wherein the PVT1_217 splice variant micropeptide is at least 12 amino acids in length, and comprises at least 10 contiguous amino acids that are identical to a peptide encoded by a short open reading frame (shORF) located at the junction of Exon 3 and Exon 4 of human PVT1_217. In some embodiments, the nucleic acid sequence encoding a PVT1_217 splice variant micropeptide has least 80% sequence identity to the sequence set forth in SEQ ID NO: 1. In some embodiments, the vector comprises self-replicating RNA vector.

In some embodiments, disclosed herein are pharmaceutical compositions comprising: (i) a synthetic nucleic acid sequence encoding a Plasmacytoma variant translocation 1_217 (PVT1_217) splice variant micropeptide comprising an amino acid sequence having at least 80% sequence identity to the sequence set forth in SEQ ID NO: 1; and (ii) a pharmaceutically acceptable excipient. In some embodiments, the PVT1_217 splice variant micropeptide is at least 12 amino acids in length. In some embodiments, the PVT1_217 splice variant micropeptide is at least 13 amino acids in length. In some embodiments, the PVT1_217 splice variant micropeptide is at least 14 amino acids in length. In some embodiments, the PVT1_217 splice variant micropeptide comprises at least 10 contiguous amino acids that are identical to a peptide encoded by a short open reading frame (shORF) located at the junction of Exon 3 and Exon 4 of human PVT1_217. In some embodiments, the PVT1_217 splice variant micropeptide comprises a maximum of 14 contiguous amino acids that are identical to a peptide encoded by a short open reading frame (shORF) located at the junction of Exon 3 and Exon 4 of human PVT1_217. In some embodiments, the synthetic nucleic acid sequence encoding the PVT1_217 splice variant micropeptide has at least 85%, 90%, 95%, 96%, 97%, 98% or 99% sequence identity to the sequence set forth in SEQ ID NO: 1. In some embodiments, the synthetic nucleic acid is DNA. In some embodiments, the synthetic nucleic acid is a messenger RNA. In some embodiments, the synthetic nucleic acid comprises one or more modified nucleic acids. In some embodiments, the synthetic nucleic acid sequence encoding a PVT1_217 splice variant micropeptide is comprised in a vector. In some embodiments, the vector is a mammalian expression vector. In some embodiments, the vector is a lentiviral expression vector. In some embodiments, the vector comprises a promoter. In some embodiments, the promoter is inducible. In some embodiments, the pharmaceutical compositions disclosed herein further comprise a cancer cell targeting moiety.

In some embodiments, disclosed herein are methods for treating a subject having a MYC-driven cancer, the method comprising: administering to the subject a pharmaceutical composition comprising a nucleic acid sequence encoding a PVT1_217 splice variant micropeptide, comprising an amino acid sequence having at least 80% sequence identity to the sequence set forth in SEQ ID NO: 1. In some embodiments, the nucleic acid sequence encoding the PVT1_217 splice variant micropeptide comprises a sequence set forth in SEQ ID NO: 1. In some embodiments, the PVT1_217 splice variant micropeptide comprises 14 amino acids. In some embodiments, the PVT1_217 splice variant micropeptide comprises at least 10 contiguous amino acids that are identical to a peptide encoded by a short open reading frame (shORF) located at the junction of Exon 3 and Exon 4 of human PVT1_217. In some embodiments, the pharmaceutical composition results in reduction in cancer cell division.

Provided herein is an isolated peptide comprising an amino acid sequence of SEQ ID NO: 1, or a sequence having at least 80% identity to SEQ ID NO: 1. In some embodiments, the isolated peptide may comprise the amino acid sequence is at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% identical to SEQ ID NO: 1.

In some embodiments, the amino acid sequence is at least 12 amino acids in length. In some embodiments, the amino acid sequence is at least 13 amino acids in length. In some embodiments, the amino acid sequence is at least 14 amino acids in length. In some embodiments, the peptide comprises at least 10 contiguous amino acids that are identical to a peptide encoded by a short open reading frame (shORF) located at a junction of Exon 3 and Exon 4 of human PVT1_217. In some embodiments, the peptide comprises a maximum of 14 contiguous amino acids that are identical to a peptide encoded by a short open reading frame (shORF) located at the junction of Exon 3 and Exon 4 of human PVT1_217. In some embodiments, the amino acid sequence comprises at least 1 conservative amino acid substitution within the sequence of SEQ ID NO: 1. In some embodiments, the amino acid sequence comprises at least 2 conservative amino acid substitution within the sequence of SEQ ID NO: 1. In some embodiments, the amino acid sequence comprises at least 3 conservative amino acid substitution within the sequence of SEQ ID NO: 1. In some embodiments, the amino acid sequence comprises at least 4 conservative amino acid substitution within the sequence of SEQ ID NO: 1. In some embodiments, the amino acid sequence comprises at least 5 conservative amino acid substitution within the sequence of SEQ ID NO: 1. In some embodiments, the isolated peptide has an amino acid sequence of SEQ ID NO:1.

Provided herein is a pharmaceutical composition comprising: a Plasmacytoma variant translocation 1_217 (PVT1_217) splice variant micropeptide comprising an amino acid sequence having at least 80% sequence identity to the sequence set forth in SEQ ID NO: 1; and, a pharmaceutically acceptable excipient.

In some embodiments, the PVT1_217 splice variant micropeptide is at least 12 amino acids in length. In some embodiments, the PVT1_217 splice variant micropeptide is at least 13 amino acids in length. In some embodiments, the PVT1_217 splice variant micropeptide is at least 14 amino acids in length.

In some embodiments, the PVT1_217 splice variant micropeptide comprises at least 10 contiguous amino acids that are identical to a peptide encoded by a short open reading frame (shORF) located at the junction of Exon 3 and Exon 4 of human PVT1_217. In some embodiments, the PVT1_217 splice variant micropeptide comprises a maximum of 14 contiguous amino acids that are identical to a peptide encoded by a short open reading frame (shORF) located at the junction of Exon 3 and Exon 4 of human PVT1_217.

In some embodiments, the micropeptide is at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% identical to SEQ ID NO: 1. In some embodiments, the micropeptide has a sequence of SEQ ID NO:1.

In some embodiments, the micropeptide comprises at least 1 conservative amino acid substitution within the sequence of SEQ ID NO: 1. In some embodiments, the micropeptide comprises at least 2 conservative amino acid substitution within the sequence of SEQ ID NO: 1. In some embodiments, the micropeptide comprises at least 3 conservative amino acid substitution within the sequence of SEQ ID NO: 1. In some embodiments, the micropeptide comprises at least 4 conservative amino acid substitution within the sequence of SEQ ID NO: 1. In some embodiments, the micropeptide comprises at least 5 conservative amino acid substitution within the sequence of SEQ ID NO: 1.

In some embodiments, the micropeptide is further conjugated with one or more biomolecules. In some embodiments, the biomolecule is a peptide. In some embodiments, the biomolecule is a lipid. In some embodiments, the micropeptide is further modified. In some embodiments, the modification is selected from the group consisting of: myristoylation, palmitoylation, isoprenylation, glypiation, lipolation, acylation, alkylation, amidation, phosphorylation, glycation, biotinylation, pegylation, sumoylation, ubiquitination, neddylation, or pupylation. In some embodiments, the pharmaceutical composition comprises a recombinant protein comprising the micropeptide described herein, having at least 80% sequence identity to SEQ ID NO:1.

In some embodiments, the peptide is associated with a carrier molecule. In some embodiments, the carrier molecule is a lipid.

In some embodiments, the pharmaceutical composition described herein is for use in preparing a medicament for the treatment of a cancer in a subject.

Provided herein is a method of treating cancer in a subject in need thereof, the method comprising: administering to the subject a pharmaceutical composition comprising a micropeptide having a sequence of SEQ ID NO: 1, or a sequence that is at least 80% identical to SEQ ID NO: 1.

In some embodiments, the cancer is a MYC-driven cancer.

Provided herein is the use of a composition comprising a Plasmacytoma variant translocation 1_217 (PVT1_217) splice variant micropeptide comprising an amino acid sequence having at least 80% sequence identity to the sequence set forth in SEQ ID NO: 1 in the treatment of a cancer in a subject.

Also provided herein is the use of a composition comprising a nucleic acid encoding Plasmacytoma variant translocation 1_217 (PVT1_217) splice variant micropeptide comprising an amino acid sequence having at least 80% sequence identity to the sequence set forth in SEQ ID NO: 1 in the treatment of a cancer in a subject.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 9A-B depict representative data indicating the effect of HNB expression on cell proliferation in Doxycyclin-inducible GFP expressing transduced cell lines MSTO-211H-HNB$^i$ (FIG. 9A) and U2OS-HNB$^i$ (FIG. 9B).

FIG. 11A (left) depicts the crystal structure of the human KRas dimer (id 4TQA in protein database), FIG. 11B (right) depicts the molecular docking of HNB (yellow, in center) between the KRas dimers.

DETAILED DESCRIPTION

Figure 1:
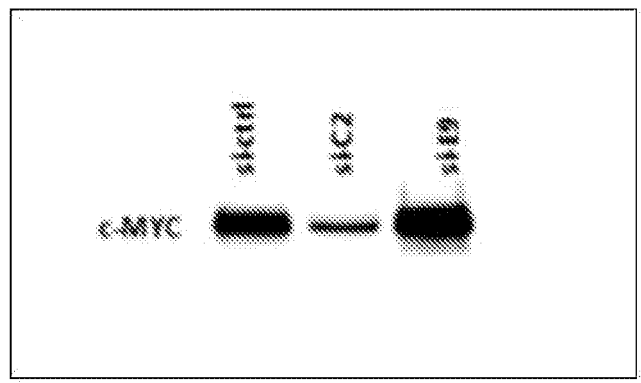
FIG. 1 is a data from a western blot depicting the effect of siRNA E9 on c-Myc protein expression level in the MSTO-211H cell line (from left to right: si-ctrl, si-C2, and si-E9).

Myc (avian myelocytomatosis viral oncogene homolog) is a transcription factor encoded by the oncogene MYC, and is associated with various cancers. It is estimated to contribute to at least 75% of all human cancers, including prostate, breast, colon and cervical cancers, myeloid leukemia, lymphomas, small-cell lung carcinomas, and neuroblastoma, among others. High expression of Myc can drive tumorigenesis in several tissue types. Myc is also associated with treatment resistant and lethal outcomes. The present disclosure is related to a novel finding that Myc driven cell proliferative function can be inhibited by the micropeptides disclosed and described herein, and that the micropeptides can be used for therapeutic intervention in Myc-associated cancers.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The term "about" or "approximately" means within an acceptable error range for the particular value as determined by one of ordinary skill in the art, which will depend in part on how the value is measured or determined, e.g., the limitations of the measurement system. For example, "about" can mean within 1 or more than 1 standard deviation, per the practice in the given value. Where particular values are described in the application and claims, unless otherwise stated the term "about" should be assumed to mean an acceptable error range for the particular value.

The terms "individual," "patient," or "subject" are used interchangeably. None of the terms require or are limited to situation characterized by the supervision (e.g. constant or intermittent) of a health care worker (e.g. a doctor, a registered nurse, a nurse practitioner, a physician's assistant, an orderly, or a hospice worker).

The term "gene," as used herein, refers to a segment of nucleic acid that encodes an individual protein or RNA (also referred to as a "coding sequence" or "coding region"), optionally together with associated regulatory regions such as promoters, operators, terminators and the like, which may be located upstream or downstream of the coding sequence. As used herein, the term "polypeptide" encompasses amino acid molecule sequences comprising at least one of the 20 common amino acids in naturally synthesized proteins, or at least one modified or unusual amino acid, including but not limited to chemically modified amino acids such as amino acid analogs, naturally occurring non-protogenic amino acids such as norleucine, and chemically synthesized compounds having properties known in the art to be characteristic of an amino acid. In some embodiments, the at least one modified or unusual amino acid is selected from the group consisting of 2-aminoadipic acid; 3-aminoadipic acid; beta-alanine, beta-amino-propionic acid; 2-aminobutyric acid; 4-aminobutyric acid, piperidinic acid; 6-aminocaproic acid; 2-aminoheptanoic acid; 2-aminoisobutyric acid; 3-aminoisobutyric acid; 2-aminopimelic acid; 2,4-diaminobutyric acid; desmosine; 2,2'-diaminopimelic acid; 2,3-diaminopropionic acid; N-ethylasparagine; hydroxylysine; allo-hydroxyline; 3-hydroxyproline; 4-hydroxyproline; isodemosine; allo-isoleucine; N-methylglycine, sarcosine; N-methylisoleucine; 6-N-methyllysine; N-methylvaline; norvaline; norleucine; and ornithine.

The terms "polypeptide," "protein," and "peptide" also encompass amino acid sequence variants of a protein or peptide. Amino acid sequence variants of the HNB polypeptides disclosed herein can be substitutional, insertional or deletion variants. Deletion variants lack one or more residues of the native protein that are not essential for function or immunogenic activity, as exemplified by variants of integral membrane proteins that lack a transmembrane sequence. Another common type of deletion variant is one lacking secretory signal sequences or signal sequences directing a protein to bind to a particular part of a cell. Insertional mutants typically involve the addition of material at a non-terminal point in the polypeptide. This may include the insertion of an immunoreactive epitope or simply a single residue. Substitutional variants typically contain the exchange of one amino acid for another at one or more sites within the polypeptide, and may be designed to modulate one or more properties of the polypeptide, such as stability against proteolytic cleavage, without the loss of other functions or properties. Substitutions of this kind preferably are conservative, that is, one amino acid is replaced with one of similar shape and charge. Conservative substitutions are well known in the art and include, for example, the changes of: alanine to serine; arginine to lysine; asparagine to glutamine or histidine; aspartate to glutamate; cysteine to serine; glutamine to asparagine; glutamate to aspartate; glycine to proline; histidine to asparagine or glutamine; isoleucine to leucine or valine; leucine to valine or isoleucine; lysine to arginine; methionine to leucine or isoleucine; phenylalanine to tyrosine, leucine or methionine; serine to threonine; threonine to serine; tryptophan to tyrosine; tyrosine to tryptophan or phenylalanine; and valine to isoleucine or leucine. As disclosed herein, sequences that have between about 70% and about 80%, or between about 81% and 90% or between about 91% and about 99% of amino acids that are identical or functionally equivalent to the amino acids of the HNB polypeptides disclosed herein are considered biologically functionally equivalent, provided the biological activity of the HNB polypeptide is maintained, and within the scope of the HNB polypeptides disclosed herein.

The terms "treat," "treating," and "treatment" is meant to include alleviating or abrogating a disorder, disease, or condition; or one or more of the symptoms associated with the disorder, disease, or condition; or alleviating or eradicating the cause(s) of the disorder, disease, or condition itself. Desirable effects of treatment can include, but are not limited to, preventing occurrence or recurrence of disease, alleviation of symptoms, diminishing any direct or indirect pathological consequences of the disease, preventing metastasis, decreasing the rate of disease progression, amelioration or palliation of the disease state and remission or improved prognosis.

The term "therapeutically effective amount" refers to the amount of a compound that, when administered, is sufficient to prevent development of, or alleviate to some extent, one or more of the symptoms of the disorder, disease, or condition being treated. The term "therapeutically effective amount" also refers to the amount of a compound that is sufficient to elicit the biological or medical response of a cell, tissue, system, animal, or human that is being sought by a researcher, veterinarian, medical doctor, or clinician.

The term "MYC-driven cancer," refers to a cancer characterized by aberrant (typically augmented expression) expression of the c-MYC gene or the Myc protein. In some embodiments, an individual receiving therapy comprising the HNB polypeptides disclosed herein may be identified as having a susceptibility to a cancer therapy, including e.g., a MYC-dependent susceptibility to a cancer therapy or a KRas-dependent susceptibility to a cancer therapy. A MYC-driven neoplasm having a MYC-dependent susceptibility to a cancer therapy may be more susceptible to the cancer therapy than the corresponding neoplasm that lacks or displays reduced MYC expression (including e.g., where the MYC expression is conditionally controlled). A KRas-driven neoplasm having a KRas-dependent susceptibility to a cancer therapy may be more susceptible to the cancer therapy than the corresponding neoplasm that lacks or displays reduced KRas expression (including e.g., where the KRas expression is conditionally controlled). "Cancer therapy" as used herein, refers to any cancer therapy including but not limited to e.g., radiation therapy, chemotherapy, immunotherapy, and the like.

Myc tightly regulates a broad set of genes essential to growth and proliferation. In turn MYC is also tightly regulated at transcriptional, translational and post-translational levels. Myc levels are controlled by multiple mechanisms, including negative autoregulation, gene expression, mRNA, and protein stability and degradation, which all become deregulated in human cancers.

The MYC gene is found at locus 8q24.21 in a broader region on chromosome 8, which is frequently amplified in cancers. Its two paralogs, N-Myc and L-Myc, which are encoded by MYCN and MYCL genes, were respectively identified in neuroblastoma and lung cancer as tissue-specific factors. Human Myc contains several highly conserved regions that are functionally important and are organized in the same fashion among the three Myc paralogs, including: a largely unstructured N-terminal transactivation domain (TAD) and an intrinsically disordered C-terminal region comprising the basic, helix-loop-helix, leucine zipper (bHLHLZ) dimerization, and DNA-binding domains. Mechanisms that account for Myc deregulation include: amplifications or chromosomal translocations of the MYC locus that provoke its exacerbated expression, MYC mRNA destabilization through both direct and indirect regulatory events, and alteration in Myc protein turnover rate. The latter is due to either alterations in Myc protein stability normally dependent on Myc's phosphorylation status but caused by mutations in key phosphorylation sites or alterations of expression of proteins that are involved in Myc's post-translational modifications.

The human MYC gene is approximately 6 kilobases long. It contains three exons: a large non-coding exon 1, followed by coding exons 2 and 3. There are four distinct promoters, $P_0$, $P_1$, $P_2$, and $P_3$ that drive MYC transcription. There are two major translation start codons (CTG, and ATG), from which two universally expressed Myc proteins arise, and there are two polyadenylation signals and several DNAse 1-hypersensitive sites. $P_0$ transcripts start at multiple initiation sites. $P_1$ and $P_2$ are the two major classical TATA-containing promoter start sites located at the 5' end of exon 1, with greater than three-quarters of MYC transcripts originating from the $P_2$ promoter. The MYC promoter region is regulated by a large number of signaling pathways, transcription factors, cis-regulatory elements, chromatin remodeling, and by its auto-suppression.

Plasmacytoma variant translocation 1 (PVT1) is a 'long non-coding RNA' transcribed from adjacent to the oncogene c-MYC, and has been shown to co-operate with c-Myc by stabilizing its protein product in 8q24 gain cancers. Long noncoding RNAs (lncRNAs) are a class of RNA transcripts which are longer than 200 nucleotides, evolutionarily conserved, and devoid of protein-coding potential. Recently, emerging studies have shown that lncRNAs are frequently deregulated in various tumors and exert multiple functions in a wide range of biological processes, such as proliferation, apoptosis, cell cycle arrest, cell migration and invasion. PVT1 was originally identified as a cluster of breakpoints for viral integration and translocation in T- and B-cell lymphomas. The PVT1 locus is syntenically conserved between the human and mouse. Although PVT1 is a mutational hotspot and frequently overexpressed in cancers, its role in tumorigenesis is poorly understood.

It has been shown that 98% of the 8q24 amplicons in a subset of cancers with 8q24 gain/amplification contain both MYC and PVT1. A tissue microarray analysis of 8 primary tumors (lung, colon, rectum, stomach, esophagus, liver, kidney, and breast) revealed a high correlation between PVT1 RNA and MYC protein expression in these primary tumors. These data provided strong evidence for PVT1/MYC co-operation in different human cancers.

The dependency of MYC-driven cancer cells on PVT1 was examined. The driver mutation in the colorectal cancer cell line HCT116 is a mutant β-catenin gene. A stable β-catenin protein recruits TCF4 to upregulate MYC transcription in these cells. Using the CRISPR/Cas9 system, PVT1 was deleted in these cells. PVT1-deficient HCT116 cells are impaired in their tumorigenic potential compared to their wild-type controls. Importantly, it was noticed ~50% reduction in MYC protein levels in these PVT1-deficient cells. Thus, multiple lines of evidence suggest that PVT1 plays a crucial role in augmenting MYC protein in 8q24 gain cancers. Similarly, a recent study implicates another frequently amplified oncogenic lncRNA called FAL1 at 1q21 in the stabilization of BMI1 in ovarian cancers, suggesting a broader role of lncRNAs in the fine tuning of oncoproteins in cancer. A novel regulation of MYC via the lncRNA PVT1 was identified, at least in cancers where these loci are co-amplified.

PVT1 splice variants can regulate Myc. Targeting PVT1 in 8q24 gain cancers provides a means to target Myc, an otherwise notoriously undruggable candidate in cancers. Disclosed herein is the surprising finding that micro-peptides generated by PVT1, including micro-peptide fusion proteins, acts as a tumor suppressor and reduce Myc level in human cancers.

Micro-peptides (also referred to as micro-proteins) are polypeptides with a length of less than 100-150 amino acids that are encoded by short open reading frames (sORFs). In this respect, they differ from many other active small polypeptides, which are produced through the posttranslational cleavage of larger polypeptides. In terms of size, micro-peptides are considerably shorter than "canonical" proteins, which have an average length of 330 and 449 amino acids in prokaryotes and eukaryotes, respectively. Micro-peptides lack an N-terminal signaling sequences, suggesting that they are likely to be localized to the cytoplasm. However, some micro-peptides have been found in other cell compartments, as indicated by the existence of transmembrane micro-peptides. They are found in both prokaryotes and eukaryotes. The sORFs from which micro-peptides are translated can be encoded in 5' UTRs, small genes, or polycistronic mRNAs.

Described herein are micropeptides that can inhibit Myc expression. In some embodiments, the micropeptides of the present disclosure are encoded by the PVT1 locus. In some embodiments, the micropeptides of the present disclosure are encoded by a splice variant of PVT1 locus. In some embodiments, the micropeptides of the present disclosure are encoded by a splice variant of PVT1 locus, designated as PVT1_217.

The micropeptides disclosed herein in some embodiments, are referred to as HONEYBADGER, HNB, HNB polypeptides, HNB peptides, HNB fragments, HNB polypeptide fragments, HNB micro-peptides, HNB mimetics, or HNB fusion proteins. In some embodiments, HNB is a micro-peptide comprising an amino acid sequence MKTQL-GAVKGFLHV (SEQ ID NO: 1). In some embodiments, HNB is a micro-peptide comprising an amino acid sequence that is 80% identical to SEQ ID NO: 1. In some aspects, the HNB polypeptide comprises a sequence that fits between the dimer interface of KRAS. In some aspects, the HNB polypeptide comprises a sequence that binds at the region of amino acid residues 147 to 156 of KRAS. In some aspects, the HNB polypeptide binds at the region of amino acid residues KTRQGVDDAF (SEQ ID NO:2) of KRAS. In some embodiments, the HNB polypeptide binds part of the region of amino acid residues 147 to 156 of KRAS, such as from 148 to 156, from 149 to 156, from 150 to 156, from 151 to 156, from 152 to 156, from 153 to 156, from 154 to 156, from 155 to 156, from 147 to 155, from 147 to 154, from 147 to 153, from 147 to 152, from 147 to 151, from 147 to 150, from 146 to 149, from 147 to 148, from 154 to 155, from 154 to 156, from 153 to 154, from 153 to 155, from 152 to 156, or from 151 to 156. In some embodiments, the binding of the HNB polypeptide disrupts formation of a salt bridge between residue D154 from a KRAS monomer and R161 from an opposing KRAS monomer. In some embodiments, HNB is a micro-peptide comprising an amino acid sequence that is at least 80% identical to SEQ ID NO:1. In some embodiments, HNB is a micro-peptide comprising an amino acid sequence that is at least 85% identical to SEQ ID NO:1. In some embodiments, HNB is a micro-peptide comprising an amino acid sequence that is at least 90% identical to SEQ ID NO:1. In some embodiments, HNB is a micro-peptide comprising an amino acid sequence that is at least 95% identical to SEQ ID NO:1. In some embodiments, HNB is a micro-peptide comprising an amino acid sequence that is 96% identical to SEQ ID NO:1. In some embodiments, HNB is a micro-peptide comprising an amino acid sequence that is 97% identical to SEQ ID NO: 1. In some embodiments, HNB is a micro-peptide comprising an amino acid sequence that is 98% identical to SEQ ID NO: 1. In some embodiments, HNB is a micro-peptide comprising an amino acid sequence that is 99% identical to SEQ ID NO: 1. In some embodiments, the HNB polypeptides disclosed herein comprise SEQ ID NO:1 with at least one conservative amino acid substitution. In some embodiments, the HNB polypeptides disclosed herein comprise SEQ ID NO:1 with at least two conservative amino acid substitutions. In some embodiments, the HNB polypeptides disclosed herein comprise SEQ ID NO:1 with at least three conservative amino acid substitutions. In some embodiments, the HNB polypeptides disclosed herein comprise SEQ ID NO:1 with at least four conservative amino acid substitution. In some embodiments, the HNB polypeptides disclosed herein comprise SEQ ID NO:1 with at least five conservative amino acid substitutions. In some embodiments, the HNB polypeptides disclosed herein comprise SEQ ID NO:1 with at least six conservative amino acid substitutions. In some embodiments, the HNB polypeptides disclosed herein comprise SEQ ID NO:1 with at least seven conservative amino acid substitution. In some embodiments, the HNB polypeptides disclosed herein comprise SEQ ID NO:1 with at least eight conservative amino acid substitutions. In some embodiments, the HNB polypeptides disclosed herein comprise SEQ ID NO:1 with at least nine conservative amino acid substitutions. In some embodiments, the HNB polypeptides disclosed herein comprise SEQ ID NO:1 with at least ten conservative amino acid substitutions. In some embodiments, disclosed herein are HNB polypeptides comprising SEQ ID NO:1 with 1, 2, 3, 4, 5, 6, 7, 8, 9, or 10 conservative amino acid substitutions in SEQ ID NO: 1. In one aspect, the micropeptide of the present disclosure can be used for a therapeutic or pharmaceutical composition for treating cancer.

In some embodiments, the HNB polypeptides disclosed herein comprise HNB fusion proteins. In some embodiments, HNB fusion proteins comprise a HNB polypeptide and a heterologous polypeptide. In some embodiments, the heterologous polypeptide is selected from the group consisting of calmodulin, polyglutamine, E-tag, FLAG, HA, His, Myc, S-tag, SBP-tag, Softag 1, Softag3, Strep-tag, TC-tag, V5, VSV, Xpress, Isopeptag, SpyTag, SnoopTag, BCCP, GST, GFP, Halo-tag, MBP, Nus-tag, Thioredoxin, albumin, an antibody, Fc domain, and combinations thereof. In some embodiments, the heterologous polypeptide is an Fc domain. In some embodiments, the heterologous polypeptide targets the HNB fusion protein to a specific cell or tissue. In some embodiments, the heterologous polypeptide is fused to the N-terminus of the HNB polypeptide. In some embodiments, the heterologous polypeptide is at the C-terminus of the HNB polypeptide.

In some embodiments, the HNB fusion proteins comprise a HNB polypeptide and an exemplary sequence of a heterologous protein provided in Table 1 below:

TABLE 1

Heterologous Protein Sequences

| Heterologous Protein | Sequence | SEQ ID NO: |
|---|---|---|
| Calmodulin | MADQLTEEQIAEFKEAFSLFDKDGDGTITTKELGT VMRSLGQNPTEAELQDMINEVDADGNGTIDEPEFL TMMARKMKDTDSEEEIREAFRVFDKDGNGYISAAE LRHVMTNLGEKLTDEEVDEMIREADIDGDGQVNYE EFVQMMTAK | 3 |
| Polyglutamine | EEEEEE | 4 |
| E-tag | GAPVPYPDPLEPR | 5 |
| FLAG | DYKDDDDK | 6 |
| HA | YPYDVPDYA | 7 |

TABLE 1-continued

Heterologous Protein Sequences

| Heterologous Protein | Sequence | SEQ ID NO: |
|---|---|---|
| His | HHHHHH | 8 |
| Myc | EQKLISEEDL | 9 |
| NE-tag | TKENPRSNQEESYDDNES | 10 |
| S-tag | KETAAAKFERQHMDS | 11 |
| SBP-tag | MDEKTTGWRGGHVVEGLAGELEQLRARLEH HPQGQREP | 12 |
| Softag 1 | SLAELLNAGLGGS | 13 |
| Softag 3 | TQDPSRVG | 14 |
| Streptag | WSHPQFEK | 15 |
| TC tag | CCPGCC | 16 |
| V5 | GKPIPNPLLGLDST | 17 |
| VSV | YTDIEMNRLGK | 18 |
| Xpress | DLYDDDDK | 19 |
| Isopeptag | TDKDMTITFTNKKDAE | 20 |
| SpyTag | AHIVMVDAYKPTK | 21 |
| SnoopTag | KLGDIEFIKVNK | 22 |
| BCCP | AAAEISGHIVRSPMVGTFYRTPSPDAKAFIEV GQKVNVGDTLCIVEAMKMMNQIEADKSGTVKA ILVESGQPVEFDEPLVVIE | 23 |
| GST | MSPILGWKIKGLVQPTRLLLEYLEEKYE EHLYERDELGGDKWRNKKFELGLEFPN LPYYIDGDVKLTQSMAIIRYIADKHNM GCPKERAEISMLEGAVLDIRYGVSRIA YYSKDFETLKVDFLSKLPEMLKMFEDR LCHKTYLNGDHVTHPDFMLYDALDVVL MDPMCLDAFPKLVCFKKRIEAIPQIDK YLKSSKYIAWPLQGWQATFGGGDHPPK SDLVPRGSPGIH RD | 24 |
| GFP | MVSKGEELFTGVVPILVELDGDVNGHKFSVS GEGEGDATYGKLTLKFICTTGKLPVPWPTLV TTLTYGVQCFSRYPDHMKQHDFFKSAMPEGY VQERTIFFKDDGNYKTRAEVKFEGDTLVNRI ELKGIDFKEDGNILGHKLEYNYNSHNVYIMA DKQKNGIKVNFKIRHNIEDGSVQLADHYQQN TPIGDGPVLLPDNHYLSTQSALSKDPNEKRD HMVLLEFVTAAGITLGMDELYK | 25 |
| MBP | MKIEEGKLVIWINGDKGYNG LAEVGKKFEKDTGIKVTVEHPDK LEEKFPQVAATGDGPDIIFWAHDRFGGYA QSGLLAEITPDKAFQDKLYPFTWDAVRYN GKLIAYPIAVEALSLIYNKDLLPNPPKTW EEIPALDKELKAKGKSALMFNLQEPYFTW PLIAADGGYAPKYENGKYDIKDVGVDNAG AKAGLTFLVDLIKNKHMNADTDYSIAEAA FNKGETAMTINGPWAWSNIDTSKVNYGVT VLPTFKGQPSKPFVGVLSAGINAASPNKE LAKEFLENYLLTDEGLEAVNKDKPLGAVA LKSYEEELAKDPRIAATMENAQKGEIMPN IPQMSAFWYAVRTAVINAASGRQTVDEAL KDAQTNSSSNNNNNLGIEGR | 26 |
| Albumin | MKWVTFISLLFLFSSAYSRGVFRRDAHKSEVE AHRFKDLGEENFKALVLIAFAQYLQQCPF DHVKLVNEVTEFAKTCVADESAENCDKSL HTLFGDKLCTVATLRETYGEMADCCAKQE PERNECFLQHKDDNPNLPRLVRPEVDVMC | 27 |

TABLE 1-continued

Heterologous Protein Sequences

| Heterologous Protein | Sequence | SEQ ID NO: |
|---|---|---|
|  | TAFHDNEETFLKKYLYEIARRHPYFYAPE LLFFAKRYKAAFTECCQAADKAACLLPKL DELRDEGKASSAKQGLKCASLQKFGERAF KAWAVARLSQRFPKAEFAEVSKLVTDLTK VHTECCHGDLLECADDRADLAKYICENQD SISSKLKECCEKPLLEKSHCIAEVENDEM PADLPSLAADFVGSKDVCKNYAEAKDVFL GMFLYEYARRHPDYSVVLLLRLAKTYETT LEKCCAAADPHECYAKVFDEFKPLVEEPQ NLIKQNCELFEQLGEYKFQNALLVRYTKK VPQVSTPTLVEVSRNLGKVGSKCCKHPEE AKRMPCAEDCLSVFLNQLCVLHEKTPVSD RVTKCCTESLVNGRPCFSALEVDETYVPK EFNAETFTFHADICTLSEKERQIKKQTAL VELVKHKPKATKEQLKAVMDDFAAFVEKC CKADDKETCFAEEGKKLVAASQAALGL |  |
| Fc domain | EPKSCDKTHTCPPCPAPELLGGPSVFLFP PKPKDTLMISRTPE VTCVVVDVSHEDPEVKFNWYVDGVEVHNA KTKPREEQYNSTYRVVSVLTVLHQDWLNG KEYKCKVSNKALPAPIEKTISKAKGQPRE PQVYTLPPSREEMTKNQVSLTCLVKGFYP SDIAVEWESNGQPENNYKTTPPVLDSDGS FFLYSKLTVDKSRWQQGNVFSCSVMHEAL HNHYTQKSLSLSPGK | 28 |

In some embodiments, the HNB fusion polypeptides disclosed herein employ leader sequences from other species to permit the recombinant expression of a protein in a heterologous host. In some embodiments, the HNB fusion polypeptides disclosed comprise immunologically active domains, such as an antibody epitope, to facilitate purification of the HNB fusion polypeptide. Inclusion of a cleavage site at or near the fusion junction will facilitate removal of the extraneous polypeptide after purification. Other useful fusions include linking of functional domains, such as active sites from enzymes such as a hydrolase, glycosylation domains, cellular targeting signals or transmembrane regions. Additional HNB fusion polypeptides as disclosed herein can comprise a cell-penetrating peptide linked to a polypeptide to promote uptake of the polypeptide by the cell.

In some embodiments, provided herein are polynucleotides encoding any one of the above HNB polypeptides. In some embodiments, provided herein are modified polypeptides comprising any one of the above HNB polypeptides. In some embodiments, the modification is selected from the group consisting of a glycosylation and a phosphorylation. In some embodiments, the modification is selected from the group consisting of: myristoylation, palmitoylation, isoprenylation, glypiation, lipolation, acylation, akylation, amidation, phosphorylation, glycation, biotinylation, pegylation, sumoylation, ubiquitination, neddylation, or pupylation. Modifications also include one or more D-amino acids substituted for L-amino acids (and mixtures thereof), structural and functional analogues, for example, peptidomimetics having synthetic or non-natural amino acids or amino acid analogues and derivatized forms. Modifications include cyclic structures such as an end-to-end amide bond between the amino and carboxy-terminus of the molecule or intra- or inter-molecular disulfide bond. In some embodiments, there are provided compositions comprising any one of the above HNB fusion polypeptides, the HNB polynucleotides, or any one of the above modified polypeptides, and an excipient. In some embodiments, the excipient comprises at least one of the group consisting of maleic acid, tartaric acid, lactic acid, citric acid, acetic acid, sodium bicarbonate, sodium phosphate, histidine, glycine, sodium chloride, potassium chloride, calcium chloride, zinc chloride, water, dextrose, N-methylpyrrolidone, dimethyl sulfoxide, N,N-dimethylacetamide, ethanol, propylene glycol, polyethylene glycol, diethylene glycol monoethyl ether, and polyoxyethylenesorbitan monooleate.

In some embodiments, the composition comprises an additional therapeutic agent. In some embodiments, the additional therapeutic agent is a chemotherapeutic. In some embodiments, there are provided any one of the above HNB fusion polypeptides, the above HNB polynucleotides, any one of the above modified polypeptides, or any one of the above compositions for use as a medicament. In some embodiments, there are provided any one of the above HNB fusion polypeptides, the above HNB polynucleotides, any one of the above modified polypeptides, or any one of the above compositions for preparation of a medicament for treatment of cancer. In some embodiments, there are provided any one of the above HNB fusion polypeptides, the above HNB polynucleotides, any one of the above modified polypeptides, or any one of the above compositions for use in treatment of cancer. In some embodiments, the cancer is a MYC driven cancer. In some embodiments, the cancer is a KRas driven cancer. In some embodiments, the cancer is selected from the group consisting of Acute Lymphoblastic Leukemia (ALL), Acute Myeloid Leukemia (AML), Adrenocortical Carcinoma, AIDS-Related Cancers (e.g., Kaposi Sarcoma, Lymphoma, etc.), Anal Cancer, Appendix Cancer, Astrocytomas, Atypical Teratoid/Rhabdoid Tumor, Basal Cell Carcinoma, Bile Duct Cancer (Extrahepatic), Bladder Cancer, Bone Cancer (e.g., Ewing Sarcoma, Osteosarcoma and Malignant Fibrous Histiocytoma, etc.), Brain Stem Glioma, Brain Tumors (e.g., Astrocytomas, Central Nervous System Embryonal Tumors, Central Nervous System Germ Cell Tumors, Craniopharyngioma, Ependymoma, etc.), Breast Cancer (e.g., female breast cancer, male breast cancer, childhood breast cancer, etc.), Bronchial Tumors, Burkitt Lymphoma, Carcinoid Tumor (e.g., Childhood, Gastrointestinal, etc.), Carcinoma of Unknown Primary, Cardiac (Heart) Tumors, Central Nervous System (e.g., Atypical Teratoid/Rhabdoid Tumor, Embryonal Tumors, Germ Cell Tumor, Lymphoma, etc.), Cervical Cancer, Childhood Cancers, Chordoma, Chronic Lymphocytic Leukemia (CLL), Chronic Myelogenous Leukemia (CML), Chronic Myeloproliferative Neoplasms, Colon Cancer, Colorectal Cancer, Craniopharyngioma, Cutaneous T-Cell Lymphoma, Duct (e.g., Bile Duct, Extrahepatic, etc.), Ductal Carcinoma In Situ (DCIS), Embryonal Tumors, Endometrial Cancer, Ependymoma, Esophageal Cancer, Esthesioneuroblastoma, Ewing Sarcoma, Extracranial Germ Cell Tumor, Extragonadal Germ Cell Tumor, Extrahepatic Bile Duct Cancer, Eye Cancer (e.g., Intraocular Melanoma, Retinoblastoma, etc.), Fibrous Histiocytoma of Bone (e.g., Malignant, Osteosarcoma, ect.), Gallbladder Cancer, Gastric (Stomach) Cancer, Gastrointestinal Carcinoid Tumor, Gastrointestinal Stromal Tumors (GIST), Germ Cell Tumor (e.g., Extracranial, Extragonadal, Ovarian, Testicular, etc.), Gestational Trophoblastic Disease, Glioma, Hairy Cell Leukemia, Head and Neck Cancer, Heart Cancer, Hepatocellular (Liver) Cancer, Histiocytosis (e.g., Langerhans Cell, etc.), Hodgkin Lymphoma, Hypopharyngeal Cancer, Intraocular Melanoma, Islet Cell Tumors (e.g., Pancreatic Neuroendocrine Tumors, etc.), Kaposi Sarcoma, Kidney Cancer (e.g., Renal Cell, Wilms Tumor, Childhood Kidney Tumors, etc.), Langerhans Cell Histiocytosis, Laryngeal Cancer, Leukemia (e.g., Acute Lymphoblastic (ALL), Acute Myeloid (AML), Chronic Lymphocytic (CLL), Chronic Myelogenous (CML), Hairy Cell, etc.), Lip and Oral Cavity Cancer, Liver Cancer (Primary), Lobular Carcinoma In Situ (LCIS), Lung Cancer (e.g., Non-Small Cell, Small Cell, etc.), Lymphoma (e.g., AIDS-Related, Burkitt, Cutaneous T-Cell, Hodgkin, Non-Hodgkin, Primary Central Nervous System (CNS), etc.), Macroglobulinemia (e.g., Waldenstrom, etc.), Male Breast Cancer, Malignant Fibrous Histiocytoma of Bone and Osteosarcoma, Melanoma, Merkel Cell Carcinoma, Mesothelioma, Metastatic Squamous Neck Cancer with Occult Primary, Midline Tract Carcinoma Involving NUT Gene, Mouth Cancer, Multiple Endocrine Neoplasia Syndromes, Multiple Myeloma/Plasma Cell Neoplasm, Mycosis Fungoides, Myelodysplastic Syndromes, Myelodysplastic/Myeloproliferative Neoplasms, Myelogenous Leukemia (e.g., Chronic (CML), etc.), Myeloid Leukemia (e.g., Acute (AML), etc.), Myeloproliferative Neoplasms (e.g., Chronic, etc.), Nasal Cavity and Paranasal Sinus Cancer, Nasopharyngeal Cancer, Neuroblastoma, Non-Hodgkin Lymphoma, Non-Small Cell Lung Cancer, Oral Cancer, Oral Cavity Cancer (e.g., Lip, etc.), Oropharyngeal Cancer, Osteosarcoma and Malignant Fibrous Histiocytoma of Bone, Ovarian Cancer (e.g., Epithelial, Germ Cell Tumor, Low Malignant Potential Tumor, etc.), Pancreatic Cancer, Pancreatic Neuroendocrine Tumors (Islet Cell Tumors), Papillomatosis, Paraganglioma, Paranasal Sinus and Nasal Cavity Cancer, Parathyroid Cancer, Penile Cancer, Pharyngeal Cancer, Pheochromocytoma, Pituitary Tumor, Pleuropulmonary Blastoma, Primary Central Nervous System (CNS) Lymphoma, Prostate Cancer, Rectal Cancer, Renal Cell (Kidney) Cancer, Renal Pelvis and Ureter, Transitional Cell Cancer, Retinoblastoma, Rhabdomyosarcoma, Salivary Gland Cancer, Sarcoma (e.g., Ewing, Kaposi, Osteosarcoma, Rhabdomyosarcoma, Soft Tissue, Uterine, etc.), Sezary Syndrome, Skin Cancer (e.g., Childhood, Melanoma, Merkel Cell Carcinoma, Nonmelanoma, etc.), Small Cell Lung Cancer, Small Intestine Cancer, Soft Tissue Sarcoma, Squamous Cell Carcinoma, Squamous Neck Cancer (e.g., with Occult Primary, Metastatic, etc.), Stomach (Gastric) Cancer, T-Cell Lymphoma, Testicular Cancer, Throat Cancer, Thymoma and Thymic Carcinoma, Thyroid Cancer, Transitional Cell Cancer of the Renal Pelvis and Ureter, Ureter and Renal Pelvis Cancer, Urethral Cancer, Uterine Cancer (e.g., Endometrial, etc.), Uterine Sarcoma, Vaginal Cancer, Vulvar Cancer, Waldenstrom Macroglobulinemia, Wilms Tumor, and the like.

In some embodiments, provided herein are any one of the above HNB fusion polypeptides, the above HNB polynucleotides, any one of the above modified polypeptides, or any one of the above compositions for use in treatment of carcinoma. In some embodiments, the carcinoma is selected from the group consisting of acinar carcinoma, actinic cell carcinoma, acinous carcinoma, adenocystic carcinoma, adenoid cystic carcinoma, adenosquamous carcinoma, adnexal carcinoma, adrenocortical carcinoma, alveolar carcinoma, ameloblastic carcinoma, apocrine carcinoma, basal cell carcinoma, bronchioloalveolar carcinoma, bronchogenic carcinoma, cholangiocellular carcinoma, chorionic carcinoma, clear cell carcinoma, colloid carcinoma, cribriform carcinoma, ductal carcinoma in situ, embryonal carcinoma, carcinoma encuirasse, endometrioid carcinoma, epidermoid carcinoma, carcinoma ex mixed tumor, carcinoma ex pleomorphic adenoma, follicular carcinoma of thyroid gland, hepatocellular carcinoma, carcinoma in situ, intraductal carcinoma, Hurthle cell carcinoma, inflammatory carcinoma of the breast, large cell carcinoma, invasive lobular carcinoma, lobular carcinoma, lobular carcinoma in situ (LCIS), medullary carcinoma, meningeal carcinoma, Merkel cell carcinoma, mucinous carcinoma, mucoepidermoid carcinoma, nasopharyngeal carcinoma, non-small cell carcinoma, non-small cell lung carcinoma (NSCLC), oat cell carcinoma, papillary carcinoma, renal cell carcinoma, scirrhous carcinoma, sebaceous carcinoma, carcinoma simplex, signet-ring cell carcinoma, small cell carcinoma, small cell lung carcinoma, spindle cell carcinoma, squamous cell carcinoma, terminal duct carcinoma, transitional cell carcinoma, tubular carcinoma, verrucous carcinoma, and the like.

In some embodiments, the treatment reduces at least one symptom of a cancer. In some embodiments, the treatment (a) prevents the disease and/or symptom(s) from occurring in a subject who may be predisposed to the disease or symptom(s) but has not yet been diagnosed as having it; (b) inhibiting the disease and/or symptom(s), i.e., arresting development of a disease and/or the associated symptoms; or (c) relieving the disease and the associated symptom(s), i.e., causing regression of the disease and/or symptom(s). Those in need of treatment can include those already inflicted (e.g., those with cancer, e.g. those having tumors) as well as those in which prevention is desired (e.g., those with increased susceptibility to cancer; those with cancer; those suspected of having cancer; etc.).

In some embodiments, disclosed herein are cells expressing HNB polypeptides, including HNB fusion polypeptides as disclosed herein. In some embodiments, cell is a mammalian cell. In some embodiments, the cell is an insect cell. In some embodiments, the cell is a yeast cell. In some embodiments, the cell is a bacterial cell. Examples of cells for expressing the HNB fusion polypeptides disclosed herein include, but are not limited to, a CHO cell, a ExpiCHO-S cell, a CHO DG44 cell, a CHO-K1 cell, a myeloma cell, a hybridoma cell, a NSO cell, a GS-NSO cell, aHEK293 cell, a HEK293T cell, aHTEK293E cell, a HEK293-6E cell, a HEK293F cell, and a per.C6 cell. In some embodiments, the cell is a CHO cell. In some embodiments, the cell is a myeloma cell. In some embodiments, the cell is selected from the group consisting of an *E. coli* cell, a *P. mirabilis* cell, a *P. putidas* cell, a *B. brevis* cell, a *B. megaterium* cell, a *B. subtilis* cell, a *L. paracasei* cell, a *S. lividans* cell, a *Y. lipolytica* cell, a *K. lactis* cell, a *P. pastoris* cell, a *S. cerevisiae* cell, a *A. niger* var. *awamori* cell, a *A. oryzae* cell, a *L. tarentolae* cell, a *T. ni* larvae cell, a *S. frugiperda* cell, a *Drosophila* S2 cell, a *S. frugiperda* SF9 cell, a *T. ni* cell, and a SfSWT-1 mimic cell Micropeptide Therapeutics In some embodiments, provided herein are therapeutic compositions comprising a peptide or a polypeptide that comprises a micropeptide, having an sequence of amino acids that is at least 80% identical to the sequence MKTQLGAVKGFLHV (SEQ ID NO: 1). The therapeutic composition can be a vaccine, a prophylactic, or combined with other therapeutics for treating cancer.

Described herein are therapeutics comprising a peptide or a polypeptide that is less than 100 amino acids long, comprising an amino acid sequence of the micropeptide MKTQLGAVKGFLHV (SEQ ID NO: 1). In some embodiments, the therapeutic comprising a peptide or a polypeptide that is less than 50 amino acids long comprising an amino acid sequence of the micropeptide of SEQ ID NO: 1. In some embodiments, the therapeutic comprising a peptide or a polypeptide that is less than 40 amino acids long comprising an amino acid sequence of the micropeptide of SEQ ID NO: 1. In some embodiments, the therapeutic comprising a peptide or a polypeptide that is less than 30 amino acids long comprising an amino acid sequence of the micropeptide of SEQ ID NO: 1. In some embodiments, the therapeutic comprising a peptide or a polypeptide that is less than 20 amino acids long comprising an amino acid sequence of the micropeptide of SEQ ID NO: 1. In some embodiments, the therapeutic comprising a peptide or a polypeptide that is less than 19 amino acids long comprising an amino acid sequence of the micropeptide of SEQ ID NO: 1. In some embodiments, the therapeutic comprising a peptide or a polypeptide that is less than 18 amino acids long comprising an amino acid sequence of the micropeptide of SEQ ID NO: 1. In some embodiments, the therapeutic comprising a peptide or a polypeptide that is less than 17 amino acids long comprising an amino acid sequence of the micropeptide of SEQ ID NO: 1. In some embodiments, the therapeutic comprising a peptide or a polypeptide that is less than 16 amino acids long comprising an amino acid sequence of the micropeptide of SEQ ID NO: 1. In some embodiments, the therapeutic comprising a peptide or a polypeptide that is less than 15 amino acids long comprising an amino acid sequence of the micropeptide of SEQ ID NO: 1. In some embodiments, the therapeutic comprising a peptide or a polypeptide that is less than 14 amino acids long comprising an amino acid sequence of the micropeptide of SEQ ID NO: 1.

In some embodiments, the micropeptide comprises at least 1 conservative amino acid substitution within the sequence of SEQ ID NO: 1. In some embodiments, the micropeptide comprises at least 2 conservative amino acid substitution within the sequence of SEQ ID NO: 1. In some embodiments, the micropeptide comprises at least 3 conservative amino acid substitution within the sequence of SEQ ID NO: 1. In some embodiments, the micropeptide comprises at least 4 conservative amino acid substitution within the sequence of SEQ ID NO: 1. In some embodiments, the micropeptide comprises at least 5 conservative amino acid substitution within the sequence of SEQ ID NO: 1.

In some embodiments, the micropeptide is further conjugated with one or more biomolecules. In some embodiments, the biomolecule is a peptide. In some embodiments, the biomolecule is a lipid. In some embodiments, the micropeptide is further modified. In some embodiments, the modification is selected from the group consisting of: myristoylation, palmitoylation, isoprenylation, glypiation, lipolation, acylation, alkylation, amidation, phosphorylation, glycation, biotinylation, pegylation, sumoylation, ubiquitination, neddylation, or pupylation.

In some embodiments, the peptide is associated with a carrier molecule. In some embodiments, the carrier molecule is a lipid.

In some embodiments, the pharmaceutical composition described herein is for use in preparing a medicament for the treatment of a cancer in a subject.

The selection of peptides can be guided by the given tissue to avoid side effects. The selection may be dependent on the specific type of cancer, the status of the disease, earlier treatment regimens, the immune status of the patient, and, of course, the HLA-haplotype of the patient. Furthermore, the vaccine according to the disclosure can contain individualized components, according to personal needs of the particular patient. Examples include varying the amounts of peptides according to the Myc expression in the particular patient, unwanted side-effects due to personal allergies or other treatments, and adjustments for secondary treatments following a first round or scheme of treatment.

In some embodiments, the pharmaceutical composition comprises about 1-50,000 ug of the micro-peptide. In some embodiments, the pharmaceutical composition comprises about 1-40,000 ug of the micro-peptide. In some embodiments, the pharmaceutical composition comprises about 1-30,000 ug of the micro-peptide. In some embodiments, the pharmaceutical composition comprises about 1-20,000 ug of the micro-peptide. In some embodiments, the pharmaceutical composition comprises about 1-10,000 ug of the micropeptide. In some embodiments, the pharmaceutical composition comprises about 1-5,000 ug of the micro-peptide. In some embodiments, the pharmaceutical composition comprises about 1-1,000 ug of the micro-peptide.

In some embodiments, the pharmaceutical compositions described herein comprise a nucleic acid that encodes a peptide or a polypeptide comprising a sequence that is at least 80% identical to SEQ ID NO: 1.

In some embodiments, the nucleic acid is DNA.

In some embodiments, the nucleic acid is RNA.

In some embodiments, the nucleic acid is messenger RNA (mRNA). In some embodiments, the nucleic acid is an mRNA comprising a sequence encoding a sequence comprising MKTQLGAVKGFLHV (SEQ ID NO: 1). In some embodiments, the mRNA comprises a sequence encoding a peptide that is at least 80% identical to SEQ ID NO: 1. In some embodiments the mRNA comprises a sequence: AUGAAGACCCAGCUGGGCGCCGUGAAGGGCUUC-CUGCACGUG (SEQ ID NO: 29), or a sequence that is at least 95% identical to the same. In some embodiments the mRNA comprises more than one copy of the sequence encoding a peptide having the sequence denoted in SEQ ID NO: 1. In some embodiments, the mRNA comprises a concatemer of a series of 2, 3, 4, 5, 6, 7, 8, 9, 10, 11, 12, 13, 14, 15 or more sequences encoding a series of 2, 3, 4, 5, 6, 7, 8, 9, 10, 11, 12, 13, 14, 15 or more peptides each having the sequence denoted in SEQ ID NO: 1, or a peptide sequence that is at least 80% identical to SEQ ID NO: 1. In some embodiments, the concatemer comprises sequences for self-cleavable elements such as P2A, T2A or E2A in between two sequences each encoding the SEQ ID NO: 1 or a peptide sequence that is at least 80% identical to SEQ ID NO: 1.

Typically, in eukaryotic organisms, mRNA processing comprises the addition of a "cap" on the N-terminal (5') end, and a "tail" on the C-terminal (3') end. A typical cap is a 7-methylguanosine cap, which is a guanosine that is linked through a 5'-5'-triphosphate bond to the first transcribed nucleotide. The presence of the cap is important in providing resistance to nucleases found in most eukaryotic cells. The tail is typically a polyadenylation event whereby a polyadenylyl moiety is added to the 3' end of the mRNA molecule. The presence of this "tail" serves to protect the mRNA from exonuclease degradation. mRNA is translated by the ribosomes into a series of amino acids that make up a protein.

mRNAs according to the present disclosure may be synthesized according to any of a variety of known methods. For example, mRNAs according to the present disclosure may be synthesized via in vitro transcription (IVT). Briefly, IVT is typically performed with a linear or circular DNA template containing a promoter, a pool of ribonucleotide triphosphates, a buffer system that may include DTT and magnesium ions, and an appropriate RNA polymerase (e.g., T3, T7 or SP6 RNA polymerase), DNAse I, pyrophosphatase, and/or RNAse inhibitor. The exact conditions will vary according to the specific application.

According to various embodiments, the present disclosure may be comprise a therapeutic or pharmaceutical composition comprising synthesized mRNA of a variety of lengths. In some embodiments, the present disclosure comprise in vitro synthesized mRNA of or greater than about 1 kb, 1.5 kb, 2 kb, 2.5 kb, 3 kb, 3.5 kb, 4 kb, 4.5 kb, 5 kb 6 kb, 7 kb, 8 kb, 9 kb, 10 kb, 11 kb, 12 kb, 13 kb, 14 kb, 15 kb, or 20 kb in length. In some embodiments, the present disclosure may comprise a therapeutic composition comprising a synthesized mRNA ranging from about 1-20 kb, about 1-15 kb, about 1-10 kb, about 5-20 kb, about 5-15 kb, about 5-12 kb, about 5-10 kb, about 8-20 kb, or about 8-15 kb in length. For example, typical mRNAs may be about 1 kb to about 5 kb in length. More typically, the mRNA will have a length of about 1 kb to about 3 kb. However, in some embodiments, the mRNA in the composition of the disclosure is much longer (greater than about 20 kb). In some embodiments, the present disclosure may comprise mRNA containing one or more modifications that typically enhance stability. In some embodiments, one or more modifications are selected from modified nucleotide, modified sugar phosphate backbones, 5' and/or 3' untranslated region.

Typically, mRNAs are modified to enhance stability. Modifications of mRNA can include, for example, modifications of the nucleotides of the mRNA. A modified mRNA according to the disclosure can thus include, for example, backbone modifications, sugar modifications or base modifications. In some embodiments, antibody encoding mRNAs (e.g., heavy chain and light chain encoding mRNAs) may be synthesized from naturally occurring nucleotides and/or nucleotide analogues (modified nucleotides) including, but not limited to, purines (adenine (A), guanine (G)) or pyrimidines (thymine (T), cytosine (C), uracil (U)), and as modified nucleotides analogues or derivatives of purines and pyrimidines, such as e.g. 1-methyl-adenine, 2-methyl-adenine, 2-methylthio-N-6-isopentenyl-adenine, N6-methyl-adenine, N6-isopentenyl-adenine, 2-thio-cytosine, 3-methyl-cytosine, 4-acetyl-cytosine, 5-methyl-cytosine, 2,6-diaminopurine, 1-methyl-guanine, 2-methyl-guanine, 2,2-dimethyl-guanine, 7-methyl-guanine, inosine, 1-methyl-inosine, pseudouracil (5-uracil), dihydro-uracil, 2-thio-uracil, 4-thio-uracil, 5-carboxymethylaminomethyl-2-thio-uracil, 5-(carboxyhydroxymethyl)-uracil, 5-fluorouracil, 5-bromo-uracil, 5-carboxymethylaminomethyl-uracil, 5-methyl-2-thio-uracil, 5-methyl-uracil, N-uracil-5-oxyacetic acid methyl ester, 5-methylaminomethyl-uracil, 5-methoxyaminomethyl-2-thio-uracil, 5'-methoxycarbonylmethyl-uracil, 5-methoxy-uracil, uracil-5-oxyacetic acid methyl ester, uracil-5-oxyacetic acid (v), 1-methyl-pseudouracil, queosine, 3-D-mannosyl-queosine, wybutoxosine, and phosphoramidates, phosphorothioates, peptide nucleotides, methylphosphonates, 7-deazaguanosine, 5-methylcytosine and inosine. The preparation of such analogues is known to a person skilled in the art e.g. from the U.S. Pat. Nos. 4,373,071, 4,401,796, 4,415,732, 4,458,066, 4,500,707, 4,668,777, 4,973,679, 5,047,524, 5,132,418, 5,153,319, 5,262,530 and 5,700,642, the disclosure of which is included here in its full scope by reference.

Typically, mRNA synthesis includes the addition of a "cap" on the N-terminal (5') end, and a "tail" on the C-terminal (3') end. The presence of the cap is important in providing resistance to nucleases found in most eukaryotic cells. The presence of a "tail" serves to protect the mRNA from exonuclease degradation.

Thus, in some embodiments, mRNAs include a 5' cap structure. A 5' cap is typically added as follows: first, an RNA terminal phosphatase removes one of the terminal phosphate groups from the 5' nucleotide, leaving two terminal phosphates; guanosine triphosphate (GTP) is then added to the terminal phosphates via a guanylyl transferase, producing a 5'5'5 triphosphate linkage; and the 7-nitrogen of guanine is then methylated by a methyltransferase. Examples of cap structures include, but are not limited to, m7G(5')ppp (5'(A,G(5')ppp(5')A and G(5')ppp(5')G.

In some embodiments, mRNAs include a 5' and/or 3' untranslated region. In some embodiments, a 5' untranslated region includes one or more elements that affect an mRNA's stability or translation, for example, an iron responsive element. In some embodiments, a 5' untranslated region may be between about 50 and 500 nucleotides in length.

In some embodiments, a 3' untranslated region includes one or more of a polyadenylation signal, a binding site for proteins that affect an mRNA's stability of location in a cell, or one or more binding sites for miRNAs. In some embodiments, a 3' untranslated region comprises a poly A tail, that may be between 50 and 500 nucleotides in length or longer. In some embodiments, the poly A tail may be 50-250 nucleotides long.

There are various methods of delivery of a nucleic acid as a therapeutic into an organism, e.g., a human. Likewise, there are various methods of delivering a protein or a peptide into an organism. In some embodiments the therapeutic or pharmaceutical composition of the present disclosure is delivered to a subject in need thereof, wherein the therapeutic or pharmaceutical composition comprises a peptide, a polypeptide or a nucleic acid encoding the peptide or polypeptide, wherein the peptide or the polypeptide comprises a sequence as set forth in SEQ ID NO: 1, or a sequence that is at least 80% identical to the sequence set forth in SEQ ID NO: 1.

For instance, the nucleic acid can be delivered directly, as "naked DNA", or "naked mRNA". The nucleic acids can also be administered using ballistic delivery as described, for instance, in U.S. Pat. No. 5,204,253, which is herein incorporated by reference for purposes of describing ballistic delivery administration. Particles comprised solely of DNA can be administered. Alternatively, DNA can be adhered to particles, such as gold particles. The nucleic acids can also be delivered complexed to cationic compounds, such as cationic lipids. Lipid-mediated gene delivery methods are described, for instance, in Mannino & Gould-Fogerite, BioTechniques 6(7): 682-691 (1988); U.S. Pat. No. 5,279,833; Felgner et al., Proc. Natl. Acad. Sci. USA 84: 7413-7414 (1987) and others, which are hereby incorporated by reference for purposes of describing lipid-mediated gene delivery methods. In some embodiments, pharmaceutical formulations comprising the HNB polypeptides disclosed herein are made to be compatible with a particular local, regional or systemic administration or delivery route. Thus, pharmaceutical formulations include carriers, diluents, or excipients suitable for administration by particular routes. Specific non-limiting examples of routes of administration for compositions herein are parenteral, e.g., intravenous, intra-arterial, intradermal, intramuscular, subcutaneous, intra-pleural, transdermal (topical), transmucosal, intra-cranial, intra-spinal, intra-ocular, rectal, oral (alimentary), mucosal administration, and any other formulation suitable for the treatment method or administration protocol.

In some embodiments, pharmaceutical solutions or suspensions for parenteral application include a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates; and agents for the adjustment of tonicity such as sodium chloride or dextrose. In some embodiments, pH is adjusted with acids or bases, such as hydrochloric acid or sodium hydroxide.

Pharmaceutical formulations for injection include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, N.J.), or phosphate buffered saline (PBS). In some embodiments, the carrier is a solvent or dispersion medium containing, for example, water, ethanol, polyol (for example, glycerol, propylene glycol, and liquid polyethylene glycol, and the like), or suitable mixtures thereof. Fluidity is maintained, in some embodiments, for example, by the use of a coating such as lecithin, by the maintenance of the required particle size in the case of dispersion, and by the use of surfactants. Antibacterial and antifungal agents include, for example, parabens, chlorobutanol, phenol, ascorbic acid, and thimerosal. Isotonic agents, for example, sugars; polyalcohols such as mannitol or sorbitol; or sodium chloride, in some embodiments, are included in the composition. In some cases, also included is an agent which delays absorption, in some embodiments, for example, aluminum monostearate or gelatin prolongs absorption of injectable compositions.

In some embodiments, sterile injectable formulations are prepared by incorporating the HNB polypeptides disclosed herein in the required amount in an appropriate solvent with one or more of the above ingredients. Generally, dispersions are prepared by incorporating the HNB polypeptides disclosed herein into a sterile vehicle containing a basic dispersion medium and any other ingredient. In the case of sterile powders for the preparation of sterile injectable solutions, methods of preparation include, for example, vacuum drying and freeze-drying which yields a powder of the active ingredient plus any additional desired ingredient from a previously prepared solution thereof.

For transmucosal or transdermal administration, penetrants appropriate to the barrier to be permeated are used in the formulation. Such penetrants are known in the art, and include, for example, for transmucosal administration, detergents, bile salts, and fusidic acid derivatives. In some embodiments, transmucosal administration is accomplished through the use of nasal sprays, inhalation devices (e.g., aspirators) or suppositories. For transdermal administration, the active compounds are formulated into ointments, salves, gels, creams or patches. In some embodiments, the pharmaceutical formulations are prepared with carriers that protect against rapid elimination from the body, such as a controlled release formulation or a time delay material such as glyceryl monostearate or glyceryl stearate. The formulations, in some embodiments, are also delivered using articles of manufacture such as implants and microencapsulated delivery systems to achieve local, regional or systemic delivery or controlled or sustained release.

In some embodiments, also disclosed herein are nanoparticle-polypeptide complexes comprising a HNB polypeptide as disclosed herein in association with a nanoparticle, wherein the HNB polypeptide is modified by the addition of a chemical moiety that facilitates cellular uptake of the complex. The nanoparticle may be a lipid-based nanoparticle, a superparamagnetic nanoparticle, a nanoshell, a semiconductor nanocrystal, a quantum dot, a polymer-based nanoparticle, a silicon-based nanoparticle, a silica-based nanoparticle, a metal-based nanoparticle, a fullerene or a nanotube. The nanoparticle may be a lipid-based nanoparticle. The lipid-based nanoparticle may be a liposome, a neutral liposome, a DOPC liposome or a DOTAP:cholesterol vesicle. The liposome may be a DOPC liposome. As used in cancer therapy, liposomes take advantage of the increased fenestrations in the cancer neo vasculature to enhance liposome concentration at tumor sites. In certain embodiments, the nanoparticle is a superparamagnetic nanoparticle. Superparamagnetic nanoparticles ranging in diameter from about 10 to 100 nm are small enough to avoid sequestering by the spleen, but large enough to avoid clearance by the liver. Particles this size can penetrate very small capillaries and can be effectively distributed in body tissues. In certain embodiments, the nanoparticle is a superparamagnetic nanoparticle, and the nanoparticle-polypeptide complex is within a liposome or a DOTAP:cholesterol vesicle. The liposome may be a DOPC liposome. The chemical moiety may be a fatty acid (e.g., a $C_4$-$C_{18}$ fatty acid, stearate or myristate). The chemical moiety may be a cell penetrating peptide. The cell penetrating peptide may be derived from HIV Tat, herpes virus VP22, or the *Drosophila* Antennapedia homeobox gene product. In some embodiments, the HNB polypeptides can be targeted to specific tissues and cells. For example, the nanoparticle-polypeptide complexes comprising a HNB polypeptide as disclosed herein can be conjugated to a cell targeting moiety. The targeting moiety can be, but is not limited to, a protein, peptide, lipid, steroid, sugar, carbohydrate or synthetic compound. Cell targeting moieties such as ligands recognize and bind to their cognate receptors on the surface of cells. Similarly, an antibody can act as cell targeting moieties by recognizing a cognate antigen on a cell surface. Targeted nanoparticle-polypeptide complexes can enhance the specificity of disease treatment and increase the amount of therapeutic agent entering a targeted cell.

Liposomes can be variously used to deliver nucleic acids or peptides. The peptides disclosed herein may also be administered via liposomes, which target the peptides to a particular cells tissue, such as lymphoid tissue. Liposomes are also useful in increasing the half-life of the peptides. Liposomes include emulsions, foams, micelles, insoluble monolayers, liquid crystals, phospholipid dispersions, lamellar layers and the like. In these preparations the peptide to be delivered is incorporated as part of a liposome. Thus, liposomes filled with a desired peptide of the disclosure can be directed to the site of lymphoid cells, where the liposomes then deliver the selected therapeutic/immunogenic peptide compositions. Liposomes for use in the disclosure are formed from standard vesicle-forming lipids, which generally include neutral and negatively charged phospholipids and a sterol, such as cholesterol. The selection of lipids is generally guided by consideration of, e.g., liposome size, acid lability and stability of the liposomes in the blood stream. A variety of methods are available for preparing liposomes, as described in, e.g., Szoka et al., Ann. Rev. Biophys. Bioeng. 9; 467 (1980), USA; U.S. Pat. No. 4,235,871 and others, which are hereby incorporated by reference for purposes of describing methods for preparing liposomes. A liposome suspension containing a peptide may be administered intravenously, locally, topically, etc. in a dose which varies according to, inter alia, the manner of administration, the peptide being delivered, and the stage of the disease being treated. Therapeutically effective amounts or dosages of the HNB polypeptides disclosed herein and pharmaceutical formulations comprising the HNB polypeptides disclosed herein are contemplated to include dosages of 0.01 mg to 20 mg, for example, 0.01 mg, 0.02 mg, 0.03 mg, 0.04 mg, 0.05 mg, 0.06 mg, 0.07 mg, 0.08 mg, 0.09 mg, 0.1 mg, 0.2 mg, 0.3 mg, 0.4 mg, 0.5 mg, 0.6 mg, 0.7 mg, 0.8 mg, 0.9 mg, 1.0 mg, 1.1 mg, 1.2 mg, 1.3 mg, 1.4 mg, 1.5 mg, 1.6 mg, 1.7 mg, 1.8 mg, 1.9 mg, 2 mg, 2.1 mg, 2.2 mg, 2.3 mg, 2.4 mg, 2.5 mg, 2.6 mg, 2.7 mg, 2.8 mg, 2.9 mg, 3 mg, 3.1 mg, 3.2 mg, 3.3 mg, 3.4 mg, 3.5 mg, 3.6 mg, 3.7 mg, 3.8 mg, 3.9 mg, 4 mg, 4.1 mg, 4.2 mg, 4.3 mg, 4.4 mg, 4.5 mg, 4.6 mg, 4.7 mg, 4.8 mg, 4.9 mg, 5 mg, 5.1 mg, 5.2 mg, 5.3 mg, 5.4 mg, 5.5 mg, 5.6 mg, 5.7 mg, 5.8 mg, 5.9 mg, 6 mg, 6.1 mg, 6.2 mg, 6.3 mg, 6.4 mg, 6.5 mg, 6.6 mg, 6.7 mg, 6.8 mg, 6.9 mg, 7 mg, 7.1 mg, 7.2 mg, 7.3 mg, 7.4 mg, 7.5 mg, 7.6 mg, 7.7 mg, 7.8 mg, 7.9 mg, 8 mg, 8.1 mg, 8.2 mg, 8.3 mg, 8.4 mg, 8.5 mg, 8.6 mg, 8.7 mg, 8.8 mg, 8.9 mg, 9 mg, 9.1 mg, 9.2 mg, 9.3 mg, 9.4 mg, 9.5 mg, 9.6 mg, 9.7 mg, 9.8 mg, 9.9 mg, 10 mg, 10.1 mg, 10.2 mg, 10.3 mg, 10.4 mg, 10.5 mg, 10.6 mg, 10.7 mg, 10.8 mg, 10.9 mg, 11 mg, 11.1 mg, 11.2 mg, 11.3 mg, 11.4 mg, 11.5 mg, 11.6 mg, 11.7 mg, 11.8 mg, 11.9 mg, 12 mg, 12.1 mg, 12.2 mg, 12.3 mg, 12.4 mg, 12.5 mg, 12.6 mg, 12.7 mg, 12.8 mg, 12.9 mg, 13 mg, 13.1 mg, 13.2 mg, 13.3 mg, 13.4 mg, 13.5 mg, 13.6 mg, 13.7 mg, 13.8 mg, 13.9 mg, 14 mg, 14.1 mg, 14.2 mg, 14.3 mg, 14.4 mg, 14.5 mg, 14.6 mg, 14.7 mg, 14.8 mg, 14.9 mg, 15 mg, 15.1 mg, 15.2 mg, 15.3 mg, 15.4 mg, 15.5 mg, 15.6 mg, 15.7 mg, 15.8 mg, 15.9 mg, 16 mg, 16.1 mg, 16.2 mg, 16.3 mg, 16.4 mg, 16.5 mg, 16.6 mg, 16.7 mg, 16.8 mg, 16.9 mg, 17 mg, 17.1 mg, 17.2 mg, 17.3 mg, 17.4 mg, 17.5 mg, 17.6 mg, 17.7 mg, 17.8 mg, 17.9 mg, 18 mg, 18.1 mg, 18.2 mg, 18.3 mg, 18.4 mg, 18.5 mg, 18.6 mg, 18.7 mg, 18.8 mg, 18.9 mg, 19 mg, 19.1 mg, 19.2 mg, 19.3 mg, 19.4 mg, 19.5 mg, 19.6 mg, 19.7 mg, 19.8 mg, 19.9 mg, or 20 mg. Therapeutically effective amounts or dosages, in some cases, are contemplated to include dosages of 0.1 mg to 2.0 mg.

In some embodiments, the pharmaceutical composition comprises a pharmaceutically acceptable carrier. A variety of aqueous carriers may be used, e.g., water, buffered water, 0.9% saline, 0.3% glycine, hyaluronic acid and the like. These compositions may be sterilized by conventional, well known sterilization techniques, or may be sterile filtered. The resulting aqueous solutions may be packaged for use as is, or lyophilized, the lyophilized preparation being combined with a sterile solution prior to administration. The compositions may contain pharmaceutically acceptable auxiliary substances as required to approximate physiological conditions, such as pH adjusting and buffering agents, tonicity adjusting agents, wetting agents and the like, for example, sodium acetate, sodium lactate, sodium chloride, potassium chloride, calcium chloride, sorbitan monolaurate, triethanolamine oleate, etc. The concentration of peptides of the disclosure in the pharmaceutical formulations can vary widely, i.e., from less than about 0.1%, usually at or at least about 2% to as much as 20% to 50% or more by weight, and will be selected primarily by fluid volumes, viscosities, etc., in accordance with the particular mode of administration selected. Pharmaceutical formulations include "pharmaceutically acceptable" and "physiologically acceptable" carriers, diluents or excipients. The terms "pharmaceutically acceptable" and "physiologically acceptable" include solvents (aqueous or non-aqueous), solutions, emulsions, dispersion media, coatings, isotonic and absorption promoting or delaying agents, compatible with pharmaceutical administration to a mammal, for example a human. In some embodiments, such formulations are contained in a liquid, e.g., emulsion, suspension, syrup or elixir; or solid form, i.e., tablet (e.g., coated or uncoated, immediate, delayed, continuous, or pulsatile release), capsule (e.g., hard or soft, immediate, delayed, continuous, or pulsatile release), powder, granule, crystal, or microbead. In some embodiments, supplementary compounds (e.g., preservatives, antibacterial, antiviral and antifungal agents) are also incorporated into the formulations.

Provided herein are methods for treating a subject in need thereof, the method comprising administering the subject a pharmaceutical composition comprising a peptide comprising an amino acid sequence set forth in SEQ ID NO: 1, or a sequence that is at least 80% identical to SEQ ID NO:1.

In some embodiments, provided herein are methods for treating a subject in need thereof, the method comprising administering the subject a pharmaceutical composition comprising a nucleic acid encoding a peptide comprising an amino acid sequence set forth in SEQ ID NO: 1, or a sequence that is at least 80% identical to SEQ ID NO:1.

Pharmaceutical compositions comprising the peptides disclosed herein may be administered to an individual already suffering from cancer. Pharmaceutical compositions are administered parenterally, e.g., intravenously, subcutaneously, intradermally, or intramuscularly. The compositions may be administered at the site of surgical excision to induce a local immune response to the tumor. The disclosure provides compositions for parenteral administration which comprise a solution of the peptides and vaccine compositions are dissolved or suspended in an acceptable carrier, preferably an aqueous carrier. For solid compositions, conventional or nanoparticle nontoxic solid carriers may be used which include, for example, pharmaceutical grades of mannitol, lactose, starch, magnesium stearate, sodium saccharin, talcum, cellulose, glucose, sucrose, magnesium carbonate, and others. For oral administration, a pharmaceutically acceptable nontoxic composition is formed by incorporating any of the normally employed excipients, such as those carriers previously listed, and generally 10-95% of active ingredient, that is, one or more peptides of the disclosure, and more preferably at a concentration of 25%-75%. For aerosol administration, the immunogenic peptides are preferably supplied in finely divided form along with a surfactant and propellant. Typical percentages of peptides are 0.01%-20% by weight, preferably 1%-10%. The surfactant must, of course, be nontoxic, and preferably soluble in the propellant. Representative of such agents are the esters or partial esters of fatty acids containing from 6 to 22 carbon atoms, such as caproic, octanoic, lauric, palmitic, stearic, linoleic, linolenic, olesteric and oleic acids with an aliphatic polyhydric alcohol or its cyclic anhydride. Mixed esters, such as mixed or natural glycerides may be employed. The surfactant may constitute 0.1%-20% by weight of the composition, preferably 0.25-5%. The balance of the composition is ordinarily propellant. A carrier can also be included as desired, as with, e.g., lecithin for intranasal delivery.

The HNB polypeptides disclosed herein may also be combined with therapy designed to eliminate cancer cells present in a tumor, e.g. in a combination therapy with various other conventional methods of treating cancer cells, for example chemotherapy, radiation therapy, etc. Chemotherapeutic agents may include, for example, temozolomide, protein-bound paclitaxel, romidepsin. cyclophosphamide, vincristine, doxorubicin, methotrexate, ifosfamide, etoposide, and cytarabine (CODOX-M/IVAC) plus rituximab; rituximab plus etoposide, prednisone, vincristine (Oncovin), and doxorubicin (R-EPOCH) and rituximab plus cyclophosphamide, vincristine, doxorubicin (Adriamycin), and dexamethasone (R-Hyper CVAD). In some embodiments, the chemotherapeutic agent is selected from the group consisting of Abiraterone Acetate, Abitrexate (Methotrexate), Abraxane (Paclitaxel Albumin-stabilized Nanoparticle Formulation), ABVD, ABVE, ABVE-PC, AC, AC-T, Adcetris (Brentuximab Vedotin), ADE, Ado-Trastuzumab Emtansine, Adriamycin (Doxorubicin Hydrochloride), Adrucil (Fluorouracil), Afatinib Dimaleate, Afinitor (Everolimus), Aldara (Imiquimod), Aldesleukin, Alemtuzumab, Alimta (Pemetrexed Disodium), Aloxi (Palonosetron Hydrochloride), Ambochlorin (Chlorambucil), Amboclorin (Chlorambucil), Aminolevulinic Acid, Anastrozole, Aprepitant, Aredia (Pamidronate Disodium), Arimidex (Anastrozole), Aromasin (Exemestane), Arranon (Nelarabine), Arsenic Trioxide, Arzerra (Ofatumumab), Asparaginase *Erwinia chrysanthemi*, Avastin (Bevacizumab), Axitinib, Azacitidine, BEACOPP, Becenum (Carmustine), Beleodaq (Belinostat), Belinostat, Bendamustine Hydrochloride, BEP, Bevacizumab, Bexarotene, Bexxar (Tositumomab and I 131 Iodine Tositumomab), Bicalutamide, BiCNU (Carmustine), Bleomycin, Blinatumomab, Blincyto (Blinatumomab), Bortezomib, Bosulif (Bosutinib), Bosutinib, Brentuximab Vedotin, Busulfan, Busulfex (Busulfan), Cabazitaxel, Cabozantinib-S-Malate, CAF, Campath (Alemtuzumab), Camptosar (Irinotecan Hydrochloride), Capecitabine, CAPOX, Carboplatin, CARBOPLATIN-TAXOL, Carfilzomib, Carmubris (Carmustine), Carmustine, Carmustine Implant, Casodex (Bicalutamide), CeeNU (Lomustine), Ceritinib, Cerubidine (Daunorubicin Hydrochloride), Cervarix (Recombinant HPV Bivalent Vaccine), Cetuximab, Chlorambucil, CHLORAMBUCIL-PREDNISONE, CHOP, Cisplatin, Clafen (Cyclophosphamide), Clofarabine, Clofarex (Clofarabine), Clolar (Clofarabine), CMF, Cometriq (Cabozantinib-S-Malate), COPP, COPP-ABV, Cosmegen (Dactinomycin), Crizotinib, CVP, Cyclophosphamide, Cyfos (Ifosfamide), Cyramza (Ramucirumab), Cytarabine, Cytarabine, Liposomal, Cytosar-U (Cytarabine), Cytoxan (Cyclophosphamide), Dabrafenib, Dacarbazine, Dacogen (Decitabine), Dactinomycin, Dasatinib, Daunorubicin Hydrochloride, Decitabine, Degarelix, Denileukin Diftitox, Denosumab, Dinutuximab, DepoCyt (Liposomal Cytarabine), DepoFoam (Liposomal Cytarabine), Dexrazoxane Hydrochloride, Docetaxel, Doxil (Doxorubicin Hydrochloride Liposome), Doxorubicin Hydrochloride, Doxorubicin Hydrochloride Liposome, Dox-SL (Doxorubicin Hydrochloride Liposome), DTIC-Dome (Dacarbazine), Efudex (Fluorouracil), Elitek (Rasburicase), Ellence (Epirubicin Hydrochloride), Eloxatin (Oxaliplatin), Eltrombopag Olamine, Emend (Aprepitant), Enzalutamide, Epirubicin Hydrochloride, EPOCH, Erbitux (Cetuximab), Eribulin Mesylate, Erivedge (Vismodegib), Erlotinib Hydrochloride, Erwinaze (Asparaginase *Erwinia chrysanthemi*), Etopophos (Etoposide Phosphate), Etoposide, Etoposide Phosphate, Evacet (Doxorubicin Hydrochloride Liposome), Everolimus, Evista (Raloxifene Hydrochloride), Exemestane, Fareston (Toremifene), Farydak (Panobinostat), Faslodex (Fulvestrant), FEC, Femara (Letrozole), Filgrastim, Fludara (Fludarabine Phosphate), Fludarabine Phosphate, Fluoroplex (Fluorouracil), Fluorouracil, Folex (Methotrexate), Folex PFS (Methotrexate), FOLFIRI, FOLFIRI-BEVACIZUMAB, FOLFIRI-CETUXIMAB, FOLFIRINOX, FOLFOX, Folotyn (Pralatrexate), FU-LV, Fulvestrant, Gardasil (Recombinant HPV Quadrivalent Vaccine), Gardasil 9 (Recombinant HPV Nonavalent Vaccine), Gazyva (Obinutuzumab), Gefitinib, Gemcitabine Hydrochloride, GEMCITABINE-CISPLATIN, GEMCITABINE-OXALIPLATIN, Gemtuzumab Ozogamicin, Gemzar (Gemcitabine Hydrochloride), Gilotrif (Afatinib Dimaleate), Gleevec (Imatinib Mesylate), Gliadel (Carmustine Implant), Gliadel wafer (Carmustine Implant), Glucarpidase, Goserelin Acetate, Halaven (Eribulin Mesylate), Herceptin (Trastuzumab), HPV Bivalent Vaccine, Recombinant, HPV Nonavalent Vaccine, Recombinant, HPV Quadrivalent Vaccine, Recombinant, Hycamtin (Topotecan Hydrochloride), Hyper-CVAD, Ibrance (Palbociclib), Ibritumomab Tiuxetan, Ibrutinib, ICE, Iclusig (Ponatinib Hydrochloride), Idamycin (Idarubicin Hydrochloride), Idarubicin Hydrochloride, Idelalisib, Ifex (Ifosfamide), Ifosfamide, Ifosfamidum (Ifosfamide), Imatinib Mesylate, Imbruvica (Ibrutinib), Imiquimod, Inlyta (Axitinib), Intron A (Recombinant Interferon Alfa-2b), Iodine 131 Tositumomab and Tositumomab, Ipilimumab, Iressa (Gefitinib), Irinotecan Hydrochloride, Istodax (Romidepsin), Ixabepilone, Ixempra (Ixabepilone), Jakafi (Ruxolitinib Phosphate), Jevtana (Cabazitaxel), Kadcyla (Ado-Trastuzumab Emtansine), Keoxifene (Raloxifene Hydrochloride), Kepivance (Palifermin), Keytruda (Pembrolizumab), Kyprolis (Carfilzomib), Lanreotide Acetate, Lapatinib Ditosylate, Lenalidomide, Lenvatinib Mesylate, Lenvima (Lenvatinib Mesylate), Letrozole, Leucovorin Calcium, Leukeran (Chlorambucil), Leuprolide Acetate, Levulan (Aminolevulinic Acid), Linfolizin (Chlorambucil), LipoDox (Doxorubicin Hydrochloride Liposome), Liposomal Cytarabine, Lomustine, Lupron (Leuprolide Acetate), Lupron Depot (Leuprolide Acetate), Lupron Depot-Ped (Leuprolide Acetate), Lupron Depot-3 Month (Leuprolide Acetate), Lupron Depot-4 Month (Leuprolide Acetate), Lynparza (Olaparib), Marqibo (Vincristine Sulfate Liposome), Matulane (Procarbazine Hydrochloride), Mechlorethamine Hydrochloride, Megace (Megestrol Acetate), Megestrol Acetate, Mekinist (Trametinib), Mercaptopurine, Mesna, Mesnex (Mesna), Methazolastone (Temozolomide), Methotrexate, Methotrexate LPF (Methotrexate), Mexate (Methotrexate), Mexate-AQ (Methotrexate), Mitomycin C, Mitoxantrone Hydrochloride, Mitozytrex (Mitomycin C), MOPP, Mozobil (Plerixafor), Mustargen (Mechlorethamine Hydrochloride), Mutamycin (Mitomycin C), Myleran (Busulfan), Mylosar (Azacitidine), Mylotarg (Gemtuzumab Ozogamicin), Nanoparticle Paclitaxel (Paclitaxel Albumin-stabilized, Nanoparticle Formulation), Navelbine (Vinorelbine Tartrate), Nelarabine, Neosar (Cyclophosphamide), Neupogen (Filgrastim), Nexavar (Sorafenib Tosylate), Nilotinib, Nivolumab, Nolvadex (Tamoxifen Citrate), Nplate (Romiplostim), Obinutuzumab, OEPA, Ofatumumab, OFF, Olaparib, Omacetaxine Mepesuccinate, Oncaspar (Pegaspargase), Ontak (Denileukin Diftitox), Opdivo (Nivolumab), OPPA, Oxaliplatin, Paclitaxel, Paclitaxel Albumin-stabilized Nanoparticle Formulation, PAD, Palbociclib, Palifermin, Palonosetron Hydrochloride, Pamidronate Disodium, Panitumumab, Panobinostat, Paraplat (Carboplatin), Paraplatin (Carboplatin), Pazopanib Hydrochloride, Pegaspargase, Peginterferon Alfa-2b, PEG-Intron (Peginterferon Alfa-2b), Pembrolizumab, Pemetrexed Disodium, Perjeta (Pertuzumab), Pertuzumab, Platinol (Cisplatin), Platinol-AQ (Cisplatin), Plerixafor, Pomalidomide, Pomalyst (Pomalidomide), Ponatinib Hydrochloride, Pralatrexate, Prednisone, Procarbazine Hydrochloride, Proleukin (Aldesleukin), Prolia (Denosumab), Promacta (Eltrombopag Olamine), Provenge (Sipuleucel-T), Purinethol (Mercaptopurine), Purixan (Mercaptopurine), Radium 223 Dichloride, Raloxifene Hydrochloride, Ramucirumab, Rasburicase, R-CHOP, R-CVP, Recombinant Human Papillomavirus (HPV) Bivalent Vaccine, Recombinant Human Papillomavirus (HPV) Nonavalent Vaccine, Recombinant Human Papillomavirus (HPV) Quadrivalent Vaccine, Recombinant Interferon Alfa-2b, Regorafenib, R-EPOCH, Revlimid (Lenalidomide), Rheumatrex (Methotrexate), Rituxan (Rituximab), Rituximab, Romidepsin, Romiplostim, Rubidomycin (Daunorubicin Hydrochloride), Ruxolitinib Phosphate, Sclerosol Intrapleural Aerosol (Talc), Siltuximab, Sipuleucel-T, Somatuline Depot (Lanreotide Acetate), Sorafenib Tosylate, Sprycel (Dasatinib), STANFORD V, Sterile Talc Powder (Talc), Steritalc (Talc), Stivarga (Regorafenib), Sunitinib Malate, Sutent (Sunitinib Malate), Sylatron (Peginterferon Alfa-2b), Sylvant (Siltuximab), Synovir (Thalidomide), TAC, Tafinlar (Dabrafenib), Talc, Tamoxifen Citrate, Tarabine PFS (Cytarabine), Tarceva (Erlotinib Hydrochloride), Targretin (Bexarotene), Tasigna (Nilotinib), Taxol (Paclitaxel), Taxotere (Docetaxel), Temodar (Temozolomide), Temozolomide, Temsirolimus, Thalidomide, Thalomid (Thalidomide), Thiotepa, Toposar (Etoposide), Topotecan Hydrochloride, Toremifene, Torisel (Temsirolimus), Tositumomab and I 131 Iodine Tositumomab, Totect (Dexrazoxane Hydrochloride), TPF, Trametinib, Trastuzumab, Treanda (Bendamustine Hydrochloride), Trisenox (Arsenic Trioxide), Tykerb (Lapatinib Ditosylate), Unituxin (Dinutuximab), VAMP, Vandetanib, Vectibix (Panitumumab), VeIP, Velban (Vinblastine Sulfate), Velcade (Bortezomib), Velsar (Vinblastine Sulfate), Vemurafenib, VePesid (Etoposide), Viadur (Leuprolide Acetate), Vidaza (Azacitidine), Vinblastine Sulfate, Vincasar PFS (Vincristine Sulfate), Vincristine Sulfate, Vincristine Sulfate Liposome, Vinorelbine Tartrate, VIP, Vismodegib, Voraxaze (Glucarpidase), Vorinostat, Votrient (Pazopanib Hydrochloride), Wellcovorin (Leucovorin Calcium), Xalkori (Crizotinib), XELIRI, Xeloda (Capecitabine), XELOX, Xgeva (Denosumab), Xofigo (Radium 223 Dichloride), Xtandi (Enzalutamide), Yervoy (Ipilimumab), Zaltrap (Ziv-Aflibercept), Zelboraf (Vemurafenib), Zevalin (Ibritumomab Tiuxetan), Zinecard (Dexrazoxane Hydrochloride), Ziv-Aflibercept, Zoladex (Goserelin Acetate), Zoledronic Acid, Zolinza (Vorinostat), Zometa (Zoledronic Acid), Zydelig (Idelalisib), Zykadia (Ceritinib), and Zytiga (Abiraterone Acetate). An effective amount of such agents can readily be determined by routine experimentation, as can the most effective and convenient route of administration and the most appropriate formulation.

PVT1 Genomic Locus and Loss of Honeybadger

Further to the surprising and unexpected finding that Honeybadger has a positive role as a tumor suppressor, it was also noted in the observations depicted herein that the PVT1 locus plays a significant role in cancer, owing to the instability of the locus. It was also clear from our studies depicted herein that the Honeybadger is lost in patient's cancer cells. In one aspect, various methods of introducing HNB peptides or polypeptides, or nucleic acids encoding the same are provided herein in the sections above.

In some aspects, various methods of reducing the instability of the PVT1 locus are contemplated herein. In some embodiments, methods of preventing PVT1 breakpoint fusions are contemplated. In some embodiments, methods of preventing PVT1 chromosomal fusions are contemplated. In some embodiments, mechanisms of suppressing the chromosomal breakage and repair machinery of a cell in a spatio-temporal manner guided to the PVT1 locus is contemplated. In some embodiments, mechanisms for suppression of inter-chromosomal fusion involving the PVT1 locus is contemplated. In some embodiments, mechanisms for suppression of intra-chromosomal fusion involving the PVT1 locus is contemplated. In some embodiments, mechanisms for preventing extrachromosomal DNA formation fusion involving a nucleic acid sequence found within the PVT1 locus is contemplated.

An extrachromosomal DNA formed as a result of breakage at or within the PVT1 locus may be 10, 20, 30, 40, 50, 100, 1000, 10,000 nucleotides in length. An inhibitory RNA mediated decay of an extrachromosomal nucleic acid (ecDNA) comprising the 5' region of PVT-1 may be contemplated herein. In some embodiments, a site-directed or sequence-targeted approach to prevent formation of extrachromosomal DNA comprising the PVT-1 locus may be contemplated.

EXAMPLES

Example 1. Identification of a Tumor Suppressor Splice Variant PVT1_217

A previously undescribed PVT1 splice variant that can regulate Myc protein was identified. Using the ENSEMBL database, PVT1 splice variants were analyzed. siRNAs were designed to target specific PVT1 splice variants and tested on MSTO-211H cell line for alteration in Myc expression levels. It was found that the siRNA dubbed Ex9 (si_Ex9) increased the expression of Myc protein in the MSTO-211H cell line compared to control siRNA (si_ctrl) or compared to si_C2 (an siRNA specific for CircPVT1, where CircPVT1 is a splice variant previously reported to upregulate Myc expression) (FIG. 1). si_E9 knocked down the expression of a PVT1 splice variant, PVT1_217, indicating a role for PVT1_217 in regulating Myc levels.

Figure 2:
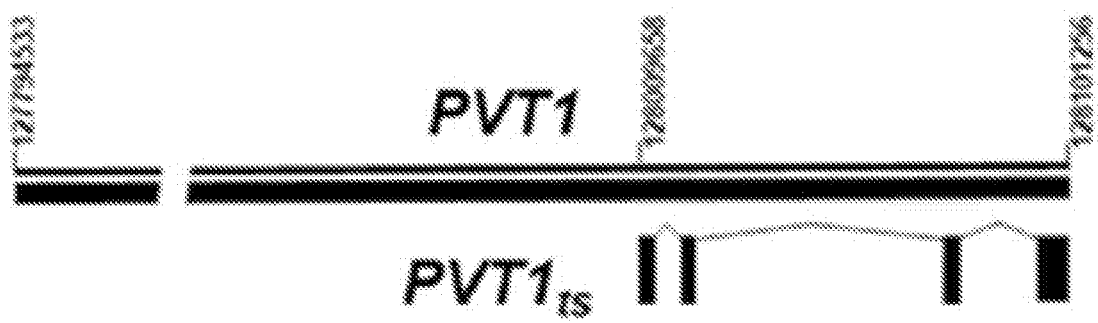
FIG. 2 is a graphical representation of chromosomal maps of PVT1 region showing exons of PVT1_217 splice variants.
Figure 3:
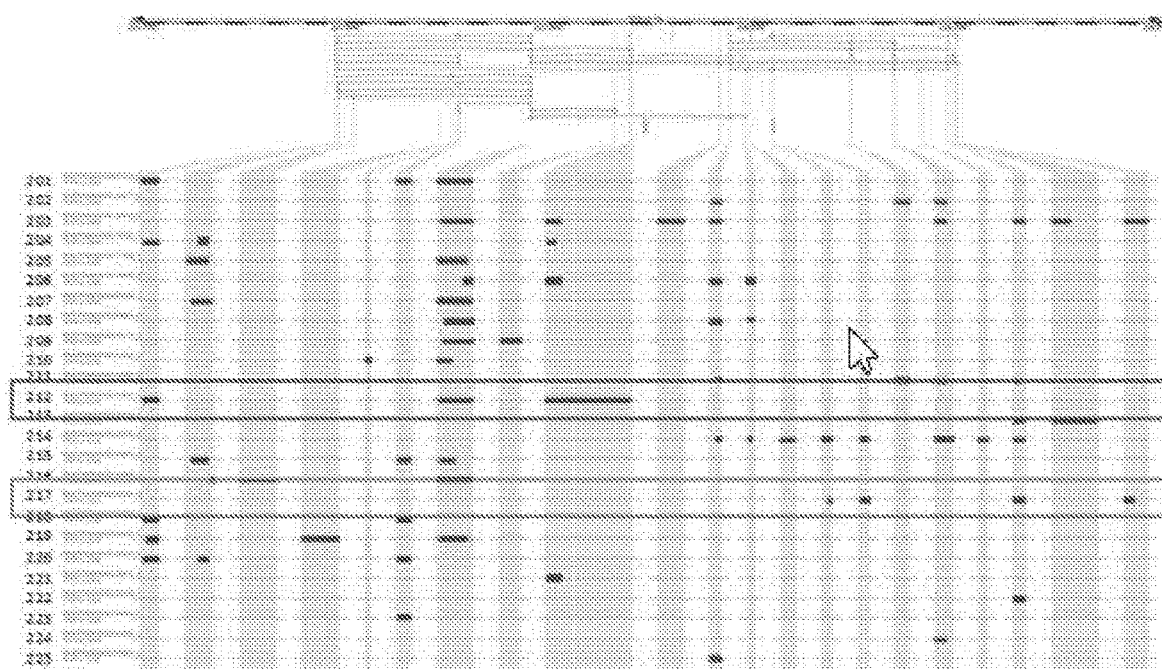
FIG. 3 is a graphic representation of the various PVT1 splice variants (Source: Ensembl database). Splice variant PVT1_212 and PVT1_217 are highlighted.

A 3'RACE of PVT1_217 was performed to confirm its genomic co-ordinates (FIG. 2). It was found that PVT1_217 (referred to herein as PVT1$_{ts}$) comprises 4 exons as shown in the Ensembl database, but its $4^{th}$ exon is incompletely annotated in the Ensembl database. The correct genomic co-ordinates of PVT1$_{ts}$ are depicted in FIG. 3.

Figure 4A:
FIG. 4A is a graphic representation of the four exons of $PVT1_{ts}$, also indicating that siRNA si_E9 targets the sequence on Exon 4.
Figure 4B:
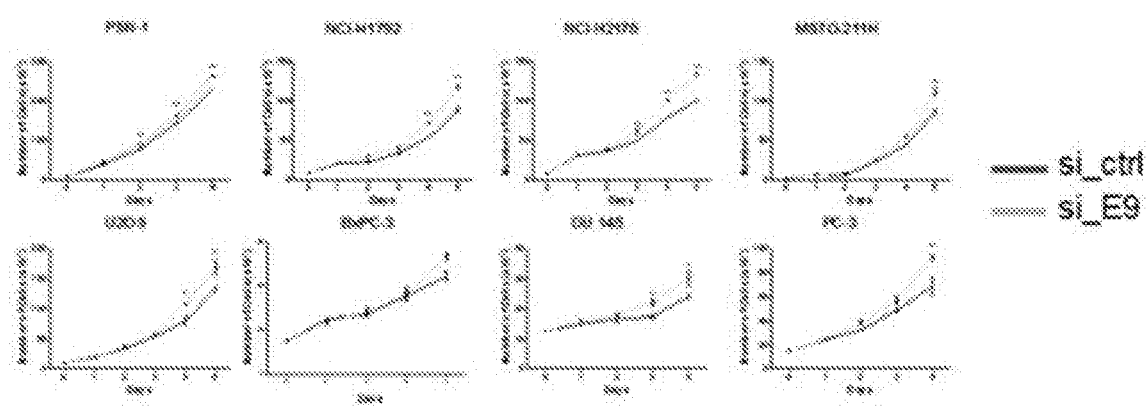
FIG. 4B is representative data from exemplary studies showing proliferation in eight Hi- and Lo-MYC cell lines transfected with si-E9 siRNA or control siRNA.
Figure 5A:
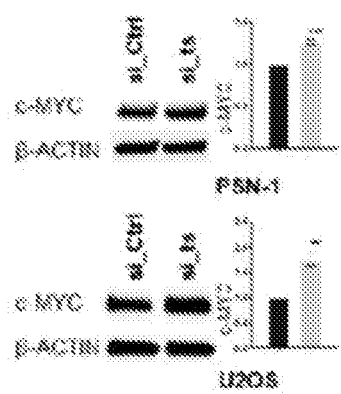
FIG. 5A-5D depicts western blot analysis of MYC protein in Hi- and Lo-MYC cell lines transfected with si_Ctrl (blue left-hand column in each bar graph) and si_E9 (green right-hand column in each bar graph). An antibody against Actin was used as a control to quantify relative MYC expression in the treated cells.
Figure 5B:
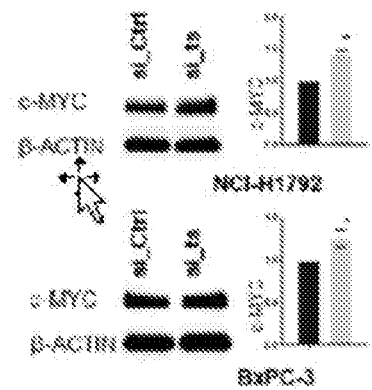
Figure 5C:
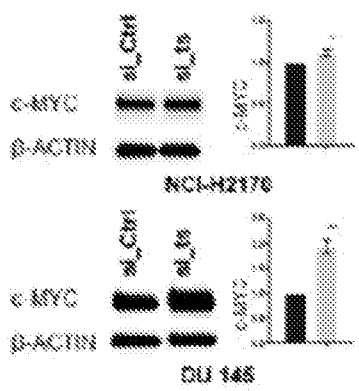
Figure 5D:
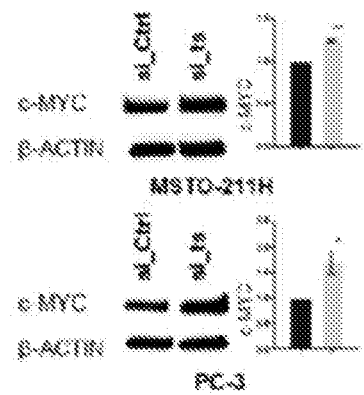

Example 2. PVT1$_{ts}$ Regulates Cell Proliferation and Myc Expression in Hi- and Lo-Myc Cell Lines Small inhibitory RNA was then generated against the PVT1$_{ts}$ splice variant. The si_E9, was shown to target a unique sequence in the exon 4 of PVT1$_{ts}$ (FIG. 4A). Using q-RT-PCR it was verified that si_E9 significantly knocks down PVT1$_{ts}$ while expression of the other transcripts in the PVT1 locus remain unaffected (data not shown). siRNA mediated depletion of PVT1$_{ts}$ was carried out in Hi- and Lo-Myc cell lines, which resulted in increased proliferation of the Hi- as well as Lo-Myc cell lines (FIG. 4B). Additionally, western blot analysis of Myc protein was performed in these cell lines. It was found that inhibition of PVT1$_{ts}$ resulted in higher Myc protein, particularly in the Lo-Myc cell lines (FIG. 5A-D). An antibody against Actin was used as control to quantify relative Myc expression in the treated cells, as shown in FIG. 5A-5D.

Figure 6A:
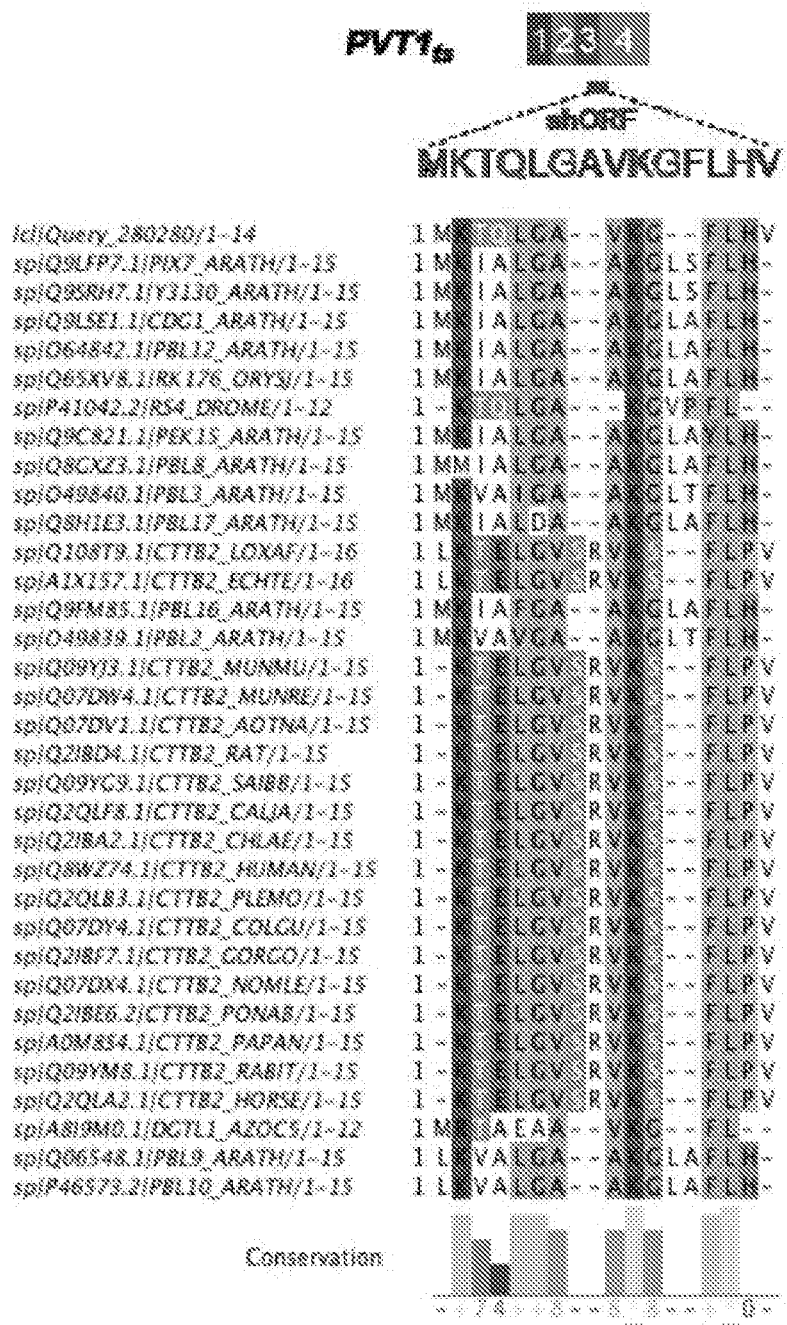
FIG. 6A depicts a schematic representation of the short open reading frame (shORF) at the junction of Exon 3-4 of $PVT1_{ts}$ and the 14 amino acids that the shORF encodes. Below the schematic representation is the alignment of the amino acid sequence of micropeptide HNB (lclquery_280280) with other similar peptide sequences, using Clustal Omega. The conservation index is shown below the alignments.
Figure 6B:
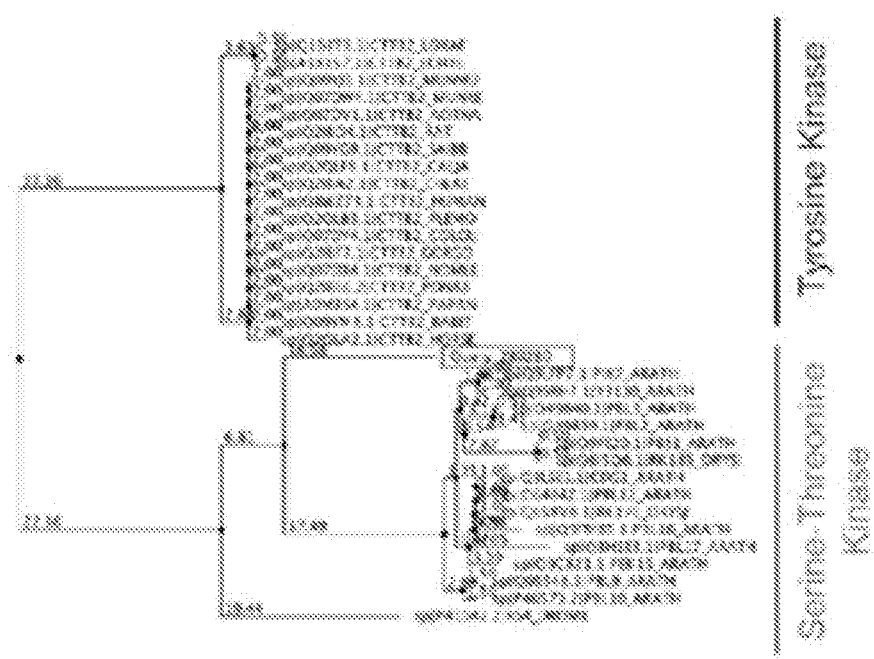
FIG. 6B depicts phylogenetic analysis of the peptide sequences showing similarity with HNB (lclquery_280280).

Example 3. PVT1$_{ts}$ Codes for HONEYBADGER, a 14 Amino Acid Micropeptide with Highly Conserved Residues A close inspection of PVT1$_{ts}$ revealed a short open reading frame (shORF) at the junction of Exon3 and 4. This shORF codes for a 14 amino acid micro-peptide (lclquery_280280, FIG. 6A) with highly conserved residues found in several species (FIG. 6A bottom panel). This 14 amino acid micro-peptide was named as HONEYBADGER (HNB). A phylogenetic analysis revealed that HNB shows significant conservation to the amino acid residues found in catalytic domains of several Tyrosine and Threonine Kinases (FIG. 6B).

Figure 7A:
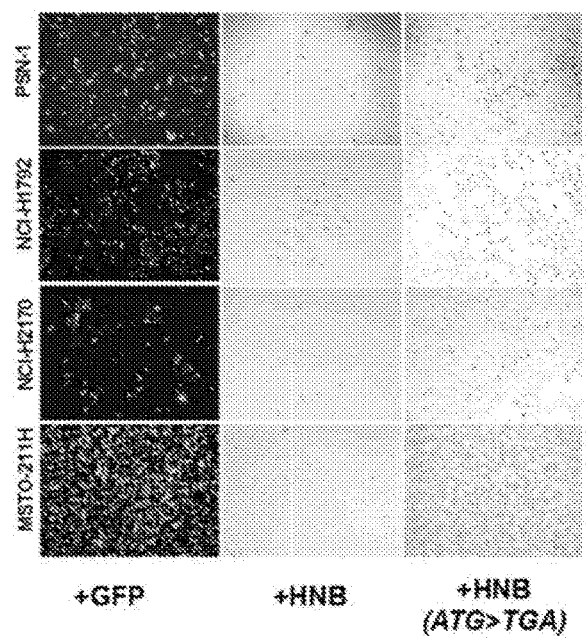
FIG. 7A-7B shows representative photomicrographs depicting levels of cell proliferation of Hi- and Lo-MYC cell lines transfected with GFP, HNB or $HNB_{(ATG>TGA)}$ constructs.
Figure 7B:
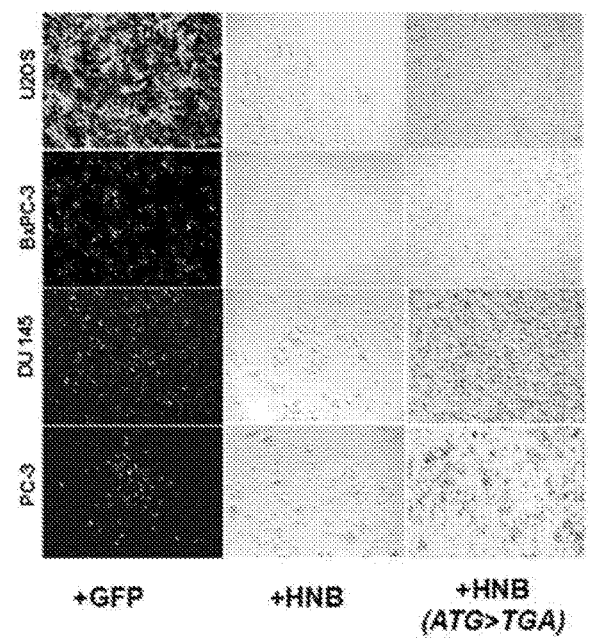

Example 4. Micro-Peptide HNB can Affect Cell Growth and Proliferation and Regulates Myc Protein Expression in Hi- and Lo-Myc Cell Lines To determine the function of the HNB, the Hi- and Lo-Myc cell lines were transfected with lentiviral vectors expressing GFP, HNB or HNB where the start site has been mutated ($HNB_{(ATG>TGA)}$). All of the 8 cell lines where HNB is overexpressed (but not the ones which are transfected with GFP or $HNB_{(ATG>TGA)}$) failed to proliferate, suggesting a role for HNB as a tumor suppressor (FIGS. 7A and 7B).

Figure 8:
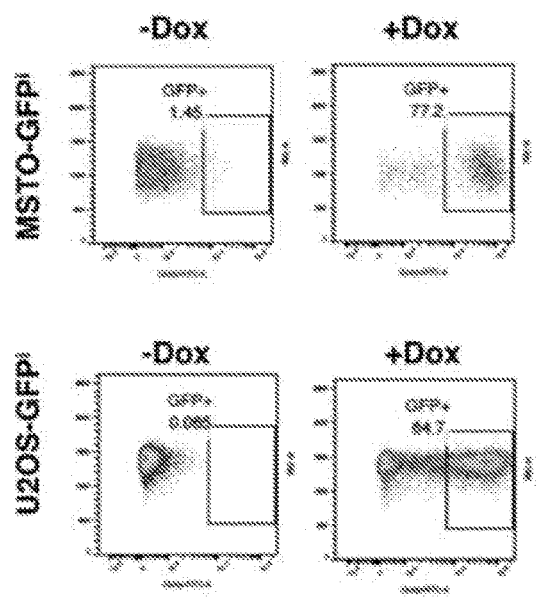
FIG. 8 shows flow cytometry data for verification of a Doxycyclin inducible lentiviral system containing GFP as a transgene.
Figure 9C:
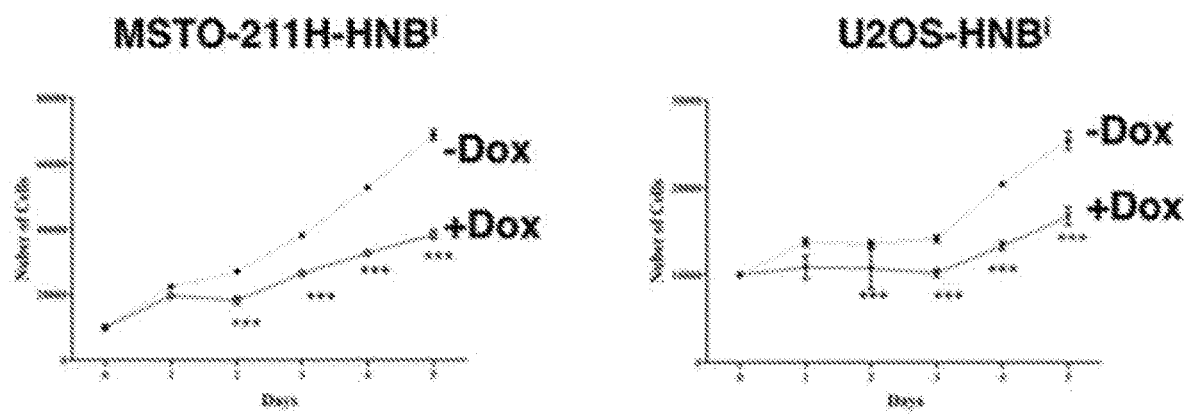
FIG. 9C depicts western blot analysis of c-MYC expression relative to β-Actin expression as control showing induction of HNB expression results in reduced MYC protein.
Figure 9C:
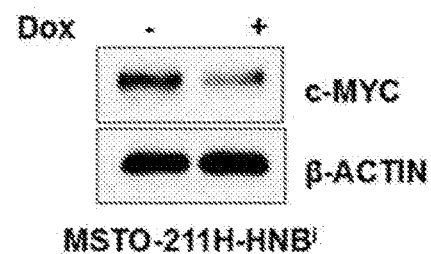

In addition, an inducible lentiviral system was developed, in which the transgene could be expressed under a Doxycycline inducible promoter. The system was verified by inserting eGFP as the transgene and by flow analysis of $GFP^+$ cells in absence and presence of doxycycline as shown in FIG. 8. Two stable cell lines MSTO-211H-$GFP^i$ and U2OS-$GFP^i$ were created where a GFP transgene was placed under the regulation of a Dox inducible promoter showed robust expression of GFP following treatment of 1 ug/ml of Doxycycline within 24 hours. The same system was used to clone HNB under the regulation of a Doxycycline inducible promoter and generate the cell lines MSTO-211H-$HNB^i$ and U2OS-$HNB^i$. Following Doxycycline treatment, both the cell lines exhibited significant reduction in their proliferation rates, thus confirming that HNB can affect growth and proliferation of cancer cells (FIG. 9A and FIG. 9B). Western blot analysis was performed of Myc protein in Hi-Myc cell line MSTO-211H-$HNB^i$. Myc protein expression was decreased following the induction of doxycycline in this cell line, indicating that HNB is a potential regulator of Myc protein (FIG. 9C).

Figure 10:
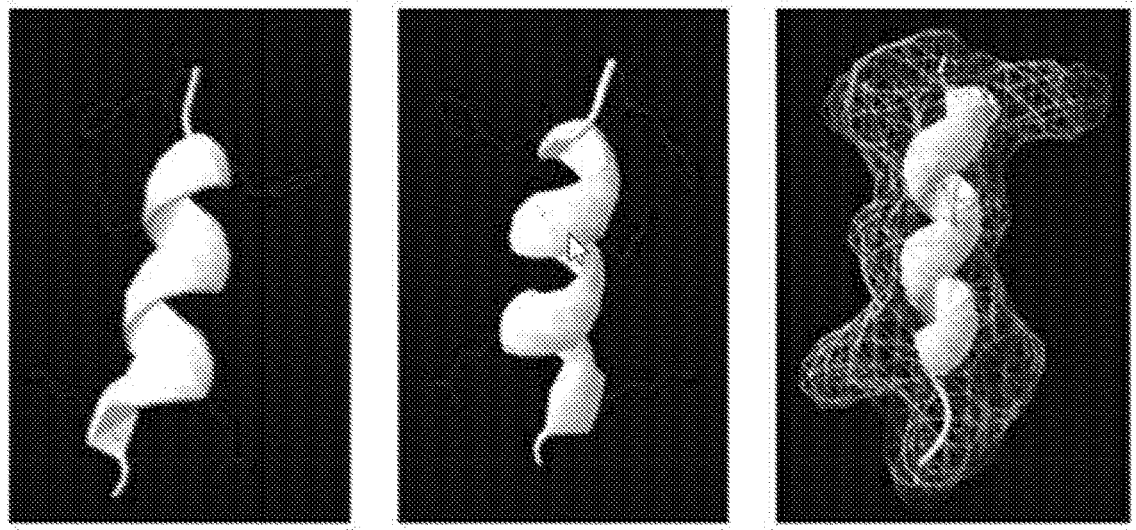
FIG. 10 depicts the predicted structure of the 14 amino acid micro-peptide HNB using Swiss-Pdb viewer, anterior view (left), posterior view (middle) and electron density map (web) view of HNB.
Figure 11:
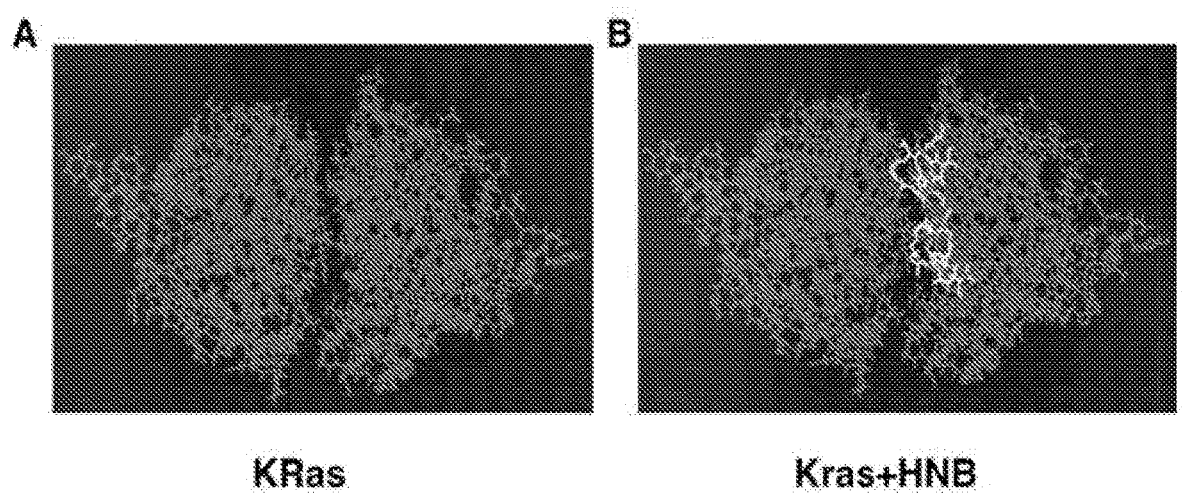
FIG. 11A-B depicts a predicted molecular interaction between KRas and HNB.
Figure 12:
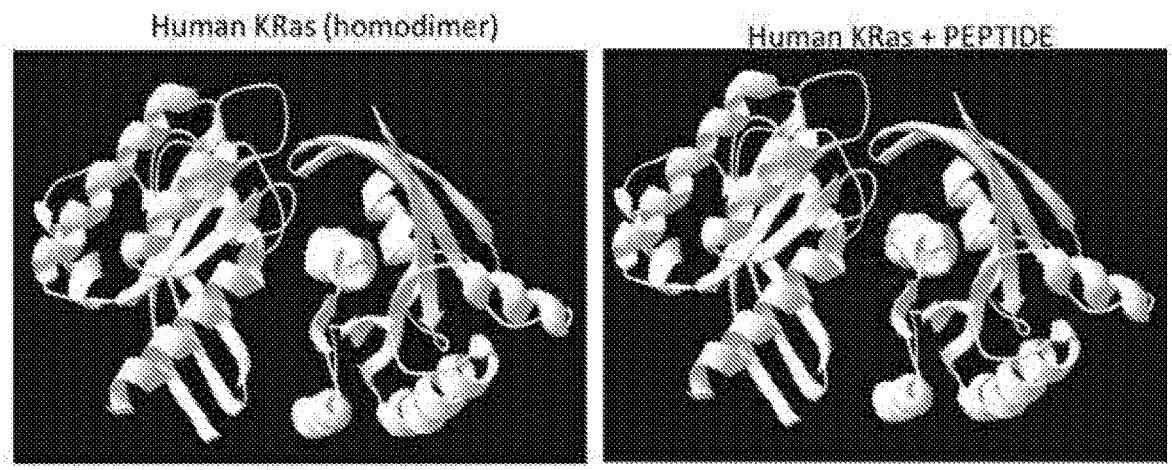
FIG. 12 depicts the predicted disruption of KRas (homodimer shown in left-hand panel) by the HNB micropeptide (shown in red, right-hand panel).

Example 5. Micro-Peptide HNB is Predicted to Inhibit the Dimerization of KRAS Oncoprotein In order to determine the mechanism by which HNB may act as a tumor suppressor, a computational analysis was carried out using the predicted structure of HNB (FIG. 10) and its possible interacting partners. Micropeptides are usually single domain peptides. To test whether some of the known oncoproteins with Tyrosine or Serine-Threonine Kinase domains could possibly interact with HNB, Deepview (Swiss-Pdb Viewer) was used. This application provides a user-friendly interface to analyze multiple proteins and their possible interactions at the same time. Using this application, HNB interaction with KRas oncogene between residues 147-156, a critical region for KRas dimerization and oncogenic activity, is modeled (FIG. 10). KRas can phosphorylate and stabilize the Myc transcription factor, thus HNB interaction with and preventing KRas dimerization can lead to c-Myc inhibition (FIGS. 11 and 12).

Figure 13:
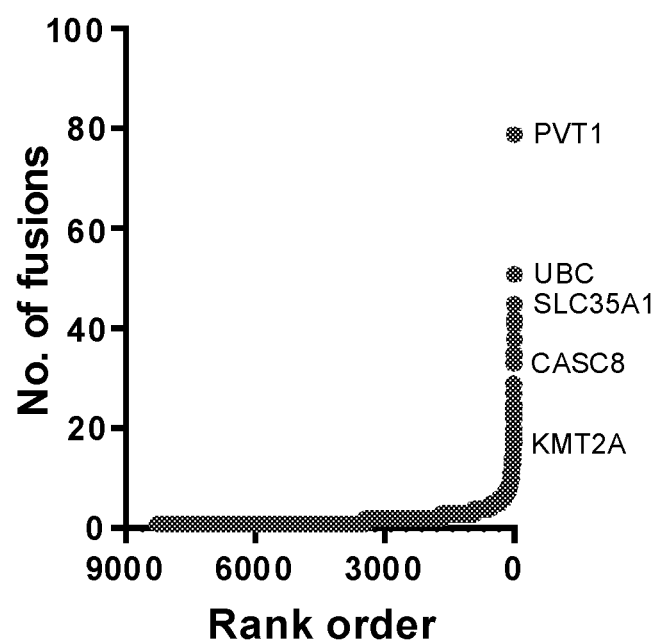
FIG. 13 depicts results from analysis of CCLE dataset and indicates that PVT1 is the most frequent participant in gene fusions in the CCLE dataset.
Figure 14:
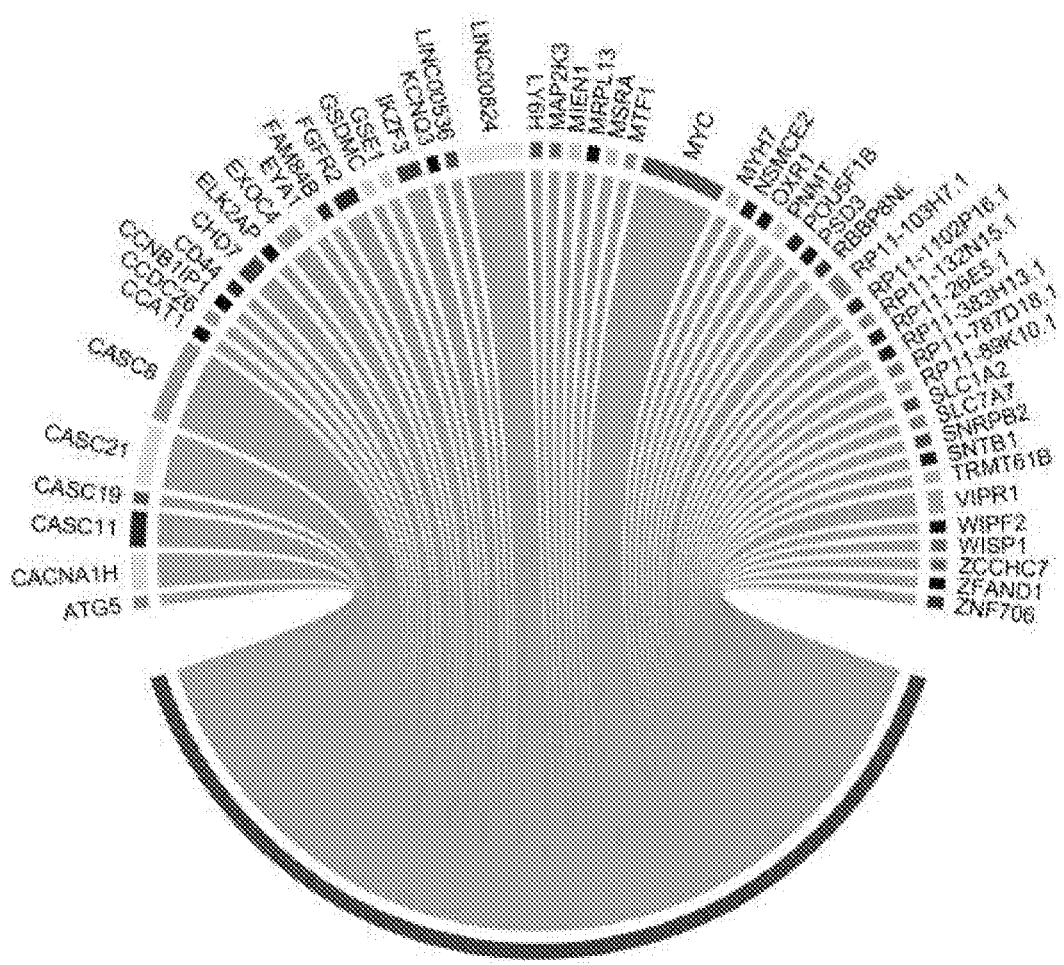
FIG. 14 depicts PVT1 fusion positive cancer types. Different types of PVT1 fusion-positive cancers represented in the CCLE dataset are shown in the Donut plot with the slice proportional to the numbers for each indicated cancer type at the bottom
Figure 15:
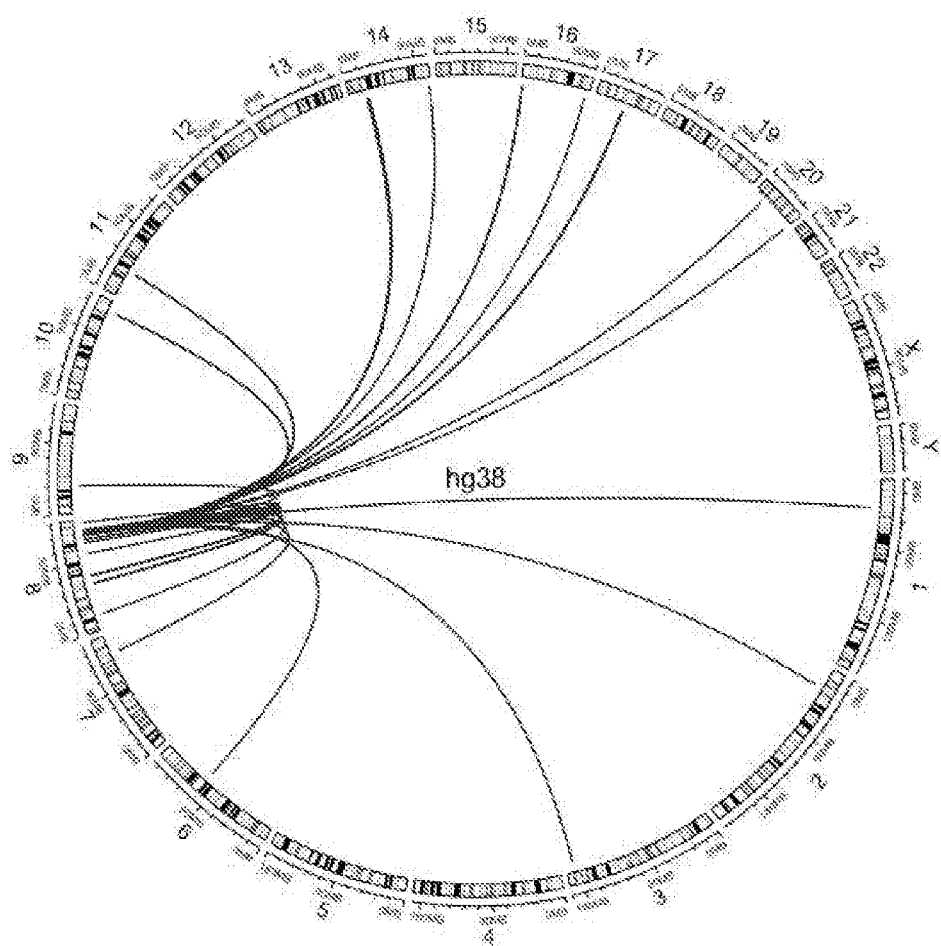
FIG. 15 depicts diverse partners of PVT1. All the different partners of PVT1 are shown in the Sankey plot, with the thickness of the connecting ribbon representing the number of times each fusion is observed in CCLE.

Example 6. Tumor Suppressor Honeybadger is Lost Through Frequent Genomic Rearrangements in Human Cancer Cells In order to comprehensively determine the frequency of PVT1 gene fusions in human cancer, an analysis of gene fusion data from transcriptomic studies (RNA-seq) on the cancer cell line encyclopedia (CCLE) dataset was conducted. Strikingly, the analysis demonstrated that PVT1 is the most frequent participant in gene fusions in the entire CCLE dataset (FIG. 13) and Table 2. In contrast to other well-characterized fusions involving genes such as BCR, KMT2A and ALK that are mostly observed in specific sub-types of cancer, PVT1 gene fusions were observed in nearly all cancers represented in the CCLE database (FIG. 14). Furthermore, PVT1 was also the most promiscuous of fusion-genes, partnering with at least 54 different fusion partners indicating that PVT1 is a nodal locus in tumorigenesis and there are diverse ways in which this locus is disrupted in cancer (FIG. 15).

Figure 16:
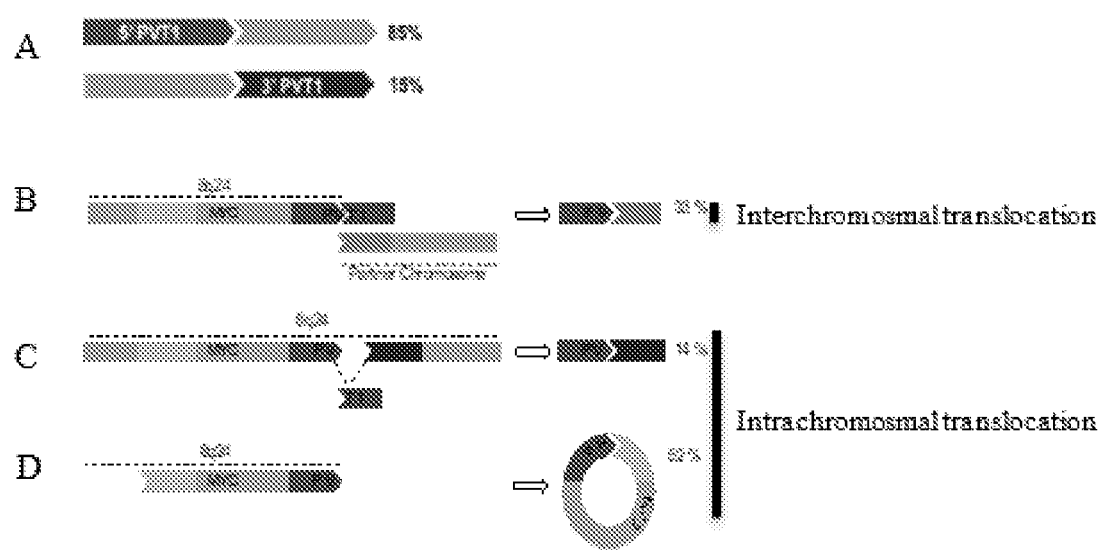
FIG. 16 depicts Circos plot showing inter and intrachromosomal partners of PVT1.

In this comprehensive analysis of PVT1 fusions, some remarkable observations were made. First, most PVT1 gene fusions were not frame-retaining, indicating that these fusions cannot form chimeric oncoproteins, unlike other well-characterized gene fusions such as the BCR-ABL or the KMT2A-MLLT3 fusions genes. It was observed that the fusion partners of PVT1 were both intrachromosomal and interchromosomal (FIG. 16). More interestingly, the PVT1 gene rearrangements were unbalanced. In most of the fusion products, PVT1 was the 5' fusion partner (85%) and the breakpoint often taking place at the 5' half of the gene (FIG. 16A).

Second, 33% of these PVT1 fusions involved a partner gene on a different chromosome (interchromosomal fusions) (FIG. 16B), whereas nearly 66% of the fusions involved a partner gene on the same chromosome (intrachromosomal fusions) (FIGS. 16C and 16D).

Figure 17:
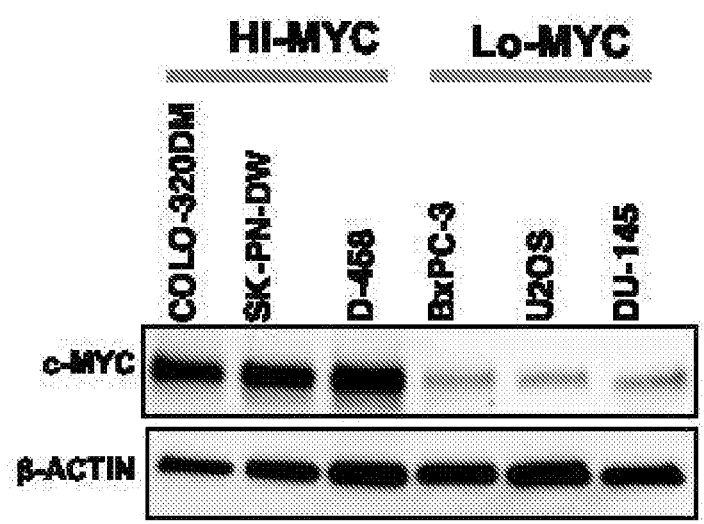
FIG. 17 depicts distinct types of translocations in PVT1 locus.

Third, and most surprisingly, a vast majority of the intrachromosomal PVT1 gene fusions fuse PVT1 to a gene partner on 8q24 that is located upstream of PVT1, such as CASC11, CASC8 or MYC (FIG. 16D). It is important to note that in normal cells, the PVT1 gene is located downstream of CASC11, CASC8 and MYC genes in a centromere to telomere orientation on chromosome band 8q24. Therefore, it is intriguing to note that nearly all of the intrachromosomal fusions of PVT1 fuse the 5' part of PVT1 to a gene located upstream on chromosome 8. Without wishing to be bound by a theory, it could be most likely that such PVT1 gene-fusions are formed as extrachromosomal double minutes (dmin) or extrachromosomal DNA (ecDNA). If such ecDNAs are formed from the juxtaposition of the PVT1 5' end to genes centromeric (upstream) to PVT1, then it would lead to the enrichment of the PVT1 5' region, relative to its 3' end which is not involved in the ecDNA formation. To directly determine if this is true, we first selected three representative cell lines harboring high PVT1 fusion transcripts for further analysis: COLO-320DM (colorectal), SK-PN-DW (primitive neuroectodermal tumor (PNET)) and D458 (Medulloblastoma). Cell lines that are copy number neutral for the MYC-PVT1 region and do not harbor any breakpoint in the PVT1 locus—(U2OS (osteosarcoma), BxPC-3 (pancreatic adenocarcinoma) and DU 145 (prostate adenocarcinoma)) were chosen as control. As expected, western blot analysis revealed higher MYC expression in COLO-320DM, SK-PN-DW and D458 (Hi-MYC cell lines) compared to U2OS, BxPC-3 and DU 145 (Lo-MYC cell lines) (FIG. 17).

Figure 18:
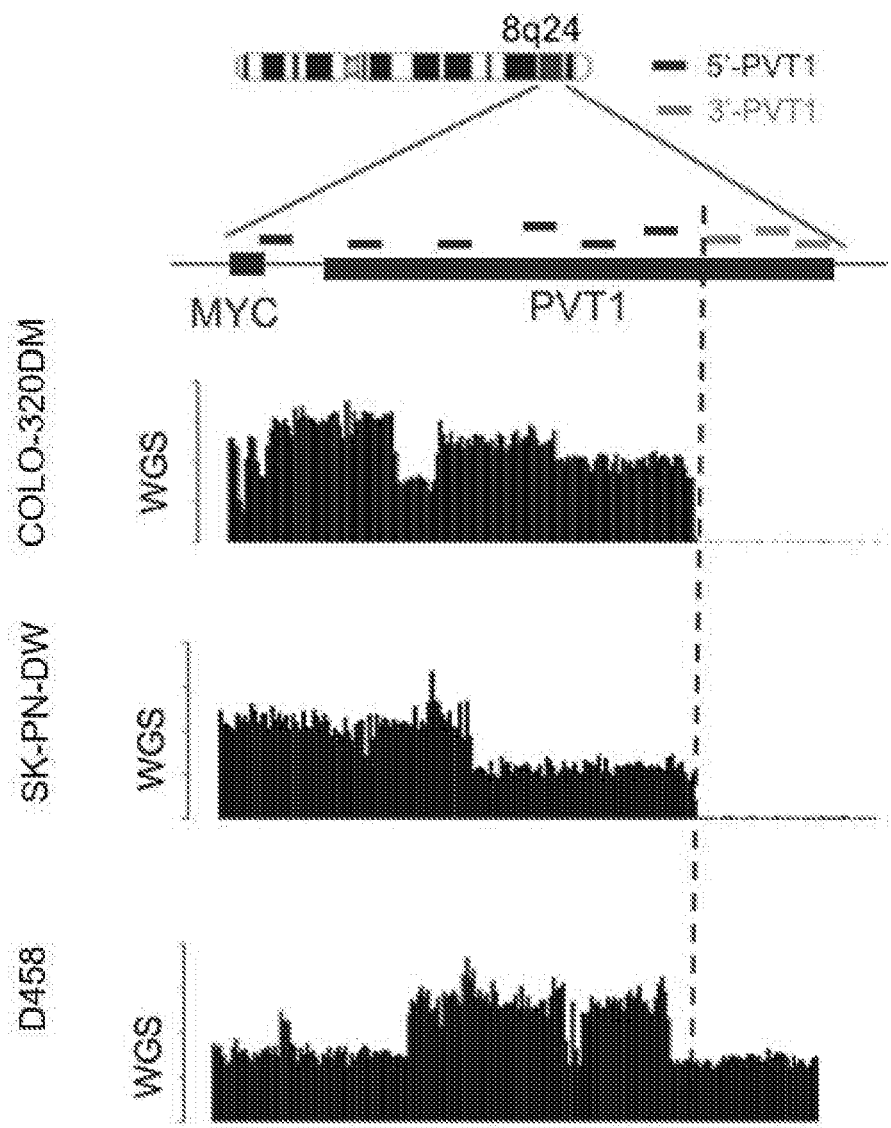
FIG. 18 depicts western blot of MYC in cell lines with breakpoints in PVT1 locus (Hi-MYC) and cell lines without breakpoints in PVT1.

To test a hypothesis that genomic arrangements inside the PVT1 locus leads to unbalanced enrichment of the 5'- but not the 3'-region of PVT1, whole genome sequencing (WGS) of COLO-320DM, SK-PN-DW and D458 was carried out. All three Hi-MYC cell lines showed a remarkable enrichment of genomic sequencing reads from the 5'- compared to 3'-half of PVT1 locus (FIG. 18). In comparison, neither of the U2OS, BxPC-3 or DU 145 showed such asymmetric enrichment.

Figure 19:
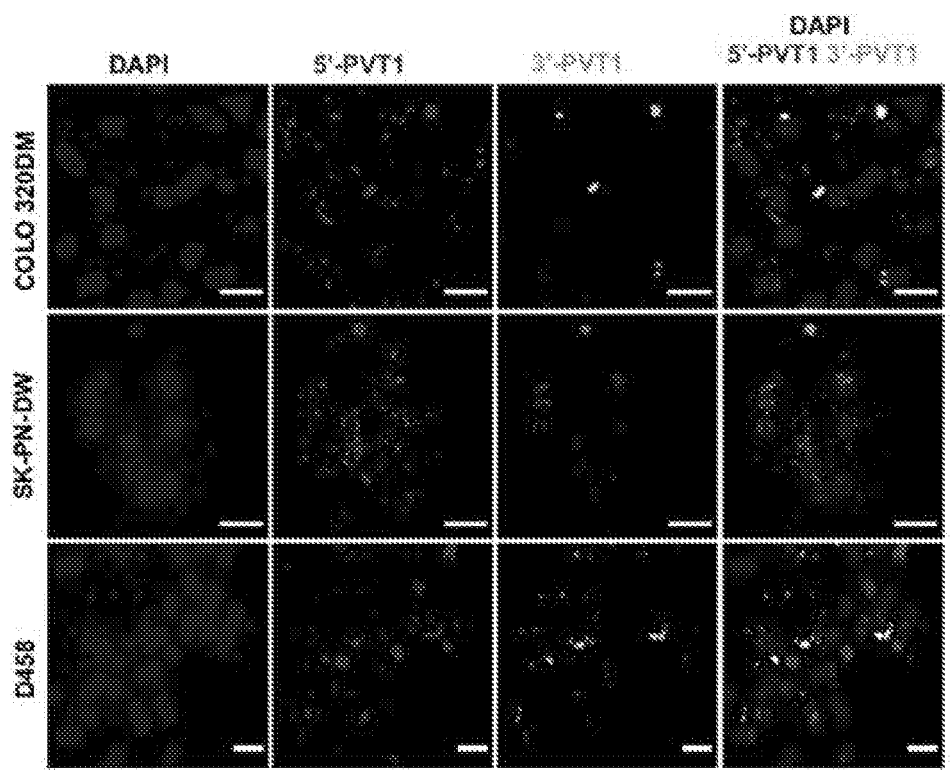
FIG. 19 depicts whole genome sequencing for COLO-320DM, SK-PN-DW and D458 showing genomic enrichment of 5' end of PVT1 with concurrent depletion of the 3'end of PVT1.
Figure 20A:
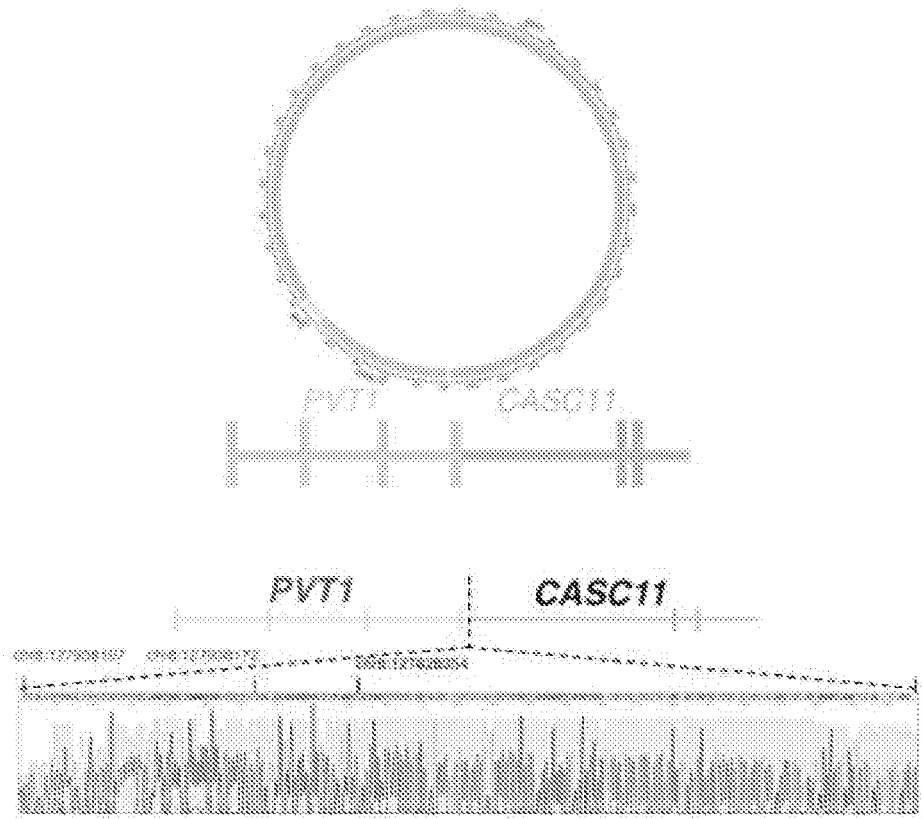
FIGS. 20A and 20B depicts mapping and validation of the PVT1 junction points in the ecDNA from COLO-320DM and D458.
Figure 20B:
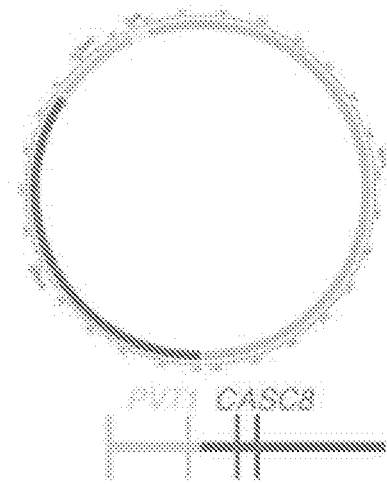
Figure 20B:
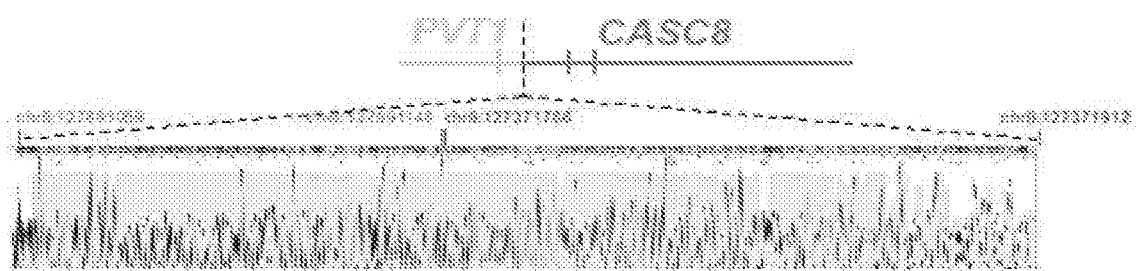

It was next hypothesized that the breakpoints in the PVT1 locus could result in ecDNA formation. To test the hypothesis, dual color FISH in the Hi-MYC cell lines using separate probes spanning the 5' and 3' ends of the PVT1 locus were carried out (FIG. 19). Strikingly, it was observed that COLO-320DM and SK-PN-DW almost exclusively harbor the MYC-PVT1 amplicons as ecDNAs, with majority of the ecDNAs containing the 5'-, but not the 3'-end of PVT1, as shown in FIG. 19. D458 appeared to contain a mix of homology stained regions (hsr) as well as ecDNAs with excess representation of 5'-half of PVT1. We confirmed the ecDNA junctions by reconstructing the paired-end discordant junctional reads in silico in COLO-320DM and D458 and confirmed their presence using PCR followed by Sanger sequencing (FIG. 20A-20B). These results provide strong evidence that genomic rearrangement in the PVT1 locus leads to robust enrichment of 5'-end but loss of the 3'-segment of PVT1 through formation of ecDNAs. Therefore, it seems possible that formation of ecDNA using breakpoints in the PVT1 as the primary mechanism of loss of Honeybadger in the patients.

TABLE 2

| | Gene name | Rank | Fusions |
|---|---|---|---|
| 1. | PVT1 | 1 | 79 |
| 2. | TSHZ2 | 2 | 51 |
| 3. | UBC | 3 | 51 |
| 4. | RCC1 | 4 | 45 |
| 5. | SLC35A1 | 5 | 45 |
| 6. | PRR16 | 6 | 42 |
| 7. | CTD-2334D19.1 | 7 | 41 |
| 8. | NCOR2 | 8 | 41 |
| 9. | EWSR1 | 9 | 38 |
| 10. | NBAS | 10 | 35 |
| 11. | VMP1 | 11 | 35 |
| 12. | CASC8 | 12 | 33 |
| 13. | FLI1 | 13 | 29 |
| 14. | CASC21 | 14 | 27 |
| 15. | CTD-2215E18.1 | 15 | 27 |
| 16. | LINC01340 | 16 | 27 |
| 17. | CASC11 | 17 | 25 |
| 18. | MID1 | 18 | 25 |
| 19. | ABL1 | 19 | 24 |
| 20. | RP11-120D5.1 | 20 | 24 |
| 21. | BCR | 21 | 23 |
| 22. | FGFR2 | 22 | 22 |
| 23. | RPS6KB1 | 23 | 22 |
| 24. | MTAP | 24 | 20 |
| 25. | ALK | 25 | 19 |
| 26. | C9orf3 | 26 | 18 |
| 27. | CCAT1 | 27 | 18 |
| 28. | SHANK2 | 28 | 18 |
| 29. | CDKN2B-AS1 | 29 | 17 |
| 30. | KMT2A | 30 | 17 |
| 31. | BCAS3 | 31 | 16 |
| 32. | CLTC | 32 | 16 |
| 33. | CPSF6 | 33 | 16 |
| 34. | CUX1 | 34 | 16 |
| 35. | IKZF3 | 35 | 16 |
| 36. | NF1 | 36 | 16 |
| 37. | ASAP1 | 37 | 15 |
| 38. | ERBB2 | 38 | 15 |
| 39. | FRS2 | 39 | 15 |
| 40. | AKT3 | 40 | 14 |
| 41. | ANKRD11 | 41 | 14 |
| 42. | FCHSD2 | 42 | 14 |
| 43. | IGHG1 | 43 | 14 |
| 44. | MYC | 44 | 14 |
| 45. | R3HDM2 | 45 | 14 |
| 46. | RLF | 46 | 14 |
| 47. | SMARCA4 | 47 | 14 |
| 48. | TRIT1 | 48 | 14 |
| 49. | TTC28 | 49 | 14 |
| 50. | ADK | 50 | 13 |
| 51. | DDX1 | 51 | 13 |
| 52. | DSCR4 | 52 | 13 |
| 53. | EXT1 | 53 | 13 |
| 54. | FTH1 | 54 | 13 |
| 55. | KCNJ6 | 55 | 13 |
| 56. | KCTD1 | 56 | 13 |
| 57. | MIR205HG | 57 | 13 |

TABLE 2-continued

| | Gene name | Rank | Fusions |
|---|---|---|---|
| 58. | PCAT18 | 58 | 13 |
| 59. | PTK2 | 59 | 13 |
| 60. | RERE | 60 | 13 |
| 61. | SCARB1 | 61 | 13 |
| 62. | WNK1 | 62 | 13 |
| 63. | BBOX1-AS1 | 63 | 12 |
| 64. | CHD2 | 64 | 12 |
| 65. | CMAS | 65 | 12 |
| 66. | EIF5A | 66 | 12 |
| 67. | SLC5A12 | 67 | 12 |
| 68. | TRAPPC9 | 68 | 12 |
| 69. | WIPF2 | 69 | 12 |
| 70. | WWOX | 70 | 12 |
| 71. | COL14A1 | 71 | 11 |
| 72. | DPYD | 72 | 11 |
| 73. | LINC00511 | 73 | 11 |
| 74. | LINC00824 | 74 | 11 |
| 75. | MYH9 | 75 | 11 |
| 76. | RP11-59N23.1 | 76 | 11 |
| 77. | TXNRD1 | 77 | 11 |
| 78. | USP34 | 78 | 11 |
| 79. | GPHN | 79 | 10 |
| 80. | MAD1L1 | 80 | 10 |
| 81. | MSI2 | 81 | 10 |
| 82. | NUMB | 82 | 10 |
| 83. | OS9 | 83 | 10 |
| 84. | PACS1 | 84 | 10 |
| 85. | PICALM | 85 | 10 |
| 86. | RP1-78O14.1 | 86 | 10 |
| 87. | RUNX1 | 87 | 10 |
| 88. | SPIDR | 88 | 10 |
| 89. | TCF12 | 89 | 10 |
| 90. | UBE2D2 | 90 | 10 |
| 91. | USP32 | 91 | 10 |
| 92. | UVRAG | 92 | 10 |
| 93. | C10orf11 | 93 | 9 |
| 94. | CAPZA2 | 94 | 9 |
| 95. | CCDC57 | 95 | 9 |
| 96. | CDKAL1 | 96 | 9 |
| 97. | CREBBP | 97 | 9 |
| 98. | CSNK1G2 | 98 | 9 |
| 99. | DIP2B | 99 | 9 |
| 100. | FAM222B | 100 | 9 |
| 101. | FBXL20 | 101 | 9 |
| 102. | FHOD3 | 102 | 9 |
| 103. | FOXK2 | 103 | 9 |
| 104. | GAB2 | 104 | 9 |
| 105. | GNB1 | 105 | 9 |
| 106. | IMMP2L | 106 | 9 |
| 107. | ITPR2 | 107 | 9 |
| 108. | LSAMP | 108 | 9 |
| 109. | MIR1204 | 109 | 9 |
| 110. | MYCL | 110 | 9 |
| 111. | NEGR1 | 111 | 9 |
| 112. | OXR1 | 112 | 9 |
| 113. | PACSIN2 | 113 | 9 |
| 114. | PAWR | 114 | 9 |
| 115. | PSD3 | 115 | 9 |
| 116. | RARA | 116 | 9 |
| 117. | SCAPER | 117 | 9 |
| 118. | SIPA1L3 | 118 | 9 |
| 119. | SLC39A11 | 119 | 9 |
| 120. | TANC2 | 120 | 9 |
| 121. | TENM4 | 121 | 9 |
| 122. | TNFAIP8 | 122 | 9 |
| 123. | TNRC18 | 123 | 9 |
| 124. | VCL | 124 | 9 |
| 125. | YAP1 | 125 | 9 |
| 126. | AC013394.2 | 126 | 8 |
| 127. | ALG14 | 127 | 8 |
| 128. | ANKS1B | 128 | 8 |
| 129. | CCDC91 | 129 | 8 |
| 130. | CCSER1 | 130 | 8 |
| 131. | CDH13 | 131 | 8 |
| 132. | CLEC16A | 132 | 8 |
| 133. | CTBP1 | 133 | 8 |
| 134. | CTDSP2 | 134 | 8 |
| 135. | DDX10 | 135 | 8 |

TABLE 2-continued

|  | Gene name | Rank | Fusions |
|---|---|---|---|
| 136. | DOCK4 | 136 | 8 |
| 137. | ERC1 | 137 | 8 |
| 138. | ERG | 138 | 8 |
| 139. | FAM49B | 139 | 8 |
| 140. | HERC1 | 140 | 8 |
| 141. | HM13 | 141 | 8 |
| 142. | JUP | 142 | 8 |
| 143. | KANSL1 | 143 | 8 |
| 144. | KIAA1671 | 144 | 8 |
| 145. | LDLR | 145 | 8 |
| 146. | LINC00276 | 146 | 8 |
| 147. | MACF1 | 147 | 8 |
| 148. | MAML2 | 148 | 8 |
| 149. | MYCN | 149 | 8 |
| 150. | NFAT5 | 150 | 8 |
| 151. | NSD1 | 151 | 8 |
| 152. | PDE4D | 152 | 8 |
| 153. | PHF12 | 153 | 8 |
| 154. | PPFIA1 | 154 | 8 |
| 155. | PRKCE | 155 | 8 |
| 156. | PRKCH | 156 | 8 |
| 157. | PTEN | 157 | 8 |
| 158. | PTPN12 | 158 | 8 |
| 159. | RABGAP1L | 159 | 8 |
| 160. | RAD9A | 160 | 8 |
| 161. | RBM6 | 161 | 8 |
| 162. | RHOA | 162 | 8 |
| 163. | SAMD12 | 163 | 8 |
| 164. | SMURF2 | 164 | 8 |
| 165. | SMYD3 | 165 | 8 |
| 166. | SYT14 | 166 | 8 |
| 167. | TECPR2 | 167 | 8 |
| 168. | TOM1L2 | 168 | 8 |
| 169. | TRPC4AP | 169 | 8 |
| 170. | UBE4B | 170 | 8 |
| 171. | VPS53 | 171 | 8 |
| 172. | ZFPM2-AS1 | 172 | 8 |
| 173. | AC016907.3 | 173 | 7 |
| 174. | ACACA | 174 | 7 |
| 175. | ADAMTS20 | 175 | 7 |
| 176. | AFF3 | 176 | 7 |
| 177. | AGO2 | 177 | 7 |
| 178. | ARID1A | 178 | 7 |
| 179. | ASAP2 | 179 | 7 |
| 180. | ATAD2 | 180 | 7 |
| 181. | BCAR3 | 181 | 7 |
| 182. | CAMTA1 | 182 | 7 |
| 183. | CBFA2T3 | 183 | 7 |
| 184. | CBFB | 184 | 7 |
| 185. | CDC6 | 185 | 7 |
| 186. | CDKN2A | 186 | 7 |
| 187. | CHD7 | 187 | 7 |
| 188. | CHKA | 188 | 7 |
| 189. | CMSS1 | 189 | 7 |
| 190. | DNM2 | 190 | 7 |
| 191. | EXOC4 | 191 | 7 |
| 192. | EYS | 192 | 7 |
| 193. | FAM172A | 193 | 7 |
| 194. | FHIT | 194 | 7 |
| 195. | FOCAD | 195 | 7 |
| 196. | GACAT3 | 196 | 7 |
| 197. | HERC2P3 | 197 | 7 |
| 198. | HIF1A | 198 | 7 |
| 199. | ITCH | 199 | 7 |
| 200. | ITGB3BP | 200 | 7 |
| 201. | KMT2C | 201 | 7 |
| 202. | KMT2E | 202 | 7 |
| 203. | LINC-PINT | 203 | 7 |
| 204. | MAP4 | 204 | 7 |
| 205. | MECOM | 205 | 7 |
| 206. | MED13 | 206 | 7 |
| 207. | MICAL3 | 207 | 7 |
| 208. | MTMR3 | 208 | 7 |
| 209. | MTSS1 | 209 | 7 |
| 210. | NAP1L1 | 210 | 7 |
| 211. | NIPBL | 211 | 7 |
| 212. | NPHP4 | 212 | 7 |
| 213. | NPLOC4 | 213 | 7 |
| 214. | NUP214 | 214 | 7 |
| 215. | NUP98 | 215 | 7 |
| 216. | NXN | 216 | 7 |
| 217. | PARD3 | 217 | 7 |
| 218. | PDCD6 | 218 | 7 |
| 219. | PDE8A | 219 | 7 |
| 220. | PGAP3 | 220 | 7 |
| 221. | PHF14 | 221 | 7 |
| 222. | PPP1R12A | 222 | 7 |
| 223. | PPP6R3 | 223 | 7 |
| 224. | PPT1 | 224 | 7 |
| 225. | PTPN23 | 225 | 7 |
| 226. | QKI | 226 | 7 |
| 227. | RAD51B | 227 | 7 |
| 228. | RBL1 | 228 | 7 |
| 229. | RPTOR | 229 | 7 |
| 230. | SBNO2 | 230 | 7 |
| 231. | SLMAP | 231 | 7 |
| 232. | SPON2 | 232 | 7 |
| 233. | SPRED2 | 233 | 7 |
| 234. | TAOK1 | 234 | 7 |
| 235. | THADA | 235 | 7 |
| 236. | TNPO2 | 236 | 7 |
| 237. | TP53 | 237 | 7 |
| 238. | TPX2 | 238 | 7 |
| 239. | TSFM | 239 | 7 |
| 240. | UNK | 240 | 7 |
| 241. | WHSC1 | 241 | 7 |
| 242. | XPR1 | 242 | 7 |
| 243. | ACOT7 | 243 | 6 |
| 244. | ACTN4 | 244 | 6 |
| 245. | AFAP1 | 245 | 6 |
| 246. | AKAP13 | 246 | 6 |
| 247. | AP3D1 | 247 | 6 |
| 248. | ARFGEF2 | 248 | 6 |
| 249. | BAZ2A | 249 | 6 |
| 250. | C7orf50 | 250 | 6 |
| 251. | CABIN1 | 251 | 6 |
| 252. | CAMSAP2 | 252 | 6 |
| 253. | CCDC146 | 253 | 6 |
| 254. | CDK12 | 254 | 6 |
| 255. | CHMP1A | 255 | 6 |
| 256. | CHST11 | 256 | 6 |
| 257. | COL4A1 | 257 | 6 |
| 258. | CTNNA1 | 258 | 6 |
| 259. | CUL5 | 259 | 6 |
| 260. | DAPK2 | 260 | 6 |
| 261. | DNMT1 | 261 | 6 |
| 262. | DOCK5 | 262 | 6 |
| 263. | EP300 | 263 | 6 |
| 264. | FAF1 | 264 | 6 |
| 265. | FAM168A | 265 | 6 |
| 266. | FAM219A | 266 | 6 |
| 267. | FLNB | 267 | 6 |
| 268. | FNDC3B | 268 | 6 |
| 269. | GIGYF2 | 269 | 6 |
| 270. | GLIS3 | 270 | 6 |
| 271. | GMDS | 271 | 6 |
| 272. | GON4L | 272 | 6 |
| 273. | GPC6 | 273 | 6 |
| 274. | GRAMD4 | 274 | 6 |
| 275. | GRB7 | 275 | 6 |
| 276. | HECTD1 | 276 | 6 |
| 277. | HECTD4 | 277 | 6 |
| 278. | HNRNPH1 | 278 | 6 |
| 279. | HSD17B4 | 279 | 6 |
| 280. | HSDL2 | 280 | 6 |
| 281. | IKZF2 | 281 | 6 |
| 282. | KDM2A | 282 | 6 |
| 283. | KIAA0825 | 283 | 6 |
| 284. | KIAA1958 | 284 | 6 |
| 285. | LARGE | 285 | 6 |
| 286. | LDLRAD3 | 286 | 6 |
| 287. | LINC00298 | 287 | 6 |
| 288. | LINC00299 | 288 | 6 |
| 289. | LINGO2 | 289 | 6 |
| 290. | LMO7 | 290 | 6 |
| 291. | LRP6 | 291 | 6 |

TABLE 2-continued

|  | Gene name | Rank | Fusions |
|---|---|---|---|
| 292. | MACROD2 | 292 | 6 |
| 293. | MED1 | 293 | 6 |
| 294. | MLLT10 | 294 | 6 |
| 295. | MOCOS | 295 | 6 |
| 296. | MPP5 | 296 | 6 |
| 297. | MRPL3 | 297 | 6 |
| 298. | MSRB3 | 298 | 6 |
| 299. | MYCNOS | 299 | 6 |
| 300. | MYEOV | 300 | 6 |
| 301. | NCOA7 | 301 | 6 |
| 302. | PBX1 | 302 | 6 |
| 303. | PCAT1 | 303 | 6 |
| 304. | PCGF2 | 304 | 6 |
| 305. | PIP4K2B | 305 | 6 |
| 306. | PLXND1 | 306 | 6 |
| 307. | PMFBP1 | 307 | 6 |
| 308. | PPFIBP1 | 308 | 6 |
| 309. | PRRC2B | 309 | 6 |
| 310. | PSPC1 | 310 | 6 |
| 311. | PTPRM | 311 | 6 |
| 312. | RALYL | 312 | 6 |
| 313. | RCOR1 | 313 | 6 |
| 314. | RNA28S5 | 314 | 6 |
| 315. | RNF213 | 315 | 6 |
| 316. | RP11-603B24.1 | 316 | 6 |
| 317. | RSRC1 | 317 | 6 |
| 318. | SBF2 | 318 | 6 |
| 319. | SIL1 | 319 | 6 |
| 320. | SLC1A2 | 320 | 6 |
| 321. | SLC44A1 | 321 | 6 |
| 322. | SMAP2 | 322 | 6 |
| 323. | SMARCC1 | 323 | 6 |
| 324. | SMG1P3 | 324 | 6 |
| 325. | SOX5 | 325 | 6 |
| 326. | SPAG9 | 326 | 6 |
| 327. | SPECC1 | 327 | 6 |
| 328. | SPG7 | 328 | 6 |
| 329. | ST7 | 329 | 6 |
| 330. | STARD3 | 330 | 6 |
| 331. | STK24 | 331 | 6 |
| 332. | SUV420H1 | 332 | 6 |
| 333. | TATDN1 | 333 | 6 |
| 334. | TERT | 334 | 6 |
| 335. | TIAM1 | 335 | 6 |
| 336. | TMEM104 | 336 | 6 |
| 337. | TMEM117 | 337 | 6 |
| 338. | TMEM135 | 338 | 6 |
| 339. | TNS3 | 339 | 6 |
| 340. | TRIO | 340 | 6 |
| 341. | TUFT1 | 341 | 6 |
| 342. | UBR5 | 342 | 6 |
| 343. | UHRF1BP1L | 343 | 6 |
| 344. | VAT1L | 344 | 6 |
| 345. | VDR | 345 | 6 |
| 346. | VPS13D | 346 | 6 |
| 347. | WNK2 | 347 | 6 |
| 348. | WWP2 | 348 | 6 |
| 349. | ZBTB20 | 349 | 6 |
| 350. | ZC3H7B | 350 | 6 |
| 351. | ZFHX3 | 351 | 6 |
| 352. | ZNRF3 | 352 | 6 |
| 353. | 40057 | 353 | 6 |
| 354. | ABLIM2 | 354 | 5 |
| 355. | AC008271.1 | 355 | 5 |
| 356. | AC010145.4 | 356 | 5 |
| 357. | AC142119.1 | 357 | 5 |
| 358. | ADAM9 | 358 | 5 |
| 359. | AFF1 | 359 | 5 |
| 360. | AGBL4 | 360 | 5 |
| 361. | ANKHD1 | 361 | 5 |
| 362. | ANXA2 | 362 | 5 |
| 363. | APOLD1 | 363 | 5 |
| 364. | ARHGAP23 | 364 | 5 |
| 365. | ARHGAP42 | 365 | 5 |
| 366. | ARHGAP5 | 366 | 5 |
| 367. | ARHGEF10L | 367 | 5 |
| 368. | ARHGEF2 | 368 | 5 |
| 369. | ARID2 | 369 | 5 |
| 370. | ARID4A | 370 | 5 |
| 371. | AVIL | 371 | 5 |
| 372. | BCL6 | 372 | 5 |
| 373. | BIRC6 | 373 | 5 |
| 374. | BMS1 | 374 | 5 |
| 375. | BOP1 | 375 | 5 |
| 376. | C11orf49 | 376 | 5 |
| 377. | C11orf80 | 377 | 5 |
| 378. | CARM1 | 378 | 5 |
| 379. | CCDC26 | 379 | 5 |
| 380. | CCDC88A | 380 | 5 |
| 381. | CCNT1 | 381 | 5 |
| 382. | CCT2 | 382 | 5 |
| 383. | CDC16 | 383 | 5 |
| 384. | CDK10 | 384 | 5 |
| 385. | CDK13 | 385 | 5 |
| 386. | CDK14 | 386 | 5 |
| 387. | CDK5RAP2 | 387 | 5 |
| 388. | CENPP | 388 | 5 |
| 389. | CEP112 | 389 | 5 |
| 390. | CHCHD3 | 390 | 5 |
| 391. | CLIC4 | 391 | 5 |
| 392. | CNTLN | 392 | 5 |
| 393. | COL24A1 | 393 | 5 |
| 394. | COL4A2 | 394 | 5 |
| 395. | COL4A6 | 395 | 5 |
| 396. | COL8A1 | 396 | 5 |
| 397. | COL9A2 | 397 | 5 |
| 398. | CRTC1 | 398 | 5 |
| 399. | CRTC3 | 399 | 5 |
| 400. | CYB5B | 400 | 5 |
| 401. | DEPTOR | 401 | 5 |
| 402. | DHX40 | 402 | 5 |
| 403. | DIP2C | 403 | 5 |
| 404. | DLG2 | 404 | 5 |
| 405. | DLGAP4 | 405 | 5 |
| 406. | DMXL1 | 406 | 5 |
| 407. | DNAH11 | 407 | 5 |
| 408. | DTNB | 408 | 5 |
| 409. | EEF2 | 409 | 5 |
| 410. | EHBP1 | 410 | 5 |
| 411. | EIF3H | 411 | 5 |
| 412. | ELMSAN1 | 412 | 5 |
| 413. | EML4 | 413 | 5 |
| 414. | EP400 | 414 | 5 |
| 415. | EPHA6 | 415 | 5 |
| 416. | ERBB4 | 416 | 5 |
| 417. | EYA2 | 417 | 5 |
| 418. | FAM19A2 | 418 | 5 |
| 419. | FAM208B | 419 | 5 |
| 420. | FBXL13 | 420 | 5 |
| 421. | FBXO34 | 421 | 5 |
| 422. | FBXW11 | 422 | 5 |
| 423. | FMNL2 | 423 | 5 |
| 424. | FOXP1 | 424 | 5 |
| 425. | FOXR1 | 425 | 5 |
| 426. | FRMD4B | 426 | 5 |
| 427. | GBF1 | 427 | 5 |
| 428. | GLG1 | 428 | 5 |
| 429. | GSK3B | 429 | 5 |
| 430. | GTF2I | 430 | 5 |
| 431. | GTF2IRD1 | 431 | 5 |
| 432. | HEATR4 | 432 | 5 |
| 433. | HIVEP3 | 433 | 5 |
| 434. | INPP4B | 434 | 5 |
| 435. | INPP5A | 435 | 5 |
| 436. | IPO7 | 436 | 5 |
| 437. | IQGAP1 | 437 | 5 |
| 438. | KBTBD11 | 438 | 5 |
| 439. | KDM4C | 439 | 5 |
| 440. | KIRREL | 440 | 5 |
| 441. | LAMB1 | 441 | 5 |
| 442. | LARS2 | 442 | 5 |
| 443. | LIMK2 | 443 | 5 |
| 444. | LIN54 | 444 | 5 |
| 445. | LINC01057 | 445 | 5 |
| 446. | LINC01184 | 446 | 5 |
| 447. | LINC01237 | 447 | 5 |

TABLE 2-continued

|  | Gene name | Rank | Fusions |
|---|---|---|---|
| 448. | LMF1 | 448 | 5 |
| 449. | LPP | 449 | 5 |
| 450. | LRRC37A3 | 450 | 5 |
| 451. | LRRC75A-AS1 | 451 | 5 |
| 452. | MAP7 | 452 | 5 |
| 453. | MAPK1 | 453 | 5 |
| 454. | MBNL1 | 454 | 5 |
| 455. | MEF2D | 455 | 5 |
| 456. | MET | 456 | 5 |
| 457. | MICAL2 | 457 | 5 |
| 458. | MIPOL1 | 458 | 5 |
| 459. | MLLT3 | 459 | 5 |
| 460. | MLLT6 | 460 | 5 |
| 461. | MRC2 | 461 | 5 |
| 462. | MRPL13 | 462 | 5 |
| 463. | MRPL21 | 463 | 5 |
| 464. | MSL2 | 464 | 5 |
| 465. | MTA2 | 465 | 5 |
| 466. | MYCNUT | 466 | 5 |
| 467. | MYO18A | 467 | 5 |
| 468. | MYO9A | 468 | 5 |
| 469. | NAALADL2 | 469 | 5 |
| 470. | NADSYN1 | 470 | 5 |
| 471. | NARS2 | 471 | 5 |
| 472. | NCOA2 | 472 | 5 |
| 473. | NCOA3 | 473 | 5 |
| 474. | NCOA6 | 474 | 5 |
| 475. | NDRG3 | 475 | 5 |
| 476. | NKD1 | 476 | 5 |
| 477. | NPM1 | 477 | 5 |
| 478. | NRCAM | 478 | 5 |
| 479. | NSF | 479 | 5 |
| 480. | NUMA1 | 480 | 5 |
| 481. | OLA1 | 481 | 5 |
| 482. | OSBPL2 | 482 | 5 |
| 483. | OTX2-AS1 | 483 | 5 |
| 484. | PAFAH1B2 | 484 | 5 |
| 485. | PAPLN | 485 | 5 |
| 486. | PARD3B | 486 | 5 |
| 487. | PARVA | 487 | 5 |
| 488. | PCBP1-AS1 | 488 | 5 |
| 489. | PCNX | 489 | 5 |
| 490. | PHTF2 | 490 | 5 |
| 491. | PIEZO1 | 491 | 5 |
| 492. | PIK3C3 | 492 | 5 |
| 493. | PPHLN1 | 493 | 5 |
| 494. | PPIE | 494 | 5 |
| 495. | PPP1R12B | 495 | 5 |
| 496. | PPP1R16A | 496 | 5 |
| 497. | PRICKLE2 | 497 | 5 |
| 498. | PRIM2 | 498 | 5 |
| 499. | PSMD1 | 499 | 5 |
| 500. | PTGES3 | 500 | 5 |
| 501. | PTPLAD1 | 501 | 5 |
| 502. | PTPRF | 502 | 5 |
| 503. | PXN | 503 | 5 |
| 504. | RAB10 | 504 | 5 |
| 505. | RAB11FIP4 | 505 | 5 |
| 506. | RAF1 | 506 | 5 |
| 507. | RASSF3 | 507 | 5 |
| 508. | RB1 | 508 | 5 |
| 509. | RBM14 | 509 | 5 |
| 510. | RGL1 | 510 | 5 |
| 511. | RIMS2 | 511 | 5 |
| 512. | RNF216 | 512 | 5 |
| 513. | RNF220 | 513 | 5 |
| 514. | RP11-120I21.2 | 514 | 5 |
| 515. | RP11-384F7.2 | 515 | 5 |
| 516. | RTTN | 516 | 5 |
| 517. | RYR2 | 517 | 5 |
| 518. | SAE1 | 518 | 5 |
| 519. | SBNO1 | 519 | 5 |
| 520. | SCAF4 | 520 | 5 |
| 521. | SENP6 | 521 | 5 |
| 522. | SH3D19 | 522 | 5 |
| 523. | SIK2 | 523 | 5 |
| 524. | SLC12A2 | 524 | 5 |
| 525. | SMG6 | 525 | 5 |
| 526. | SNTB2 | 526 | 5 |
| 527. | SNX8 | 527 | 5 |
| 528. | SREBF2 | 528 | 5 |
| 529. | SRGAP1 | 529 | 5 |
| 530. | SRGAP3 | 530 | 5 |
| 531. | SRPK2 | 531 | 5 |
| 532. | STAG1 | 532 | 5 |
| 533. | SUGCT | 533 | 5 |
| 534. | SUMF1 | 534 | 5 |
| 535. | SYNRG | 535 | 5 |
| 536. | SYT1 | 536 | 5 |
| 537. | TAF2 | 537 | 5 |
| 538. | TANGO6 | 538 | 5 |
| 539. | TBL1X | 539 | 5 |
| 540. | TEAD1 | 540 | 5 |
| 541. | THRAP3 | 541 | 5 |
| 542. | TMCC1 | 542 | 5 |
| 543. | TMCO3 | 543 | 5 |
| 544. | TRERF1 | 544 | 5 |
| 545. | TSPAN4 | 545 | 5 |
| 546. | TYW1 | 546 | 5 |
| 547. | UBE2E1 | 547 | 5 |
| 548. | UBR4 | 548 | 5 |
| 549. | UHRF1 | 549 | 5 |
| 550. | ULK4 | 550 | 5 |
| 551. | VAC14 | 551 | 5 |
| 552. | VAV2 | 552 | 5 |
| 553. | VGLL4 | 553 | 5 |
| 554. | VTI1A | 554 | 5 |
| 555. | WDR70 | 555 | 5 |
| 556. | XRCC6 | 556 | 5 |
| 557. | ZC3H7A | 557 | 5 |
| 558. | ZCCHC7 | 558 | 5 |
| 559. | ZFP69B | 559 | 5 |
| 560. | ZNF595 | 560 | 5 |
| 561. | ABCC1 | 561 | 4 |
| 562. | ABHD12B | 562 | 4 |
| 563. | AC005562.1 | 563 | 4 |
| 564. | AC104820.2 | 564 | 4 |
| 565. | ACAP2 | 565 | 4 |
| 566. | ACTR10 | 566 | 4 |
| 567. | ADAMTS2 | 567 | 4 |
| 568. | ADCY9 | 568 | 4 |
| 569. | ADNP2 | 569 | 4 |
| 570. | AEBP2 | 570 | 4 |
| 571. | AGAP2 | 571 | 4 |
| 572. | AGO3 | 572 | 4 |
| 573. | AGPAT3 | 573 | 4 |
| 574. | AHCTF1 | 574 | 4 |
| 575. | AHCY | 575 | 4 |
| 576. | AHRR | 576 | 4 |
| 577. | AKAP6 | 577 | 4 |
| 578. | ANAPC10 | 578 | 4 |
| 579. | ANKLE2 | 579 | 4 |
| 580. | ANKRD28 | 580 | 4 |
| 581. | ANO1 | 581 | 4 |
| 582. | ANTXR1 | 582 | 4 |
| 583. | ANXA4 | 583 | 4 |
| 584. | AP2B1 | 584 | 4 |
| 585. | APC | 585 | 4 |
| 586. | ARHGAP26 | 586 | 4 |
| 587. | ARHGAP35 | 587 | 4 |
| 588. | ARL17B | 588 | 4 |
| 589. | ARNT | 589 | 4 |
| 590. | ASCC1 | 590 | 4 |
| 591. | ASRGL1 | 591 | 4 |
| 592. | ATE1 | 592 | 4 |
| 593. | ATP2B4 | 593 | 4 |
| 594. | ATRN | 594 | 4 |
| 595. | ATXN10 | 595 | 4 |
| 596. | ATXN2 | 596 | 4 |
| 597. | BAIAP2 | 597 | 4 |
| 598. | BAIAP2L1 | 598 | 4 |
| 599. | BCAS4 | 599 | 4 |
| 600. | BCL2 | 600 | 4 |
| 601. | BCL2L1 | 601 | 4 |
| 602. | BCL7A | 602 | 4 |
| 603. | BICD1 | 603 | 4 |

TABLE 2-continued

|  | Gene name | Rank | Fusions |
|---|---|---|---|
| 604. | BRE | 604 | 4 |
| 605. | BRI3BP | 605 | 4 |
| 606. | BRIP1 | 606 | 4 |
| 607. | C16orf45 | 607 | 4 |
| 608. | C16orf62 | 608 | 4 |
| 609. | C16orf70 | 609 | 4 |
| 610. | C20orf194 | 610 | 4 |
| 611. | C22orf34 | 611 | 4 |
| 612. | CAMK2G | 612 | 4 |
| 613. | CASC4 | 613 | 4 |
| 614. | CAV1 | 614 | 4 |
| 615. | CCDC6 | 615 | 4 |
| 616. | CCS | 616 | 4 |
| 617. | CCSER2 | 617 | 4 |
| 618. | CD44 | 618 | 4 |
| 619. | CDH1 | 619 | 4 |
| 620. | CDK6 | 620 | 4 |
| 621. | CECR2 | 621 | 4 |
| 622. | CELF1 | 622 | 4 |
| 623. | CEP128 | 623 | 4 |
| 624. | CEP250 | 624 | 4 |
| 625. | CEP72 | 625 | 4 |
| 626. | CFTR | 626 | 4 |
| 627. | CHD6 | 627 | 4 |
| 628. | CHSY3 | 628 | 4 |
| 629. | CIITA | 629 | 4 |
| 630. | CIZ1 | 630 | 4 |
| 631. | CLIP1 | 631 | 4 |
| 632. | CLIP2 | 632 | 4 |
| 633. | CMIP | 633 | 4 |
| 634. | CMTM4 | 634 | 4 |
| 635. | CNOT1 | 635 | 4 |
| 636. | CNTN5 | 636 | 4 |
| 637. | CNTNAP2 | 637 | 4 |
| 638. | COPA | 638 | 4 |
| 639. | CORO7 | 639 | 4 |
| 640. | CPNE2 | 640 | 4 |
| 641. | CREB3L2 | 641 | 4 |
| 642. | CSMD3 | 642 | 4 |
| 643. | CSNK1D | 643 | 4 |
| 644. | CTB-31N19.2 | 644 | 4 |
| 645. | CTCF | 645 | 4 |
| 646. | CTD-2354A18.1 | 646 | 4 |
| 647. | CTD-2583A14.10 | 647 | 4 |
| 648. | CTNND1 | 648 | 4 |
| 649. | CYFIP1 | 649 | 4 |
| 650. | CYSTM1 | 650 | 4 |
| 651. | CYTH1 | 651 | 4 |
| 652. | DAG1 | 652 | 4 |
| 653. | DAZAP1 | 653 | 4 |
| 654. | DCAKD | 654 | 4 |
| 655. | DENND2C | 655 | 4 |
| 656. | DHCR24 | 656 | 4 |
| 657. | DIP2A | 657 | 4 |
| 658. | DLG1 | 658 | 4 |
| 659. | DLGAP1 | 659 | 4 |
| 660. | DMD | 660 | 4 |
| 661. | DNAJC11 | 661 | 4 |
| 662. | DNAJC13 | 662 | 4 |
| 663. | DRG1 | 663 | 4 |
| 664. | DYNC2H1 | 664 | 4 |
| 665. | DYRK1A | 665 | 4 |
| 666. | E2F3 | 666 | 4 |
| 667. | EFTUD2 | 667 | 4 |
| 668. | EGFR | 668 | 4 |
| 669. | EPB41 | 669 | 4 |
| 670. | EPN2 | 670 | 4 |
| 671. | EPS15 | 671 | 4 |
| 672. | ERN1 | 672 | 4 |
| 673. | EXOSC10 | 673 | 4 |
| 674. | FAM134C | 674 | 4 |
| 675. | FAM188A | 675 | 4 |
| 676. | FAM46C | 676 | 4 |
| 677. | FAM49A | 677 | 4 |
| 678. | FARS2 | 678 | 4 |
| 679. | FBN1 | 679 | 4 |
| 680. | FBXO11 | 680 | 4 |
| 681. | FBXO42 | 681 | 4 |
| 682. | FER1L6 | 682 | 4 |
| 683. | FGD4 | 683 | 4 |
| 684. | FLOT2 | 684 | 4 |
| 685. | FN1 | 685 | 4 |
| 686. | FOSL2 | 686 | 4 |
| 687. | FOXJ3 | 687 | 4 |
| 688. | FRMD8 | 688 | 4 |
| 689. | FUT8 | 689 | 4 |
| 690. | FXR1 | 690 | 4 |
| 691. | GALNTL6 | 691 | 4 |
| 692. | GAPVD1 | 692 | 4 |
| 693. | GCLM | 693 | 4 |
| 694. | GGA3 | 694 | 4 |
| 695. | GMEB2 | 695 | 4 |
| 696. | GOLPH3 | 696 | 4 |
| 697. | GREB1L | 697 | 4 |
| 698. | GSDMB | 698 | 4 |
| 699. | GSDMC | 699 | 4 |
| 700. | HDAC8 | 700 | 4 |
| 701. | HELLS | 701 | 4 |
| 702. | HIRA | 702 | 4 |
| 703. | HMGA2 | 703 | 4 |
| 704. | HSCB | 704 | 4 |
| 705. | HSPG2 | 705 | 4 |
| 706. | IGF1R | 706 | 4 |
| 707. | IGF2R | 707 | 4 |
| 708. | IGJ | 708 | 4 |
| 709. | INO80 | 709 | 4 |
| 710. | INTS1 | 710 | 4 |
| 711. | IQCH | 711 | 4 |
| 712. | IQGAP3 | 712 | 4 |
| 713. | ITGA4 | 713 | 4 |
| 714. | ITPR1 | 714 | 4 |
| 715. | ITSN1 | 715 | 4 |
| 716. | JADE1 | 716 | 4 |
| 717. | KAT6B | 717 | 4 |
| 718. | KDM5A | 718 | 4 |
| 719. | KDM6A | 719 | 4 |
| 720. | KIAA0556 | 720 | 4 |
| 721. | KIF5A | 721 | 4 |
| 722. | KPNA7 | 722 | 4 |
| 723. | L3MBTL2 | 723 | 4 |
| 724. | LAMA3 | 724 | 4 |
| 725. | LAMA5 | 725 | 4 |
| 726. | LAMB4 | 726 | 4 |
| 727. | LASP1 | 727 | 4 |
| 728. | LHFPL3 | 728 | 4 |
| 729. | LIMCH1 | 729 | 4 |
| 730. | LIX1L | 730 | 4 |
| 731. | LMAN2 | 731 | 4 |
| 732. | LRBA | 732 | 4 |
| 733. | LRRC28 | 733 | 4 |
| 734. | LRRC4C | 734 | 4 |
| 735. | LSM14A | 735 | 4 |
| 736. | MACROD1 | 736 | 4 |
| 737. | MAP3K1 | 737 | 4 |
| 738. | MAP3K3 | 738 | 4 |
| 739. | MAPKAPK5 | 739 | 4 |
| 740. | MAPT | 740 | 4 |
| 741. | MARK3 | 741 | 4 |
| 742. | MARS | 742 | 4 |
| 743. | MBOAT2 | 743 | 4 |
| 744. | MBTD1 | 744 | 4 |
| 745. | MECP2 | 745 | 4 |
| 746. | MEGF6 | 746 | 4 |
| 747. | MEGF8 | 747 | 4 |
| 748. | MEIS2 | 748 | 4 |
| 749. | MELK | 749 | 4 |
| 750. | MIB1 | 750 | 4 |
| 751. | MIR137HG | 751 | 4 |
| 752. | MIR4435-1HG | 752 | 4 |
| 753. | MKL1 | 753 | 4 |
| 754. | MOV10L1 | 754 | 4 |
| 755. | MROH1 | 755 | 4 |
| 756. | MTF1 | 756 | 4 |
| 757. | MTHFD1L | 757 | 4 |
| 758. | MTUS1 | 758 | 4 |
| 759. | MYH7 | 759 | 4 |

TABLE 2-continued

|  | Gene name | Rank | Fusions |
|---|---|---|---|
| 760. | MYO6 | 760 | 4 |
| 761. | MYO9B | 761 | 4 |
| 762. | MYOM1 | 762 | 4 |
| 763. | NCALD | 763 | 4 |
| 764. | NDUFA4 | 764 | 4 |
| 765. | NDUFS4 | 765 | 4 |
| 766. | NEMF | 766 | 4 |
| 767. | NETO2 | 767 | 4 |
| 768. | NFIB | 768 | 4 |
| 769. | NFYC | 769 | 4 |
| 770. | NLN | 770 | 4 |
| 771. | NMT2 | 771 | 4 |
| 772. | NOL9 | 772 | 4 |
| 773. | NRD1 | 773 | 4 |
| 774. | NSMCE2 | 774 | 4 |
| 775. | NUP210L | 775 | 4 |
| 776. | NUP85 | 776 | 4 |
| 777. | OGFOD3 | 777 | 4 |
| 778. | OPRD1 | 778 | 4 |
| 779. | OSBPL1A | 779 | 4 |
| 780. | OVAAL | 780 | 4 |
| 781. | P4HA1 | 781 | 4 |
| 782. | PACS2 | 782 | 4 |
| 783. | PAMR1 | 783 | 4 |
| 784. | PAPSS2 | 784 | 4 |
| 785. | PARG | 785 | 4 |
| 786. | PARK2 | 786 | 4 |
| 787. | PAX3 | 787 | 4 |
| 788. | PCCA | 788 | 4 |
| 789. | PCNXL2 | 789 | 4 |
| 790. | PCSK2 | 790 | 4 |
| 791. | PDHX | 791 | 4 |
| 792. | PDSS2 | 792 | 4 |
| 793. | PDXDC1 | 793 | 4 |
| 794. | PEAK1 | 794 | 4 |
| 795. | PEX1 | 795 | 4 |
| 796. | PHACTR3 | 796 | 4 |
| 797. | PHACTR4 | 797 | 4 |
| 798. | PHF20 | 798 | 4 |
| 799. | PHF8 | 799 | 4 |
| 800. | PI4KA | 800 | 4 |
| 801. | PIGU | 801 | 4 |
| 802. | PLA2G1B | 802 | 4 |
| 803. | PLCB1 | 803 | 4 |
| 804. | PLCL2 | 804 | 4 |
| 805. | PLEC | 805 | 4 |
| 806. | PML | 806 | 4 |
| 807. | POLR1A | 807 | 4 |
| 808. | POU2F2 | 808 | 4 |
| 809. | PPARGC1A | 809 | 4 |
| 810. | PPIEL | 810 | 4 |
| 811. | PPL | 811 | 4 |
| 812. | PPP1R1B | 812 | 4 |
| 813. | PPP2R2A | 813 | 4 |
| 814. | PREXI | 814 | 4 |
| 815. | PRIM1 | 815 | 4 |
| 816. | PRKAR1B | 816 | 4 |
| 817. | PRKCA | 817 | 4 |
| 818. | PRKCI | 818 | 4 |
| 819. | PRPF6 | 819 | 4 |
| 820. | PRSS23 | 820 | 4 |
| 821. | PSEN1 | 821 | 4 |
| 822. | PSMB2 | 822 | 4 |
| 823. | PTPN1 | 823 | 4 |
| 824. | PTPN14 | 824 | 4 |
| 825. | PUM1 | 825 | 4 |
| 826. | PUS7 | 826 | 4 |
| 827. | PVT1_1 | 827 | 4 |
| 828. | PXK | 828 | 4 |
| 829. | PYGB | 829 | 4 |
| 830. | RALA | 830 | 4 |
| 831. | RALBP1 | 831 | 4 |
| 832. | RALGAPA2 | 832 | 4 |
| 833. | RASA2 | 833 | 4 |
| 834. | RBFOX1 | 834 | 4 |
| 835. | RBMS1 | 835 | 4 |
| 836. | RBMS3 | 836 | 4 |
| 837. | RICTOR | 837 | 4 |
| 838. | RIMS3 | 838 | 4 |
| 839. | RNF115 | 839 | 4 |
| 840. | RNF121 | 840 | 4 |
| 841. | RP11-145E5.5 | 841 | 4 |
| 842. | RP11-383H13.1 | 842 | 4 |
| 843. | RP11-586K2.1 | 843 | 4 |
| 844. | RP11-809O17.1 | 844 | 4 |
| 845. | RP11-89K10.1 | 845 | 4 |
| 846. | RPRD2 | 846 | 4 |
| 847. | RRBP1 | 847 | 4 |
| 848. | RSF1 | 848 | 4 |
| 849. | RSPRY1 | 849 | 4 |
| 850. | RTN4 | 850 | 4 |
| 851. | SCAF11 | 851 | 4 |
| 852. | SCD5 | 852 | 4 |
| 853. | SDCCAG8 | 853 | 4 |
| 854. | SEC24A | 854 | 4 |
| 855. | SEC63 | 855 | 4 |
| 856. | SET | 856 | 4 |
| 857. | SHISA5 | 857 | 4 |
| 858. | SIK3 | 858 | 4 |
| 859. | SKAP1 | 859 | 4 |
| 860. | SLC13A2 | 860 | 4 |
| 861. | SLC30A7 | 861 | 4 |
| 862. | SLC38A10 | 862 | 4 |
| 863. | SLC44A2 | 863 | 4 |
| 864. | SLCO3A1 | 864 | 4 |
| 865. | SMARCC2 | 865 | 4 |
| 866. | SMCO2 | 866 | 4 |
| 867. | SND1 | 867 | 4 |
| 868. | SNX5 | 868 | 4 |
| 869. | SOS1 | 869 | 4 |
| 870. | SPATA13 | 870 | 4 |
| 871. | SPECC1L | 871 | 4 |
| 872. | SPTAN1 | 872 | 4 |
| 873. | SRSF1 | 873 | 4 |
| 874. | SS18L1 | 874 | 4 |
| 875. | SSH2 | 875 | 4 |
| 876. | STIM1 | 876 | 4 |
| 877. | STK3 | 877 | 4 |
| 878. | STMN3 | 878 | 4 |
| 879. | STX8 | 879 | 4 |
| 880. | SUFU | 880 | 4 |
| 881. | SWAP70 | 881 | 4 |
| 882. | TACC1 | 882 | 4 |
| 883. | TBC1D22A | 883 | 4 |
| 884. | TBC1D8 | 884 | 4 |
| 885. | TBK1 | 885 | 4 |
| 886. | TBL1XR1 | 886 | 4 |
| 887. | TCF7L2 | 887 | 4 |
| 888. | TCP11L1 | 888 | 4 |
| 889. | TEF | 889 | 4 |
| 890. | TEX2 | 890 | 4 |
| 891. | TFG | 891 | 4 |
| 892. | THSD4 | 892 | 4 |
| 893. | TLK2 | 893 | 4 |
| 894. | TMEM260 | 894 | 4 |
| 895. | TMEM38B | 895 | 4 |
| 896. | TMEM50B | 896 | 4 |
| 897. | TMEM68 | 897 | 4 |
| 898. | TMX2 | 898 | 4 |
| 899. | TP73 | 899 | 4 |
| 900. | TPST1 | 900 | 4 |
| 901. | TRIM37 | 901 | 4 |
| 902. | TRIM44 | 902 | 4 |
| 903. | TRMT10C | 903 | 4 |
| 904. | TRMT11 | 904 | 4 |
| 905. | TSPAN3 | 905 | 4 |
| 906. | TTC17 | 906 | 4 |
| 907. | TTC19 | 907 | 4 |
| 908. | TTC39C | 908 | 4 |
| 909. | TTC6 | 909 | 4 |
| 910. | TTI1 | 910 | 4 |
| 911. | TTLL5 | 911 | 4 |
| 912. | TUBD1 | 912 | 4 |
| 913. | TULP3 | 913 | 4 |
| 914. | UBA2 | 914 | 4 |
| 915. | UBAC2 | 915 | 4 |

TABLE 2-continued

|  | Gene name | Rank | Fusions |
|---|---|---|---|
| 916. | UBAP1 | 916 | 4 |
| 917. | UBQLN1 | 917 | 4 |
| 918. | UHRF2 | 918 | 4 |
| 919. | UIMC1 | 919 | 4 |
| 920. | UPF3A | 920 | 4 |
| 921. | UQCR10 | 921 | 4 |
| 922. | USP43 | 922 | 4 |
| 923. | USP47 | 923 | 4 |
| 924. | UTRN | 924 | 4 |
| 925. | WBP1L | 925 | 4 |
| 926. | WDFY3 | 926 | 4 |
| 927. | WDPCP | 927 | 4 |
| 928. | WDR33 | 928 | 4 |
| 929. | WDTC1 | 929 | 4 |
| 930. | WRAP53 | 930 | 4 |
| 931. | XXYLT1 | 931 | 4 |
| 932. | ZAK | 932 | 4 |
| 933. | ZC3H15 | 933 | 4 |
| 934. | ZMYM4 | 934 | 4 |
| 935. | ZMYND8 | 935 | 4 |
| 936. | ZNF331 | 936 | 4 |
| 937. | ZNF346 | 937 | 4 |
| 938. | ZNF609 | 938 | 4 |
| 939. | ZNRF1 | 939 | 4 |
| 940. | ABCA4 | 940 | 3 |
| 941. | ABCC4 | 941 | 3 |
| 942. | ABHD12 | 942 | 3 |
| 943. | ABR | 943 | 3 |
| 944. | AC027612.6 | 944 | 3 |
| 945. | ACAD10 | 945 | 3 |
| 946. | ACER3 | 946 | 3 |
| 947. | ACIN1 | 947 | 3 |
| 948. | ADAM18 | 948 | 3 |
| 949. | ADAMTS19 | 949 | 3 |
| 950. | ADAR | 950 | 3 |
| 951. | ADARB2 | 951 | 3 |
| 952. | ADCY1 | 952 | 3 |
| 953. | ADCY7 | 953 | 3 |
| 954. | ADRBK2 | 954 | 3 |
| 955. | AFG3L1P | 955 | 3 |
| 956. | AGBL1 | 956 | 3 |
| 957. | AGFG1 | 957 | 3 |
| 958. | AGRN | 958 | 3 |
| 959. | AHNAK | 959 | 3 |
| 960. | AKAP10 | 960 | 3 |
| 961. | ALDH3A2 | 961 | 3 |
| 962. | ALPK1 | 962 | 3 |
| 963. | AMOTL1 | 963 | 3 |
| 964. | ANK1 | 964 | 3 |
| 965. | ANKIB1 | 965 | 3 |
| 966. | ANKRD40 | 966 | 3 |
| 967. | ANKRD62P1-PARP4P3 | 967 | 3 |
| 968. | ANO10 | 968 | 3 |
| 969. | ANP32B | 969 | 3 |
| 970. | ANP32E | 970 | 3 |
| 971. | AP3S1 | 971 | 3 |
| 972. | AP3S2 | 972 | 3 |
| 973. | APBB2 | 973 | 3 |
| 974. | APIP | 974 | 3 |
| 975. | ARHGAP10 | 975 | 3 |
| 976. | ARHGAP15 | 976 | 3 |
| 977. | ARHGAP24 | 977 | 3 |
| 978. | ARHGAP29 | 978 | 3 |
| 979. | ARHGAP32 | 979 | 3 |
| 980. | ARHGAP39 | 980 | 3 |
| 981. | ARHGEF3 | 981 | 3 |
| 982. | ARID4B | 982 | 3 |
| 983. | ARL15 | 983 | 3 |
| 984. | ARNTL2 | 984 | 3 |
| 985. | ARPC1A | 985 | 3 |
| 986. | ASB7 | 986 | 3 |
| 987. | ASH1L | 987 | 3 |
| 988. | ASIC2 | 988 | 3 |
| 989. | ASIP | 989 | 3 |
| 990. | ASPH | 990 | 3 |
| 991. | ATAD2B | 991 | 3 |
| 992. | ATAD5 | 992 | 3 |
| 993. | ATG4A | 993 | 3 |
| 994. | ATG7 | 994 | 3 |
| 995. | ATM | 995 | 3 |
| 996. | ATP2A2 | 996 | 3 |
| 997. | ATXN7 | 997 | 3 |
| 998. | AUTS2 | 998 | 3 |
| 999. | AXIN1 | 999 | 3 |
| 1000. | TRIM37 | 901 | 4 |

What is claimed is:

1. An expression vector comprising: a nucleic acid sequence encoding a Plasmacytoma variant translocation 1_217 (PVT1_217) splice variant micropeptide and a heterologous promoter sequence, wherein the PVT1_217 splice variant micropeptide is at least 12 amino acids in length, and comprises at least 10 contiguous amino acids that are identical to a peptide encoded by a short open reading frame (shORF) located at the junction of Exon 3 and Exon 4 of human PVT1_217, and wherein the PVT1_217 splice variant micropeptide has at least 80% sequence identity to the sequence set forth in SEQ ID NO: 1, wherein the nucleic acid sequence encoding a PVT1_217 splice variant micropeptide is not the nucleic acid sequence of an endogenous PVT1 genomic locus.

2. A pharmaceutical composition comprising:
   i. an expression vector comprising a synthetic nucleic acid sequence encoding a micropeptide comprising an amino acid sequence having at least 80% sequence identity to the sequence set forth in SEQ ID NO: 1 and a heterologous promoter sequence, wherein the synthetic nucleic acid sequence is not the nucleic acid sequence of an endogenous PVT1 genomic locus; or a fusion protein comprising a micropeptide comprising an amino acid sequence having at least 80% sequence identity to the sequence set forth in SEQ ID NO: 1 and a heterologous polypeptide; and
   ii. a pharmaceutically acceptable excipient.

3. The pharmaceutical composition of claim 2, wherein the micropeptide is at least 12, 13 or 14 amino acids in length.

4. The pharmaceutical composition of claim 2, wherein the micropeptide comprises at least 10 contiguous amino acids that are identical to a peptide encoded by a short open reading frame (shORF) located at the junction of Exon 3 and Exon 4 of human PVT1_217.

5. The pharmaceutical composition of claim 2, wherein the micropeptide comprises a maximum of 14 contiguous amino acids that are identical to a peptide encoded by a short open reading frame (shORF) located at the junction of Exon 3 and Exon 4 of human PVT1_217.

6. The pharmaceutical composition of claim 2, wherein the micropeptide has at least 85%, 90%, 95%, 96%, 97%, 98% or 99% sequence identity to the sequence set forth in SEQ ID NO: 1.

7. The pharmaceutical composition of claim 2, wherein the synthetic nucleic acid is DNA.

8. The pharmaceutical composition of claim 2, wherein the synthetic nucleic acid comprises one or more modified nucleic acids.

9. A method for treating a subject having a MYC-driven cancer, the method comprising: administering to the subject a pharmaceutical composition comprising:

i. a synthetic nucleic acid sequence encoding a micropeptide comprising an amino acid sequence having at least 80% sequence identity to the sequence set forth in SEQ ID NO: 1, or a micropeptide comprising an amino acid sequence having at least 80% sequence identity to the sequence set forth in SEQ ID NO: 1; and
   ii. a pharmaceutically acceptable excipient.

10. The method of claim 9, wherein the micropeptide comprises the sequence set forth in SEQ ID NO: 1.

11. The method of claim 9, wherein the micropeptide consists of 14 amino acids.

12. The method of claim 9, wherein the micropeptide comprises at least 10 contiguous amino acids that are identical to a peptide encoded by a short open reading frame (shORF) located at the junction of Exon 3 and Exon 4 of human PVT1_217.

13. An isolated fusion protein comprising: a peptide comprising an amino acid sequence that has at least 80% identity to SEQ ID NO: 1; and a heterologous polypeptide.

14. The isolated fusion protein of claim 13, wherein the amino acid sequence comprises at least 2 conservative amino acid substitutions within the sequence of SEQ ID NO: 1.

15. The isolated fusion protein of claim 13, wherein the amino acid sequence is SEQ ID NO: 1.

16. The isolated fusion protein of claim 13, wherein the amino acid sequence is at least 12, 13 or 14 amino acids in length.

17. The isolated fusion protein of claim 13, wherein the peptide comprises at least 10 contiguous amino acids that are identical to a peptide encoded by a short open reading frame (shORF) located at a junction of Exon 3 and Exon 4 of human PVT1_217.

18. The isolated fusion protein of claim 13, wherein the peptide comprises a maximum of 14 contiguous amino acids that are identical to a peptide encoded by a short open reading frame (shORF) located at the junction of Exon 3 and Exon 4 of human PVT1_217.

19. An isolated peptide comprising an amino acid sequence that has at least 80% identity to SEQ ID NO: 1, wherein the amino acid sequence comprises at least 1 conservative amino acid substitution within the sequence of SEQ ID NO: 1.

20. The isolated fusion protein of claim 13, wherein the peptide is conjugated with a lipid.

21. The isolated fusion protein of claim 13, wherein the heterologous polypeptide is selected from a group consisting of calmodulin, polyglutamine, thioredoxin, albumin, an antibody, a Fc domain, a protein having the amino acid sequence according to any one of SEQ ID NOs: 3-28, and combinations thereof.

* * * * *